United States Patent
Hattori

(10) Patent No.: US 9,088,775 B2
(45) Date of Patent: Jul. 21, 2015

(54) RECORDING DEVICE, RECORDING METHOD, REPRODUCTION DEVICE, REPRODUCTION METHOD, RECORDING MEDIUM, AND PROGRAM FOR ENCODING AND DECODING VIDEO DATA OF A PLURALITY OF VIEWPOINTS

(75) Inventor: Shinobu Hattori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 312 days.

(21) Appl. No.: 12/995,605

(22) PCT Filed: Mar. 25, 2010

(86) PCT No.: PCT/JP2010/055273
§ 371 (c)(1),
(2), (4) Date: Dec. 1, 2010

(87) PCT Pub. No.: WO2010/116895
PCT Pub. Date: Oct. 14, 2010

(65) Prior Publication Data
US 2011/0081131 A1    Apr. 7, 2011

(30) Foreign Application Priority Data
Apr. 8, 2009    (JP) .................. 2009-094254

(51) Int. Cl.
*H04N 5/76* (2006.01)
*H04N 13/00* (2006.01)
(Continued)

(52) U.S. Cl.
CPC ............ *H04N 13/004* (2013.01); *G11B 27/034* (2013.01); *G11B 27/11* (2013.01);
(Continued)

(58) Field of Classification Search
CPC . H04N 13/044; H04N 9/8227; H04N 13/055; H04N 21/234327; H04N 21/4347; H04N 19/597
USPC ............................... 348/42, 43; 386/337, 341
See application file for complete search history.

(56) References Cited

U.S. PATENT DOCUMENTS 5,619,256 A * 4/1997 Haskell et al. .................. 348/43
6,925,250 B1   8/2005 Oshima et al.
(Continued)

FOREIGN PATENT DOCUMENTS

| EP | 1 501 316 A1 | 1/2005 |
|---|---|---|
| JP | 11 191895 | 7/1999 |

(Continued)

OTHER PUBLICATIONS

Puri et al, "Basics of stereoscopic video, new compressionresults with MPEG-2 and proposal for MPEG-4", Signal processing:Image Communication 10 (1997) pp. 201-234.*
(Continued)

*Primary Examiner* — David Harvey
(74) *Attorney, Agent, or Firm* — Oblon, McClelland, Maier & Neustadt, L.L.P.

(57) ABSTRACT

The present invention relates to a recording device, a recording method, a playback device, a playback method, a recording medium, and a program that enable a recording medium, such as a BD, storing a stream of base image and a stream of extended image obtained by encoding video data of a plurality of viewpoints using a predetermined encoding method to be played in a device incompatible with playback of video data of a plurality of viewpoints. In an Access Unit storing Base view video, encoding of an MVC header is prohibited. As for a view component stored in an Access Unit without an MVC header, definition is made so that view_id thereof is recognized as 0. The present invention can be applied to a playback device compatible with the BD-ROM standard.

8 Claims, 45 Drawing Sheets

(51) Int. Cl.
*G11B 27/034* (2006.01)
*G11B 27/11* (2006.01)
*H04N 5/85* (2006.01)
*H04N 9/82* (2006.01)
*H04N 21/426* (2011.01)
*H04N 21/432* (2011.01)
*H04N 21/434* (2011.01)
*H04N 19/597* (2014.01)
*H04N 19/61* (2014.01)
*H04N 21/2343* (2011.01)

(52) U.S. Cl.
CPC ............. *H04N 5/85* (2013.01); *H04N 9/8227* (2013.01); *H04N 13/0055* (2013.01); *H04N 19/597* (2014.11); *H04N 19/61* (2014.11); *H04N 21/42646* (2013.01); *H04N 21/4325* (2013.01); *H04N 21/4347* (2013.01); *H04N 21/234327* (2013.01)

(56) References Cited

U.S. PATENT DOCUMENTS

| | | | |
|---|---|---|---|
| 7,848,425 B2 * | 12/2010 | Cho et al. | 375/240.16 |
| 8,149,923 B2 * | 4/2012 | Lim et al. | 375/240.25 |
| 8,154,585 B2 * | 4/2012 | Yang | 348/43 |
| 8,159,529 B2 * | 4/2012 | Yoshida et al. | 348/51 |
| 8,170,108 B2 * | 5/2012 | Jeon et al. | 375/240.16 |
| 8,619,852 B2 * | 12/2013 | Leontaris et al. | 375/240.01 |
| 8,619,871 B2 * | 12/2013 | Zhu et al. | 375/240.25 |
| 2004/0120396 A1 * | 6/2004 | Yun et al. | 375/240.01 |
| 2007/0223595 A1 * | 9/2007 | Hannuksela et al. | 375/240.26 |
| 2007/0280546 A1 * | 12/2007 | Kwak et al. | 382/251 |
| 2008/0175325 A1 * | 7/2008 | Hannuksela et al. | 375/240.26 |
| 2008/0285863 A1 * | 11/2008 | Moon et al. | 382/232 |
| 2008/0304766 A1 | 12/2008 | Lee et al. | |
| 2008/0316300 A1 * | 12/2008 | Okamoto | 348/47 |
| 2008/0317124 A1 * | 12/2008 | Cho et al. | 375/240.08 |
| 2009/0185616 A1 * | 7/2009 | Pandit et al. | 375/240.01 |
| 2010/0026882 A1 * | 2/2010 | Jeon et al. | 348/385.1 |
| 2011/0019746 A1 * | 1/2011 | Lim et al. | 375/240.25 |
| 2011/0038614 A1 * | 2/2011 | Chen et al. | 386/341 |
| 2011/0273542 A1 * | 11/2011 | Suh et al. | 348/51 |
| 2011/0293020 A1 * | 12/2011 | Lim et al. | 375/240.25 |
| 2012/0212579 A1 * | 8/2012 | Frojdh et al. | 348/43 |
| 2012/0219069 A1 * | 8/2012 | Lim et al. | 375/240.25 |

FOREIGN PATENT DOCUMENTS

| | | | |
|---|---|---|---|
| JP | 2005-348314 | | 12/2005 |
| JP | 2009-182953 | | 8/2009 |
| JP | 2010-244630 | | 10/2010 |
| JP | 4564107 B2 | | 10/2010 |
| KR | 2008-081407 | * | 9/2008 |
| WO | WO2007/114611 | * | 10/2007 |
| WO | 2009 133714 | | 11/2009 |
| WO | WO 2010/038365 | | 4/2010 |

OTHER PUBLICATIONS

U.S. Appl. No. 12/995,601, filed Dec. 1, 2010, Hattori.
U.S. Appl. No. 12/995,472, filed Dec. 1, 2010, Hattori.
U.S. Appl. No. 12/995,639, filed Dec. 1, 2010, Hattori.
Office Action issued Feb. 28, 2012 in Japan Application No. 2012-019823.
Office Action issued Feb. 28, 2012 in Japan Application No. 2012-019824.
ITU-T, "Series H: Audiovisual and Multimedia Systems Infrastructure of audiovisual services—Coding of moving video: Advanced Video coding for generic audiovisual services", H.264, Mar. 2009, p. 365.
ITU-T, "Series H: Audiovisual and Multimedia Systems; Infrastructure of audiovisual services—Coding of moving video," International Telecommunication Union, H.264, pp. 596-647, (Mar. 2009).
International Search Report issued Jun. 22, 2010 in PCT/JP10/055273 filed Mar. 25, 2010.
Japanese Office Action issued Jan. 5, 2012 in patent application No. 2009-094254.
Extended European Search Report issued Feb. 7, 2013, in European Patent Application No. 10761595.7.
U.S. Appl. No. 14/169,870, filed Jan. 31, 2014, Hattori.

* cited by examiner

FIG. 11

| Syntax | No. of bits | Mnemonic |
|---|---|---|
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++){ | | |
|         padding_word | 16 | bslbf |
|     } | | |
|     PlayList() | | |
|     for(i=0; i<N2; i++){ | | |
|         padding_word | 16 | bslbf |
|     } | | |
|     PlayListMark() | | |
|     for(i=0; i<N3; i++){ | | |
|         padding_word | 16 | bslbf |
|     } | | |
|     ExtensionData() | | |
|     for(i=0; i<N4; i++){ | | |
|         padding_word | 16 | bslbf |
|     } | | |
| } | | |

FIG. 12

| xxxxx.mpls{ | | | | | | | | |
|---|---|---|---|---|---|---|---|---|
| | ... snip ... | | | | | | | |
| | 3D_PL_type | 2 | | | | | | |
| | if(3D_PL_type==01b‖3D_PL_type==10) { | | | | | | | |
| | view_type | | 1 | | | | | |
| | reserved_for_future_use | | | 157 | | | | |
| | }else{ | | | | | | | |
| | reserved_for_future_use | | | | 158 | | | |
| | } | | | | | | | |
| | ... snip ... | | | | | | | |
| } | | | | | | | | |

FIG. 13

| 3D_PL_type | Meaning |
|---|---|
| 00 | 2D PlayList |
| 01 | 3D B-D1 PlayList |
| 10 | 3D B-D2 PlayList |

FIG. 14

| view_type (is_L_Base_view_flag) | Meaning |
|---|---|
| 0 | L view or 2D AVC video stream |
| 1 | R view |

FIG. 15

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 16

SubPath-Syntax

| Syntax | No. of bits | Mnemonic |
|---|---|---|
| SubPath() { | | |
|     length | 32 | uimsbf |
|     reserved_for_future_use | 8 | bslbf |
|     SubPath_type | 8 | uimsbf |
|     reserved_for_future_use | 15 | uimsbf |
|     is_repeat_SubPath | 1 | bslbf |
|     reserved_for_future_use | 8 | bslbf |
|     number_of_SubPlayItems | 8 | uimsbf |
|     for(i=0;i< number_of_SubPlayItems;i++) { | | |
|         SubPlayItem(i) | | |
|     } | | |
| } | | |

FIG. 17

SubPlayItem(i)-Syntax

| Syntax | No. of bits | Mnemonic |
|---|---|---|
| SubPlayItem(i) { | | |
| length | 16 | uimsbf |
| Clip_Information_file_name[0]       //subclip_entry_id=0 | 8*5 | bslbf |
| Clip_codec_identifier[0] | 8*4 | bslbf |
| reserved_for_future_use | 31 | bslbf |
| is_multi_Clip_entries | 1 | bslbf |
| ref_to_STC_id[0] | 8 | uimsbf |
| SubPlayItem_IN_time | 32 | uimsbf |
| SubPlayItem_OUT_time | 32 | uimsbf |
| sync_PlayItem_id | 16 | uimsbf |
| sync_start_PTS_of_PlayItem | 32 | uimsbf |
| if(is_multi_Clip_entries==1b) { | | |
| reserved_for_future_use | 8 | bslbf |
| num_of_Clip_entries | 8 | uimsbf |
| for (subclip_entry_id=1;//Note:Entries after subclip_entry_id=0 | | |
| subclip_entry_id<num_of_Clip_entries;subclip_entry_id ++) { | | |
| Clip_Information_file_name[subclip_entry_id] | 8*5 | bslbf |
| Clip_codec_identifier[subclip_entry_id] | 8*4 | bslbf |
| ref_to_STC_id[subclip_entry_id] | 8 | uimsbf |
| reserved_for_future_use | 8 | bslbf |
| } | | |
| } | | |
| } | | |

FIG. 18

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 19

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_textST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 38

Frame-rate Progressive/Interlace

| MAXIMUM NUMBER OF FIELDS DISPLAYED IN 1 GOP | | |
|---:|---|---:|
| 29.97 | Interlace | 60 |
| 25 | Interlace | 50 |
| MAXIMUM NUMBER OF FRAMES DISPLAYED IN 1 GOP | | |
| 59.94 | Progressive | 60 |
| 50 | Progressive | 50 |
| 23.976 | Progressive | 24 |
| 24 | Progressive | 24 |

RECORDING DEVICE, RECORDING METHOD, REPRODUCTION DEVICE, REPRODUCTION METHOD, RECORDING MEDIUM, AND PROGRAM FOR ENCODING AND DECODING VIDEO DATA OF A PLURALITY OF VIEWPOINTS

TECHNICAL FIELD

The present invention relates to a recording device, a recording method, a playback device, a playback method, a recording medium, and a program, and particularly relates to a recording device, a recording method, a playback device, a playback method, a recording medium, and a program that enable a recording medium, such as a BD, storing a stream of base image and a stream of extended image obtained by encoding video data of a plurality of viewpoints using a predetermined encoding method to be played in a device incompatible with playback of video data of a plurality of viewpoints.

BACKGROUND ART

Two-dimensional image content is the mainstream of content, such as movies, but recently, stereoscopic image content enabling stereoscopic viewing has been attracting attention.

A dedicated device is necessary for displaying a stereoscopic image. An example of such a device for stereoscopic viewing includes an IP (Integral Photography) stereoscopic image system developed by NHK (Nippon Hoso Kyokai).

Image data of a stereoscopic image is composed of image data of a plurality of viewpoints (image data of an image captured from a plurality of viewpoints). As the number of viewpoints is larger and as the range covered by the viewpoints is wider, a subject can be viewed from more various directions. That is, as sort of "television in which subject can be looked into" can be realized.

Among stereoscopic images, an image with the smallest number of viewpoints is a stereo image (so-called 3D image) in which the number of viewpoints is two. The image data of the stereo image is composed of data of a left image, which is an image observed by a left eye, and data of a right image, which is an image observed by a right eye.

On the other hand, content of a high-resolution image, such as movies, has a large data amount, and thus a large-capacity recording medium is necessary for recording content having such a large data amount.

An example of such a large-capacity recording medium includes a Blu-Ray (registered trademark) Disc (hereafter, also referred to as BD), such as a BD (Blu-Ray (registered trademark))-ROM (Read Only Memory).

CITATION LIST

Patent Literature

PTL 1: Japanese Unexamined Patent Application Publication No. 2005-348314

SUMMARY OF INVENTION

Technical Problem

Incidentally, in the BD standard, how to record image data of a stereoscopic image including a stereo image on a BD or how to play back the image data is not defined.

The image data of a stereo image is composed of two data streams: a data stream of a left image and a data stream of a right image. If the two data streams are recorded on a BD as is, it may be impossible to play back the data streams in an already-widespread BD player.

The present invention has been made in view of such circumstances, and enables a recording medium, such as a BD, storing a stream of base image and a stream of extended image obtained by encoding video data of a plurality of viewpoints using a predetermined encoding method to be played in a device incompatible with playback of video data of a plurality of viewpoints.

Solution to Problem

A recording device according to an aspect of the present invention includes encoding means for encoding video data of a plurality of viewpoints using a predetermined encoding method and outputting a stream of base image that is composed of data without a data header including identification information of a viewpoint and a stream of extended image that is composed of data with the data header including the identification information showing that the data is data of an expanded viewpoint.

The encoding means may be caused to remove the data header from the stream of base image that is obtained by encoding video data of a plurality of viewpoints using a predetermined encoding method and that is composed of data with the data header, and to output the stream of base image that is composed of data without the data header.

The encoding means may be caused to set a value of one or more to the data header, the value serving as the identification information showing that the data is data of an expanded viewpoint, and to output the stream of extended image.

A recording method according to an aspect of the present invention includes the step of encoding video data of a plurality of viewpoints using a predetermined encoding method and outputting a stream of base image that is composed of data without a data header including identification information of a viewpoint and a stream of extended image that is composed of data with the data header including the identification information showing that the data is data of an expanded viewpoint.

A program according to an aspect of the present invention causes a computer to execute a process including the step of encoding video data of a plurality of viewpoints using a predetermined encoding method and outputting a stream of base image that is composed of data without a data header including identification information of a viewpoint and a stream of extended image that is composed of data with the data header including the identification information showing that the data is data of an expanded viewpoint.

A recording medium according to an aspect of the present invention stores a stream of base image that is obtained by encoding video data of a plurality of viewpoints using a predetermined encoding method and that is composed of data without a data header including identification information of a viewpoint and a stream of extended image that is composed of data with the data header including the identification information showing that the data is data of an expanded viewpoint.

A playback device according to another aspect of the present invention includes reading means for reading, from a recording medium, a stream of base image that is obtained by encoding video data of a plurality of viewpoints using a predetermined encoding method and that is composed of data without a data header including identification information of a viewpoint and a stream of extended image that is composed of data with the data header including the identification information having a value of one or more showing that the data is data of an expanded viewpoint, and decoding means for performing a process sequentially from data of a viewpoint in which a value set as the identification information in the data header is small, regarding data of the stream of base image without the data header as data in which a value of zero is set as the identification information in the data header, and decoding the data of the stream of base image before decoding the data of the stream of extended image.

A playback method according to another aspect of the present invention includes the steps of reading, from a recording medium, a stream of base image that is obtained by encoding video data of a plurality of viewpoints using a predetermined encoding method and that is composed of data without a data header including identification information of a viewpoint and a stream of extended image that is composed of data with the data header including the identification information having a value of one or more showing that the data is data of an expanded viewpoint, and, in the case of performing a process sequentially from data of a viewpoint in which a value set as the identification information in the data header is small, regarding data of the stream of base image without the data header as data in which a value of zero is set as the identification information in the data header, and decoding the data of the stream of base image before decoding the data of the stream of extended image.

A program according to another aspect of the present invention causes a computer to execute a process including the steps of reading, from a recording medium, a stream of base image that is obtained by encoding video data of a plurality of viewpoints using a predetermined encoding method and that is composed of data without a data header including identification information of a viewpoint and a stream of extended image that is composed of data with the data header including the identification information having a value of one or more showing that the data is data of an expanded viewpoint, and, in the case of performing a process sequentially from data of a viewpoint in which a value set as the identification information in the data header is small, regarding data of the stream of base image without the data header as data in which a value of zero is set as the identification information in the data header, and decoding the data of the stream of base image before decoding the data of the stream of extended image.

In an aspect of the present invention, video data of a plurality of viewpoints is encoded using a predetermined encoding method, and a stream of base image that is composed of data without a data header including identification information of a viewpoint and a stream of extended image that is composed of data with the data header including the identification information showing that the data is data of an expanded viewpoint are output.

In another aspect of the present invention, a stream of base image that is obtained by encoding video data of a plurality of viewpoints using a predetermined encoding method and that is composed of data without a data header including identification information of a viewpoint and a stream of extended image that is composed of data with the data header including the identification information having a value of one or more showing that the data is data of an expanded viewpoint are read from a recording medium, and, in the case of performing a process sequentially from data of a viewpoint in which a value set as the identification information in the data header is small, data of the stream of base image without the data header is regarded as data in which a value of zero is set as the identification information in the data header, and the data of the stream of base image is decoded before the data of the stream of extended image is decoded.

Advantageous Effects of Invention

According to the present invention, a recording medium, such as a BD, storing a stream of base image and a stream of extended image obtained by encoding video data of a plurality of viewpoints using a predetermined encoding method can be played in a device incompatible with playback of video data of a plurality of viewpoints.

BRIEF DESCRIPTION OF DRAWINGS

FIG. 11 is a diagram illustrating the syntax of a PlayList file.

FIG. 12 is a diagram illustrating an example of a method for using reserved_for_future_use in FIG. 11.

FIG. 13 is a diagram illustrating the meanings of the values of 3D_PL_type.

FIG. 14 is a diagram illustrating the meanings of the values of view_type.

FIG. 15 is a diagram illustrating the syntax of PlayList( ) in FIG. 11.

FIG. 16 is a diagram illustrating the syntax of SubPath( ) in FIG. 15.

FIG. 17 is a diagram illustrating the syntax of SubPlayItem (i) in FIG. 16.

FIG. 18 is a diagram illustrating the syntax of PlayItem( ) in FIG. 15.

FIG. 19 is a diagram illustrating the syntax of STN_table( ) in FIG. 18.

FIG. 38 is a diagram illustrating the maximum number of frames and fields in a GOP.

DESCRIPTION OF EMBODIMENTS

First Embodiment

Configuration Example of Playback System

Figure 1:
FIG. 1 is a diagram illustrating a configuration example of a playback system including a playback device to which the present invention is applied.

FIG. 1 is a diagram illustrating a configuration example of a playback system including a playback device 1 to which the present invention is applied.

As illustrated in FIG. 1, this playback system is constituted by connecting the playback device 1 and a display device 3 using an HDMI (High Definition Multimedia Interface) cable or the like. An optical disc 2, such as a BD, is loaded into the playback device 1.

Streams that are necessary for displaying a stereo image (a so-called 3D image) in which the number of viewpoints is two are recorded on the optical disc 2.

The playback device 1 is a player compatible with 3D playback of streams recorded on the optical disc 2. The playback device 1 plays back streams recorded on the optical disc 2 and displays a 3D image obtained through the playback on the display device 3 formed of a television receiver or the like.

Audio is also played back by the playback device 1 and is output from a speaker or the like provided in the display device 3.

Various methods have been proposed as a 3D image display method. Here, a type-1 display method and a type-2 display method described below are employed as a 3D image display method.

The type-1 display method is a method for displaying a 3D image in which the data of the 3D image is composed of the data of an image observed by a left eye (L image) and the data of an image observed by a right eye (R image), and the L image and the R image are alternately displayed.

The type-2 display method is a method for displaying a 3D image by displaying an L image and an R image that are generated using the data of an original image, which is an image serving as the original for generating a 3D image, and the data of Depth. The data of a 3D image used in the type-2 display method is composed of the data of an original image and the data of Depth that is given to the original image for generating an L image and an R image.

The type-1 display method is a display method in which glasses are necessary for viewing/listening. The type-2 display method is a display method in which a 3D image can be viewed/listened to without glasses.

The optical disc 2 has streams recorded thereon so that a 3D image can be displayed in both the type-1 and type-2 display methods.

As an encoding method for recording such streams on the optical disc 2, H.264 AVC (Advanced Video Coding)/MVC (Multi-view Video coding) is employed, for example.

[H.264 AVC/MVC Profile]

In H.264 AVC/MVC, an image stream called Base view video and an image stream called Dependent view video are defined. Hereafter, H.264 AVC/MVC will be simply referred to as MVC as necessary.

Figure 2:
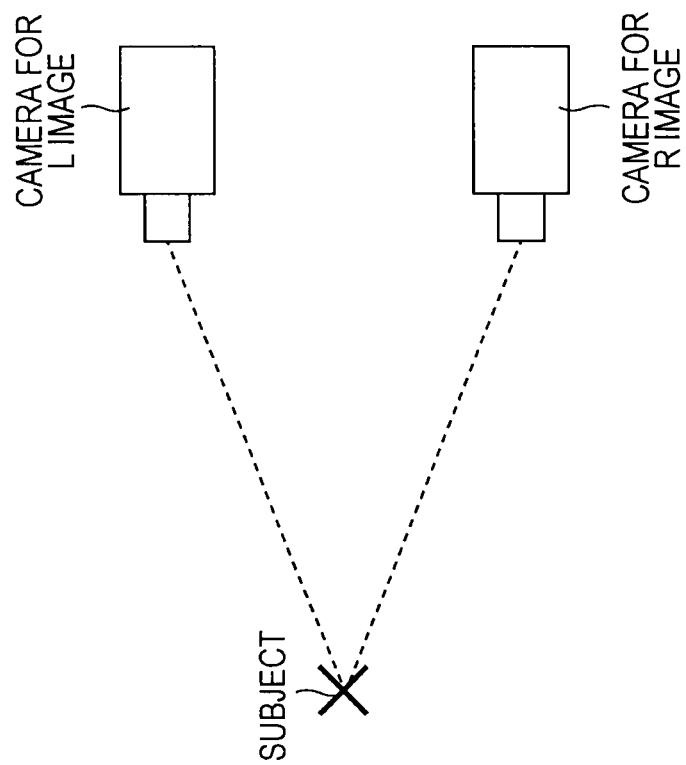
FIG. 2 is a diagram illustrating an example of shooting.

FIG. 2 is a diagram illustrating an example of shooting.

As illustrated in FIG. 2, shooting is performed on the same subject by a camera for L image and a camera for R image. An elementary stream of video captured by the camera for L image and the camera for R image is input to an MVC encoder.

Figure 3:
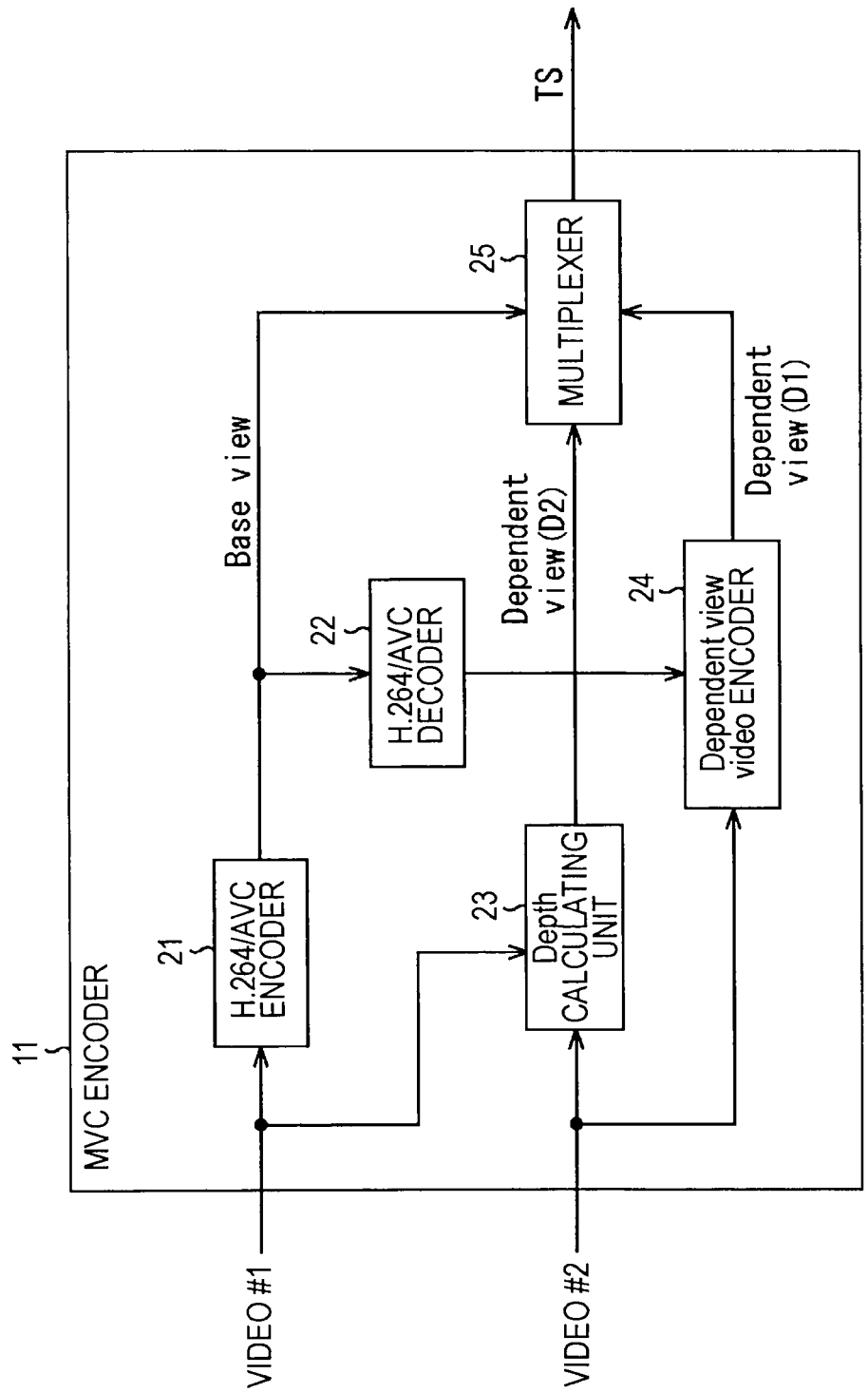
FIG. 3 is a block diagram illustrating a configuration example of an MVC encoder.

FIG. 3 is a block diagram illustrating a configuration example of the MVC encoder.

As illustrated in FIG. 3, an MVC encoder 11 includes an H.264/AVC encoder 21, an H.264/AVC decoder 22, a Depth calculating unit 23, a Dependent view video encoder 24, and a multiplexer 25.

A stream of video #1 captured by the camera for L image is input to the H.264/AVC encoder 21 and the Depth calculating unit 23. Also, a stream of video #2 captured by the camera for R image is input to the Depth calculating unit 23 and the Dependent view video encoder 24. The stream of video #2 may be input to the H.264/AVC encoder 21 and the Depth calculating unit 23, and the stream of video #1 may be input to the Depth calculating unit 23 and the Dependent view video encoder 24.

The H.264/AVC encoder 21 encodes the stream of video #1 as an H.264 AVC/High Profile video stream, for example. The H.264/AVC encoder 21 outputs an AVC video stream obtained through the encoding, serving as a Base view video stream, to the H.264/AVC decoder 22 and the multiplexer 25.

The H.264/AVC decoder 22 decodes the AVC video stream supplied from the H.264/AVC encoder 21 and outputs the stream of video #1 obtained through the decoding to the Dependent view video encoder 24.

The Depth calculating unit 23 calculates Depth on the basis of the stream of video #1 and the stream of video #2, and outputs the data of the calculated Depth to the multiplexer 25.

The Dependent view video encoder 24 encodes the stream of video #1 supplied from the H.264/AVC decoder 22 and the stream of video #2 externally input thereto, and outputs a Dependent view video stream.

Figure 4:
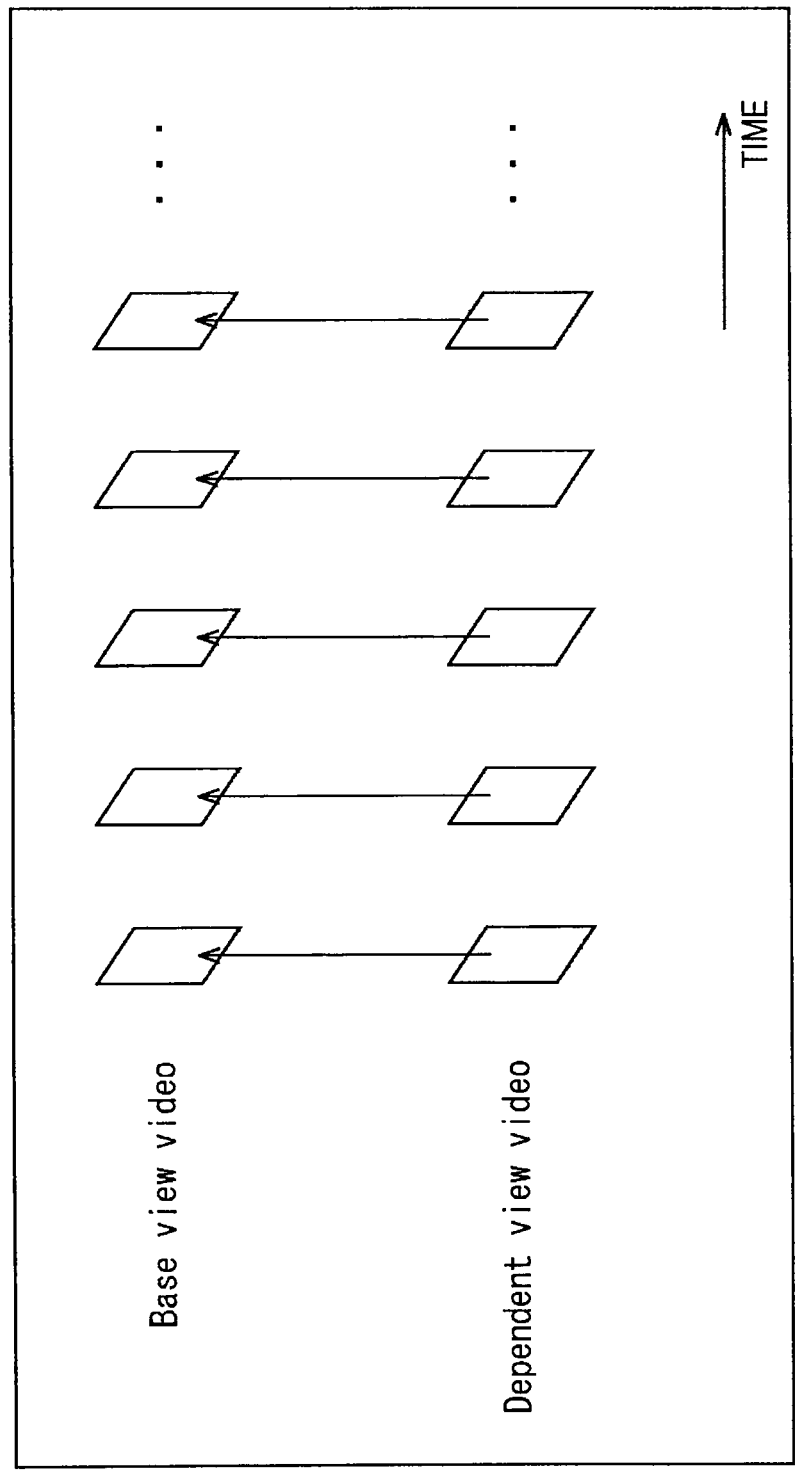
FIG. 4 is a diagram illustrating an example of reference images.

Predictive coding using another stream as a reference image is not permitted in Base view video. However, as illustrated in FIG. 4, predictive coding using Base view video as a reference image is permitted for Dependent view video. For example, in a case where encoding is performed with an L image being Base view video and with an R image being Dependent view video, the data amount of a Dependent view video stream obtained thereby is smaller than the data amount of a Base view video stream.

Note that, since the encoding is based on H.264/AVC, prediction in the time direction is performed on Base view video. Also, prediction in the time direction is performed as well as prediction between views on Dependent view video. In order to decode the Dependent view video, it is necessary that decoding of the corresponding Base view video, which is referred to during encoding, is previously ended.

The Dependent view video encoder 24 outputs the Dependent view video stream, which is obtained through the encoding using such prediction between views, to the multiplexer 25.

The multiplexer 25 multiplexes the Base view video stream supplied from the H.264/AVC encoder 21, the Dependent view video stream (data of Depth) supplied from the Depth calculating unit 23, and the Dependent view video stream supplied from the Dependent view video encoder 24 into an MPEG2 TS, for example. The Base view video stream and the Dependent view video stream may be multiplexed into a single MPGE2 TS, or may be included in separate MPEG2 TSs.

The multiplexer 25 outputs the generated TS (MPEG2 TS). The TS output from the multiplexer 25 is recorded on the optical disc 2, together with other management data, in a recording device, and is provided to the playback device 1 while being recorded on the optical disc 2.

In a case where Dependent view video that is used together with Base view video in the type-1 display method needs to be distinguished from Dependent view video (Depth) that is used together with Base view video in the type-2 display method, the former is referred to as D1 view video, and the latter is referred to as D2 view video.

Also, 3D playback in the type-1 display method, which is performed using Base view video and D1 view video, is referred to as B-D1 playback. 3D playback in the type-2 display method, which is performed using Base view video and D2 view video, is referred to as B-D2 playback.

In the case of performing B-D1 playback in response to an instruction or the like provided from a user, the playback device 1 reads a Base view video stream and a D1 view video stream from the optical disc 2 and plays them back.

Also, in the case of performing B-D2 playback, the playback device 1 reads a Base view video stream and a D2 view video stream from the optical disc 2 and plays them back.

Further, in the case of performing playback of an ordinary 2D image, the playback device 1 reads only a Base view video stream from the optical disc 2 and plays it back.

Since the Base view video stream is an AVC video stream encoded with H.264/AVC, and thus any player compatible with the BD format can play back the Based view video stream to display a 2D image.

Hereafter, a description will be given mainly of a case where the Dependent view video is the D1 view video. A simple mention as Dependent view video corresponds to the D1 view video. Likewise, the D2 view video is recorded on the optical disc 2 and is played back in the same manner as for the D1 view video.

[Configuration Example of TS]

Figure 5:
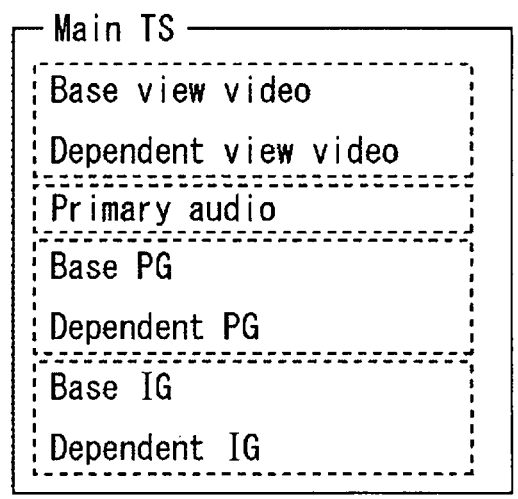
FIG. 5 is a diagram illustrating a configuration example of TS.

FIG. 5 is a diagram illustrating a configuration example of TS.

The streams of Base view video, Dependent view video, Primary audio, Base PG, Dependent PG, Base IG, and Dependent IG are multiplexed into a Main TS in FIG. 5. In this way, the Dependent view video stream may be included in the Main TS together with the Base view video stream.

A Main TS and a Sub TS are recorded on the optical disc 2. The Main TS is a TS including at least a Base view video stream. The Sub TS is a TS that includes streams other than the Base view video stream and that is used together with the Main TS.

The streams of Base view and Dependent view are prepared also for PG and IG described below so that 3D display is available as in video.

The plane of Base view of PG and IG obtained by decoding the individual streams is displayed by being combined with the plane of Base view video obtained by decoding the Base view video stream. Likewise, the plane of Dependent view of PG and IG is displayed by being combined with the plane of Dependent view video obtained by decoding the Dependent view video stream.

For example, in a case where the Base view video stream is a stream of an L image and the Dependent view video stream is a stream of an R image, the streams of Base view of PG and IG are graphics streams of the L image. Also, the PG stream and IG stream of Dependent view are graphics streams of the R image.

On the other hand, in a case where the Base view video stream is a stream of an R image and the Dependent view video stream is a stream of an L image, the streams of Base view of PG and IG are graphics streams of the R image. Also, the PG stream and IG stream of Dependent view are graphics streams of the L image.

Figure 6:
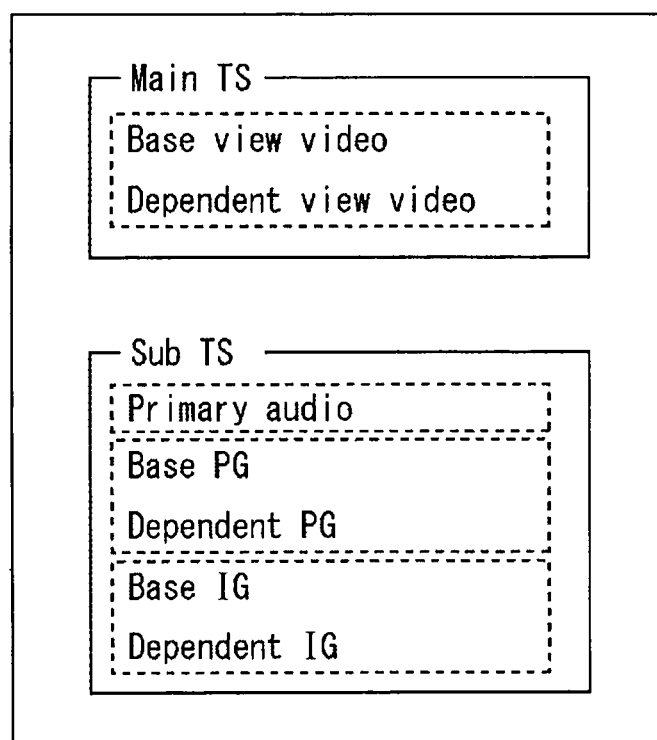
FIG. 6 is a diagram illustrating another configuration example of TS.

FIG. 6 is a diagram illustrating another configuration example of TS.

The streams of Base view video and Dependent view video are multiplexed into the Main TS in FIG. 6.

On the other hand, the streams of Primary audio, Base PG, Dependent PG, Base IG, and Dependent IG are multiplexed into the Sub TS.

In this way, video streams may be multiplexed into the Main TS, and the streams of PG and IG may be multiplexed into the Sub TS.

Figure 7:
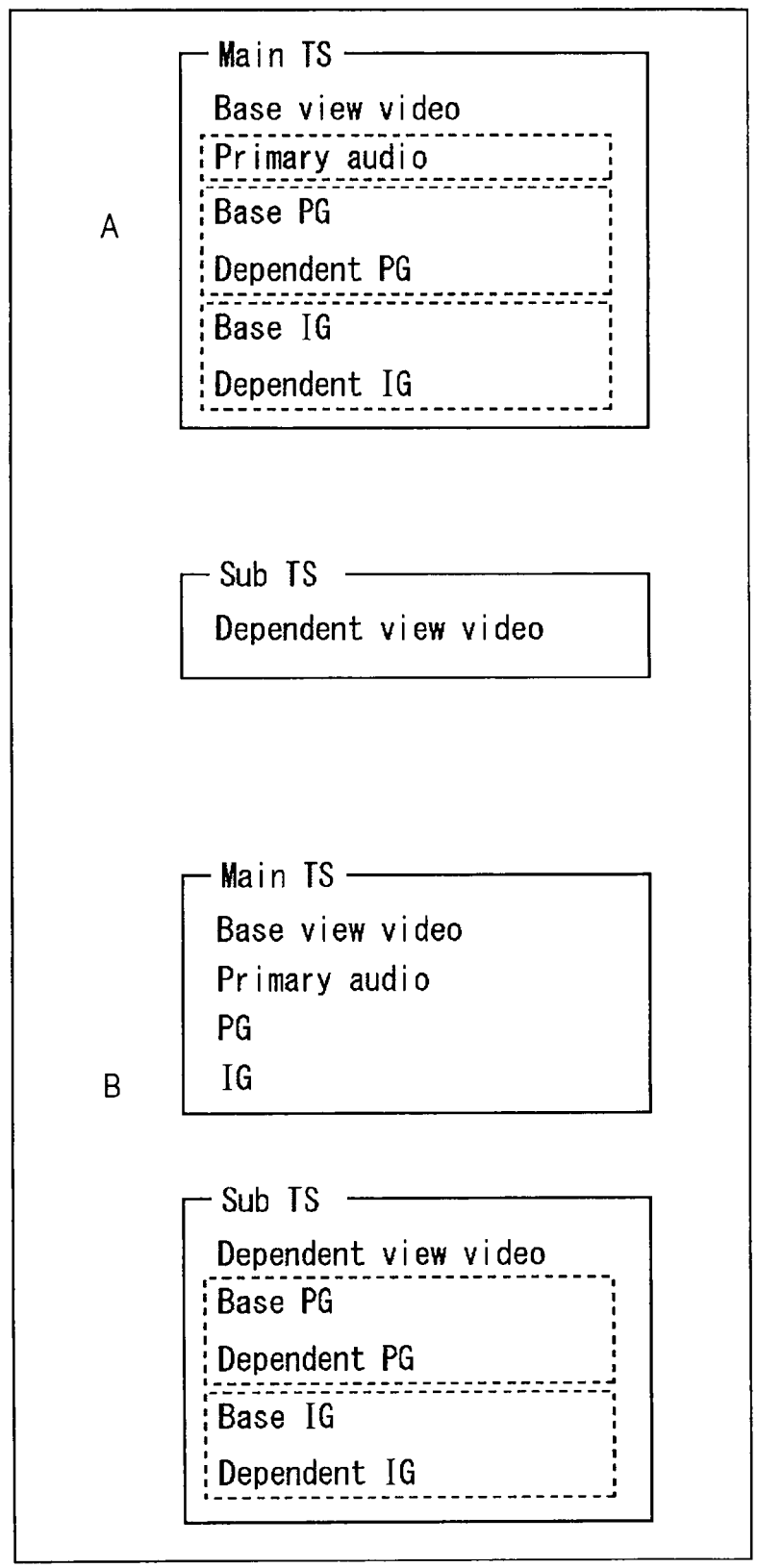
FIG. 7 is a diagram illustrating still another configuration example of TS.

FIG. 7 is a diagram illustrating still another configuration example of TS.

The streams of Base view video, Primary audio, Base PG, Dependent PG, Base IG, and Dependent IG are multiplexed into the Main TS in part A of FIG. 7.

On the other hand, a Dependent view video stream is included in the Sub TS.

In this way, a Dependent view video stream may be included in a TS different from a TS including a Base view video stream.

The streams of Base view video, Primary audio, PG, and IG are multiplexed into the Main TS in part B of FIG. 7. On the other hand, the streams of Dependent view video, Base PG, Dependent PG, Base IG, and Dependent IG are multiplexed into the Sub TS.

The PG and IG included in the Main TS are streams for 2D playback. The streams included in the Sub TS are streams for 3D playback.

In this way, the stream of PG and the stream of IG may not be shared by 2D playback and 3D playback.

As described above, the Base view video stream and the Dependent view video stream may be included in different MPEG2 TSs. A description will be given of an advantage of the case of recording the Base view video stream and the Dependent view video stream while causing the streams to be included in different MPEG2 TSs.

For example, assume a case where a bit rate allowed for multiplexing into a single MPEG2 TS is limited. In this case, when both the Base view video stream and the Dependent view video stream are included in a single MPEG2 TS, the bit rates of the respective streams need to be reduced in order to satisfy the constraint. As a result, the image quality degrades.

The necessity for reducing the bit rate is eliminated by causing the streams to be included in different MPEG2 TSs, so that degradation of the image quality can be prevented.

[Application Format]

Figure 8:
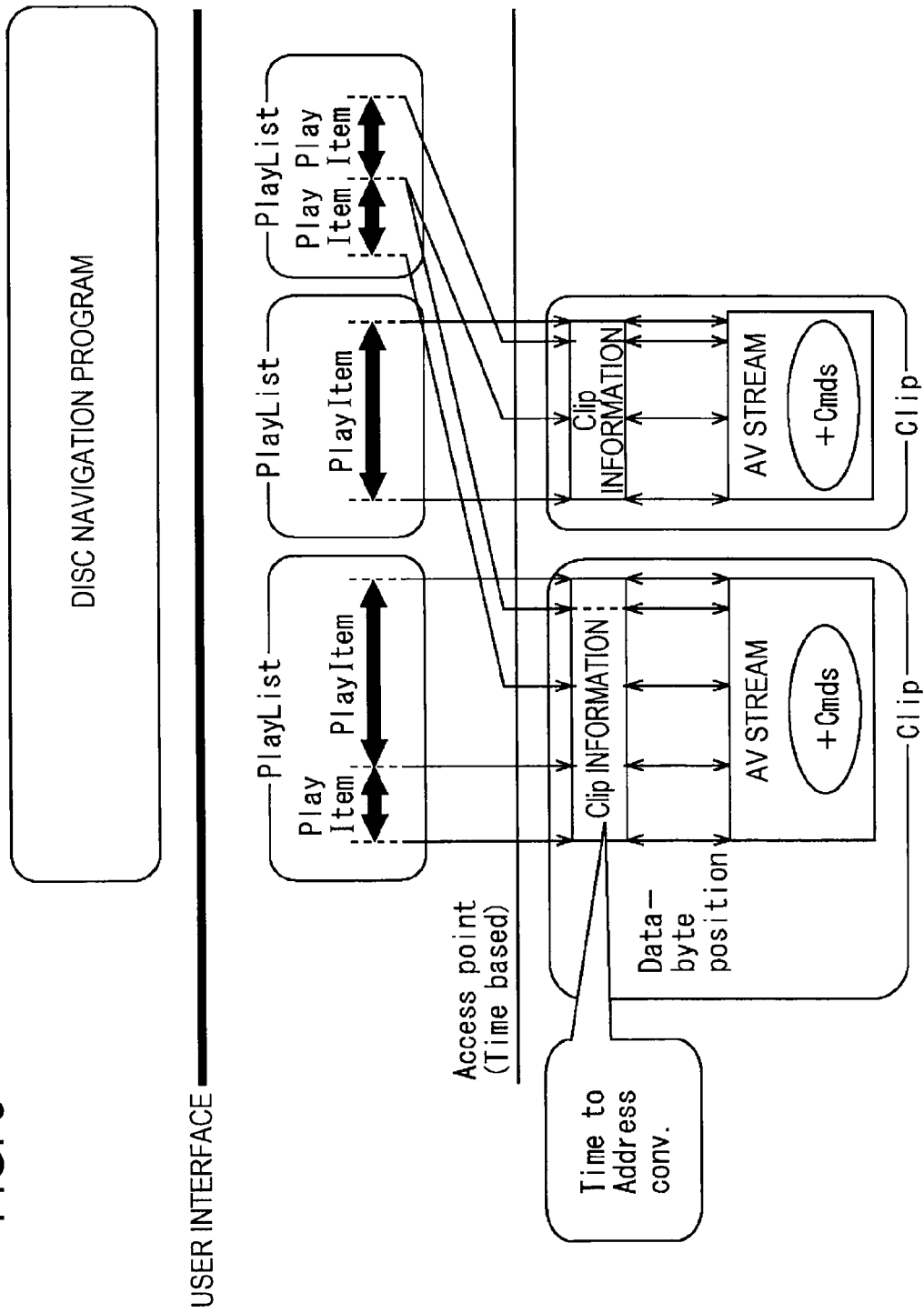
FIG. 8 is a diagram illustrating an example of management of AV streams.

FIG. 8 is a diagram illustrating an example of management of AV streams performed by the playback device 1.

The management of AV streams is performed by using two layers of PlayList and Clip, as illustrated in FIG. 8. AV streams may be recorded on a local storage of the playback device 1, as well as the optical disc 2.

Here, a pair of one AV stream and Clip Information, which is information accompanying the AV stream, is regarded as one object, which is referred to as Clip. Hereafter, a file storing an AV stream is referred to as an AV stream file. Also, a file storing Clip Information is referred to as a Clip Information file.

An AV stream is laid on a time axis, and an access point of each Clip is specified mainly by a time stamp in PlayList. A Clip Information file is used for finding an address at which decoding is to be started in the AV stream, for example.

PlayList is a set of playback sections of an AV stream. One playback section in an AV stream is called PlayItem. PlayItem is expressed by a pair of an IN point and an OUT point of a playback section on the time axis. As illustrated in FIG. 8, PlayList is composed of one or a plurality of PlayItems.

The first PlayList from the left in FIG. 8 is composed of two PlayItems, and the first-half portion and the latter-half portion of the AV stream included in the Clip on the left are referred to by those two PlayItems, respectively.

The second PlayList from the left is composed of one PlayItem, and the entire AV stream included in the Clip on the right is referred to thereby.

The third PlayList from the left is composed of two PlayItems, and a certain portion of the AV stream included in the Clip on the left and a certain portion of the AV stream included in the Clip on the right are referred to by those two PlayItems, respectively.

For example, in a case where the PlayItem on the left included in the first PlayList from the left is specified as a playback target by a disc navigation program, playback of the first-half portion of the AV stream included in the Clip on the left, which is referred to by the PlayItem, is performed. In this way, PlayLists are used as playback management information for managing playback of AV streams.

In PlayList, a playback path made up of an array of one or more PlayItems is referred to as Main Path.

Also, in PlayList, a playback path made up of an array of one or more SubPlayItems parallel with the Main Path is referred to as Sub Path.

Figure 9:
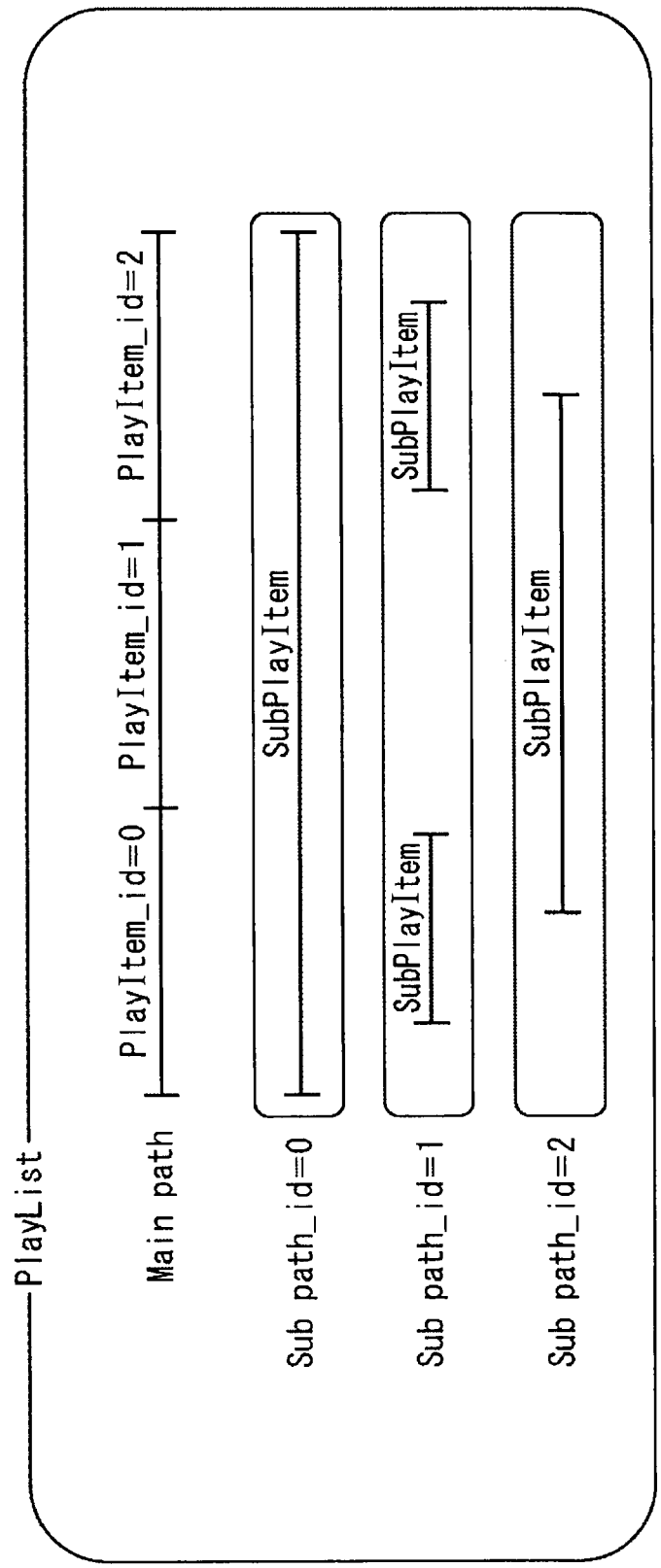
FIG. 9 is a diagram illustrating structures of Main Path and Sub Path.

FIG. 9 is a diagram illustrating structures of Main Path and Sub Path.

PlayList can have one Main Path and one or more Sub Paths.

The above-described Base view video stream is managed as a stream that the PlayItem constituting a Main Path refers to. Also, the Dependent view video stream is managed as a stream that SubPlayItem constituting a Sub Path refers to.

The PlayList in FIG. 9 has one Main Path composed of an array of three PlayItems and three Sub Paths.

IDs are set to the PlayItems constituting the Main Path in order from the head. IDs are also set to the Sub Paths, Subpath_id=0, Subpath_id=1, and Subpath_id=2 in order from the head.

In the example in FIG. 9, one SubPlayItem is included in the Sub Path with Subpath_id=0, and two SubPlayItems are included in the Sub Path with Subpath_id=1. Also, one SubPlayItem is included in the Sub Path with Subpath_id=2.

A Clip AV stream referred to by one PlayItem includes at least a video stream (main image data).

In addition, the Clip AV stream may include or may not include one or more audio streams that are played back at the same timing as (in synchronization with) the video stream included in the Clip AV stream.

The Clip AV stream may include or may not include one or more streams of bitmap caption data (PG (Presentation Graphic)) that are played back in synchronization with the video stream included in the Clip AV stream.

The Clip AV stream may include or may not include one or more streams of IG (Interactive Graphic) that are played back in synchronization with the video stream included in a Clip AV stream file. The stream of IG is used for displaying a graphic, such as a button operated by a user.

In the Clip AV stream referred to by one PlayItem, a video stream, zero or more audio streams that are played back in synchronization therewith, zero or more PG streams, and zero or more IG streams are multiplexed.

Also, one SubPlayItem refers to a video stream, an audio stream, a PG stream, or the like of a stream different from the Clip AV stream referred to by PlayItem (another stream).

The management of AV streams using such PlayList, PlayItem, and SubPlayItem is described in Japanese Unexamined Patent Application Publication No. 2008-252740 and Japanese Unexamined Patent Application Publication No. 2005-348314, for example.

[Directory Structure]

Figure 10:
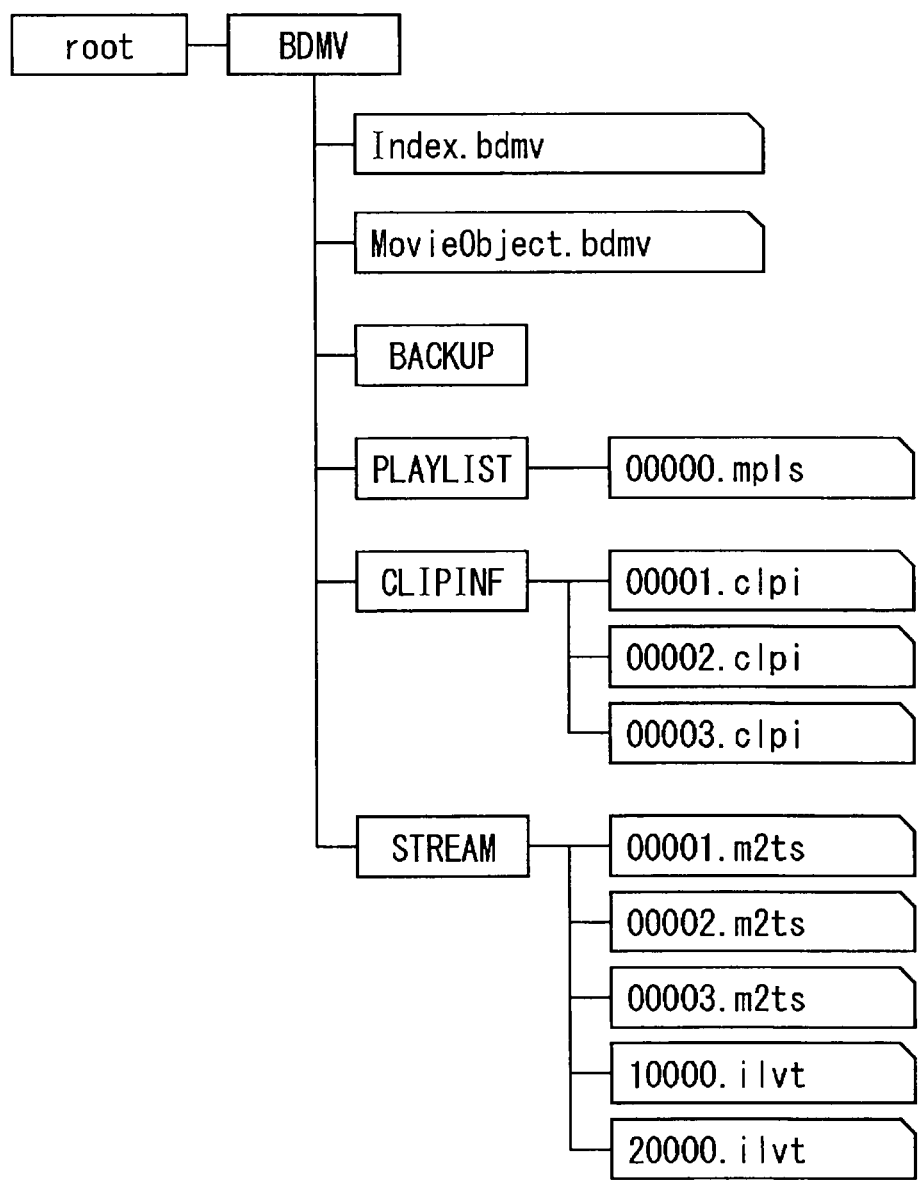
FIG. 10 is a diagram illustrating an example of a management structure of files recorded on an optical disc.

FIG. 10 is a diagram illustrating an example of a management structure of files recorded on the optical disc 2.

As illustrated in FIG. 10, files are hierarchically managed by a directory structure. One root directory is created on the optical disc 2. The underneath of the root directory is a range that is managed by one recording/playback system.

A BDMV directory is placed under the root directory.

An Index file, which is a file with a name "Index.bdmv" being set, and a MovieObject file, which is a file with a name "MovieObject.bdmv" being set, are stored immediately under the BDMV directory.

A BACKUP directory, a PLAYLIST directory, a CLIPINF directory, a STREAM directory, and so forth are provided under the BDMV directory.

PlayList files describing PlayList are stored in the PLAYLIST directory. A name composed of a five-digit number and an extension ".mpls" is set to each PlayList file. A file name "00000.mpls" is set to one PlayList file illustrated in FIG. 10.

Clip Information files are stored in the CLIPINF directory. A name composed of a five-digit number and an extension ".clpi" is set to each Clip Information file.

File names "00001.clpi", "00002.clpi", and "00003.clpi" are set to the three Clip Information files in FIG. 10, respectively. Hereafter, Clip Information files are referred to as clpi files as necessary.

For example, the clpi file "00001.clpi" is a file in which information about Clip of Base view video is described.

The clpi file "00002.clpi" is a file in which information about Clip of D2 view video is described.

The clpi file "00003.clpi" is a file in which information about Clip of D1 view video is described.

Stream files are stored in the STREAM directory. A name composed of a five-digit number and an extension ".m2ts" or a name composed of a five-digit number and an extension ".ilvt" is set to each stream file. Hereafter, a file to which the extension ".m2ts" is set is referred to as an m2ts file as necessary. Also, a file to which the extension ".ilvt" is set is referred to as an ilvt file.

The m2ts file "00001.m2ts" is a file for 2D playback. Read of a Base view video stream is performed by specifying this file.

The m2ts file "00002.m2ts" is a file of a D2 view video stream, and the m2ts file "00003.m2ts" is a file of a D1 view video stream.

The ilvt file "10000.ilvt" is a file for B-D1 playback. Read of a Base view video stream and a D1 view video stream is performed by specifying this file.

The ilvt file "20000.ilvt" is a file for B-D2 playback. Read of a Base view video stream and a D2 view video stream is performed by specifying this file.

In addition to the directories illustrated in FIG. 10, a directory storing a file of an audio stream and the like are provided under the BDMV directory.

[Syntax of Each Piece of Data]

FIG. 11 is a diagram illustrating the syntax of a PlayList file.

The PlayList file is a file that is stored in the PLAYLIST directory in FIG. 10 and that has an extension ".mpls" being set.

type_indicator in FIG. 11 represents the type of a file "xxxxx.mpls".

version_number represents the version number of "xxxx.mpls". version_number is composed of a four-digit number. For example, "0240" representing "3D Spec version" is set to a PlayList file for 3D playback.

PlayList_start_address represents the start address of PlayList( ), with the number of relative bytes from the first byte of the PlayList file being unit.

PlayListMark_start_address represents the start address of PlayListMark( ), with the number of relative bytes from the first byte of the PlayList file being unit.

ExtensionData_start_address represents the start address of ExtensionData( ), with the number of relative bytes from the first byte of the PlayList file being unit.

160 bits of reserved_for_future_use is included after ExtensionData_start_address.

Parameters regarding playback control of a PlayList, such as playback restrictions, are stored in AppInfoPlayList( ).

Parameters regarding a Main Path, a Sub Path, and so forth are stored in PlayList( ). The content of PlayList( ) will be described below.

Mark information of a PlayList, that is, information about a mark, which is a jump destination (jump point) in a user operation or command for instructing chapter jump or the like, is stored in PlayListMark( ).

Private data may be inserted into ExtensionData( ).

FIG. 12 is a diagram illustrating a specific example of the description of a PlayList file.

As illustrated in FIG. 12, 2-bit 3D_PL_type and 1-bit view_type are described in the PlayList file.

3D_PL_type represents the type of PlayList.

view_type represents whether the Base view video stream of which playback is managed by a PlayList is a stream of an L image (L view) or a stream of an R image (R view).

FIG. 13 is a diagram illustrating the meanings of the values of 3D_PL_type.

The value 00 of 3D_PL_type represents a PlayList for 2D playback.

The value 01 of 3D_PL_type represents a PlayList for B-D1 playback of 3D playback.

The value 10 of 3D_PL_type represents a PlayList for B-D2 playback of 3D playback.

For example, in a case where the value of 3D_PL_type is 01 or 10, 3DPlayList information is registered in ExtensitionData( ) of the PlayList file. For example, as the 3DPlayList information, information about read of a Base view video stream and a Dependent view video stream from the optical disc 2 is registered.

FIG. 14 is a diagram illustrating the meanings of the values of view_type.

In the case of performing 3D playback, the value 0 of view_type represents that a Base view video stream is an L view stream. In the case of performing 2D playback, the value 0 of view_type represents that a Base view video stream is an AVC video stream.

The value 1 of view_type represents that a Base view video stream is an R view stream.

The description of view_type in the PlayList file enables the playback device 1 to identify whether the Base view video stream is an L view stream or an R view stream.

For example, in a case where a video signal is output to the display device 3 via an HDMI cable, the playback device 1 may be required to output an L view signal and an R view signal while distinguishing them from each other.

By causing the playback device 1 to be able to identify whether a Base view video stream is an L view stream or an R view stream, the playback device 1 can output an L view signal and an R view signal while distinguishing them from each other.

FIG. 15 is a diagram illustrating the syntax of PlayList( ) in FIG. 11.

length is a 32-bit integer without sign, indicating the number of bytes from immediately after this length field to the end of PlayList( ). That is, length represents the number of bytes from reserved_for_future_use to the and of PlayList.

16-bit reserved_for_future_use is prepared after length.

number_of_PlayItems is a 16-bit field showing the number of PlayItems existing in the PlayList. In the case of the example in FIG. 9, the number of PlayItems is 3. The value of PlayItem_id is assigned from 0 in order wherein PlayItem( ) appears in the PlayList. For example, PlayItem_id=0, 1, and 2 in FIG. 9 are assigned.

number_of_SubPaths is a 16-bit field showing the number of Sub Paths existing in the PlayList. In the case of the example in FIG. 9, the number of Sub Paths is 3. The value of SubPath_id is assigned from 0 in order wherein SubPath( ) appears in the PlayList. For example, Subpath_id=0, 1, and 2 in FIG. 9 are assigned. In the subsequent for sentence, PlayItem( ) is referred to by the number of PlayItems, and SubPath( ) is referred to by the number of Sub Paths.

FIG. 16 is a diagram illustrating the syntax of SubPath( ) in FIG. 15.

length is a 32-bit integer without sign, indicating the number of bytes from immediately after this length field to the end of Sub Path( ). That is, length represents the number of bytes from reserved_for_future_use to the and of PlayList.

16-bit reserved_for_future_use is prepared after length.

SubPath_type is an 8-bit field showing the type of application of Sub Path. SubPath_type is used for indicating the type, for example, whether the Sub Path is audio, bitmap caption, or text caption.

15-bit reserved_for_future_use is prepared after SubPath_type.

is_repeat_SubPath is a 1-bit field specifying a playback method of the Sub Path, and indicates whether playback of the Sub Path is repeatedly performed during playback of the Main Path, or playback of the Sub Path is performed only once. For example, this field is used in a case where playback timings of Clip referred to by the Main Path and Clip referred to by the Sub Path are different (in a case where the Main Path is used as a path of slide show of still images and where the Sub Path is used as a path of audio serving as BGM, for example).

8-bit reserved_for_future_use is prepared after is_repeat_SubPath.

number_of_SubPlayItems is an 8-bit field showing the number of SubPlayItems (number of entries) existing in one Sub Path. For example, number_of_SubPlayItems of SubPlayItems of the SubPath_id=0 in FIG. 9 is 1, and number_of_SubPlayItems of SubPlayItems of the SubPath_id=1 is 2. In the subsequent for sentence, SubPlayItem( ) is referred to by the number of SubPlayItems.

FIG. 17 is a diagram illustrating the syntax of SubPlayItem (i) in FIG. 16.

length is a 16-bit integer without sign, indicating the number of bytes from immediately after this length field to the end Sub playItem( ).

SubPlayItem(i) in FIG. 17 is described for both the cases where SubPlayItem refers to one Clip and where SubPlayItem refers to a plurality of Clips.

A description will be given of a case where SubPlayItem refers to one Clip.

Clip_Information_file_name[0] represents Clip to be referred to.

Clip_codec_identifier[0] represents a codec method of Clip. reserved_for_future_use is included after Clip_codec_identifier[0].

is_multi_Clip_entries is a flag showing whether multi Clips are registered or not. If the flag of is_multi_Clip_entries stands, the syntax in a case where SubPlayItem refers to a plurality of Clips is referred to.

ref_to_STC_id[0] is information about an STC discontinuous point (a discontinuous point of system time base).

SubPlayItem_IN_time represents the start position of a playback section of the Sub Path, and SubPlayItem_OUT_time represents the end position.

sync_PlayItem_id and sync_start_PTS_of_PlayItem represent the time when the Sub Path starts playback on the time axis of the Main Path.

SubPlayItem_IN_time, SubPlayItem_OUT_time, sync_PlayItem_id, and sync_start_PTS_of_PlayItem are commonly used in the Clip referred to by the SubPlayItem.

A description will be given of a case where "if (is_multi_Clip_entries==1b" and where the SubPlayItem refers to a plurality of Clips.

num_of_Clip_entries represents the number of Clips to be referred to. The number of Clip_Information_file_name [SubClip_entry_id] specifies the number of Clips except Clip_Information_file_name[0].

Clip_codec_identifier[SubClip_entry_id] represents a codec method of Clip.

ref_to_STC_id[SubClip_entry_id] is information about an STC discontinuous point (a discontinuous point of system time base). reserved_for_future_use is included after ref_to_STC_id[SubClip_entry_id].

FIG. 18 is a diagram illustrating the syntax of PlayItem( ) in FIG. 15.

length is a 16-bit integer without sign, indicating the number of bytes from immediately after this length field to the end of PlayItem( ).

Clip_Information_file_name[0] represents the name of a Clip Information file of the Clip referred to by the PlayItem. Note that the same 5-digit number is included in the file name of an mt2s file including the Clip and the file name of the Clip Information file corresponding thereto.

Clip_codec_identifier[0] represents a codec method of the Clip. reserved_for_future_use is included after Clip_codec_identifier[0]. is_multi_angle and connection_condition are included after reserved_for_future_use.

ref_to_STC_id[0] is information about an STC discontinuous point (a discontinuous point of system time base).

IN_time represents the start position of the playback section of the PlayItem, and OUT_time represents the end position.

UO_mask_table( ), PlayItem_random_access_mode, and still_mode are included after OUT_time.

STN_table( ) includes information about an AV stream referred to by a target PlayItem. Also, in a case where there is a Sub Path that is to be played back while being associated with the target PlayItem, information about an AV stream referred to by the SubPlayItem constituting the Sub Path is also included.

FIG. 19 is a diagram illustrating the syntax of STN_table( ) in FIG. 18.

STN_table( ) is set as the attribute of PlayItem.

length is a 16-bit integer without sign, indicating the number of bytes from immediately after this length field to the end of STN_table( ). 16-bit reserved_for_future_use is prepared after length.

number_of_video_stream_entries represents the number of streams that are entered (registered) in STN_table( ) and that are provided with video_stream_id.

video_stream_id is information for identifying a video stream. For example, a Base view video stream is specified by this video_stream_id.

The ID of a Dependent view video stream may be defined in STN_table( ), or may be obtained through calculation, e.g., by adding a predetermined value to the ID of the Base view video stream.

video_stream_number is a video stream number that is used for video switching and that is viewed from a user.

number_of_audio_stream_entries represents the number of streams of the first audio stream provided with audio_stream_id, which is entered in the STN_table( ). audio_stream_id is information for identifying an audio stream, and audio_stream_number is an audio stream number that is used for audio switching and that is viewed from the user.

number_of_audio_stream2_entries represents the number of streams of the second audio stream provided with audio_stream_id2, which is entered in the STN_table( ). audio_stream_id2 is information for identifying an audio stream, and audio_stream_number is an audio stream number that is used for audio switching and that is viewed from the user. In this example, audio to be played back can be switched.

number_of_PG_txtST_stream_entries represents the number of streams provided with PG_txtST_stream_id, which is entered in the STN_table( ). Among these, a PG stream and a text caption file (txtST) obtained by performing run length coding on bitmap caption are entered. PG_txtST_stream_id is information for identifying a caption stream, and PG_txtST_stream_number is a caption stream number that is used for caption switching and that is viewed from the user.

number_of_IG_stream_entries represents the number of streams provided with IG_stream_id, which are entered in the STN_table( ). Among these, an IG stream is entered. IG_stream_id is information for identifying an IG stream, and IG_stream_number is a graphics stream number that is used for graphics switching and that is viewed from the user.

The IDs of a Main TS and a Sub TS are also registered in the STN_table( ). It is described in stream_attribute( ) that the ID thereof is not the ID of an elementary stream but the ID of a TS.

[Configuration Example of Playback Device 1]

Figure 20:
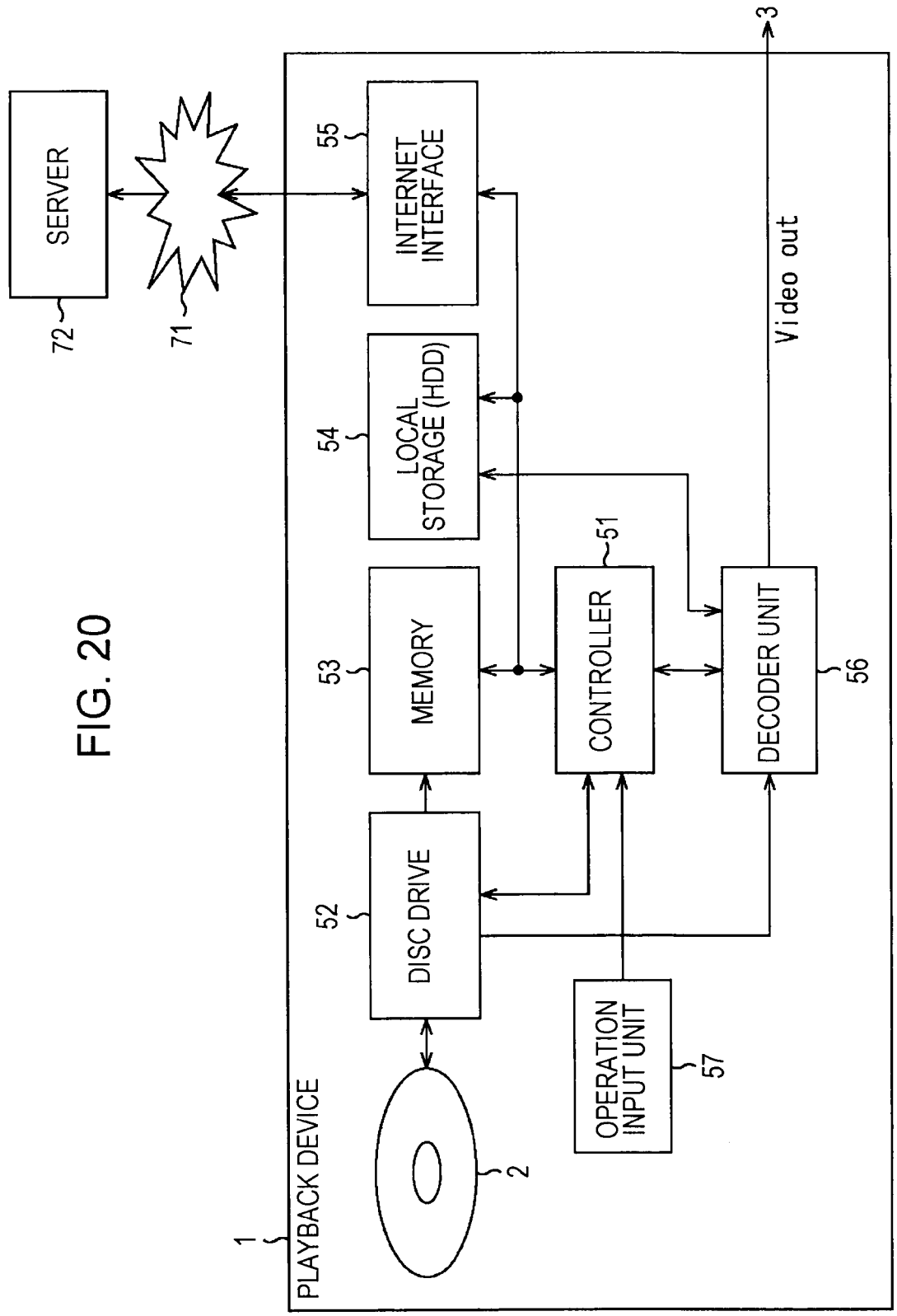
FIG. 20 is a block diagram illustrating a configuration example of a playback device.

FIG. 20 is a block diagram illustrating a configuration example of the playback device 1.

A controller 51 executes a control program provided in advance, so as to control the entire operation of the playback device 1.

For example, the controller 51 controls a disc drive 52 to read a PlayList file for 3D playback. Also, the controller 51 causes a Main TS and a Sub TS to be read on the basis of IDs registered in the STN_table and to be supplied to a decoder unit 56.

The disc drive 52 reads data from the optical disc 2 in accordance with the control by the controller 51 and outputs the read data to the controller 51, a memory 53, or the decoder unit 56.

The memory 53 stores data that is necessary for the controller 51 to execute various processes as necessary.

A local storage 54 is constituted by, for example, an HDD (Hard Disk Drive). A Dependent view video stream or the like downloaded from a server 72 is recorded on the local storage 54. The stream recorded on the local storage 54 is also supplied to the decoder unit 56 as necessary.

An Internet interface 55 performs communication with the server 72 via a network 71 in accordance with the control by the controller 51, and supplies data downloaded from the server 72 to the local storage 54.

Data for updating the data recorded on the optical disc 2 is downloaded from the server 72. By enabling the downloaded Dependent view video stream to be used together with a Base view video stream recorded on the optical disc 2, 3D playback of content different from the content in the optical disc 2 can be realized. When the Dependent view video stream is downloaded, the content of the PlayList is also updated as necessary.

The decoder unit 56 decodes the stream supplied from the disk drive 52 or the local storage 54 and outputs a video signal obtained thereby to the display device 3. An audio signal is also output to the display device 3 via a predetermined path.

An operation input unit 57 includes input devices, such as a button, key, touch panel, jog dial, and mouse, and a receiving unit for receiving a signal such as an infrared ray transmitted from a predetermined remote commander. The operation input unit 57 detects a user operation and supplies a signal representing the content of the detected operation to the controller 51.

Figure 21:
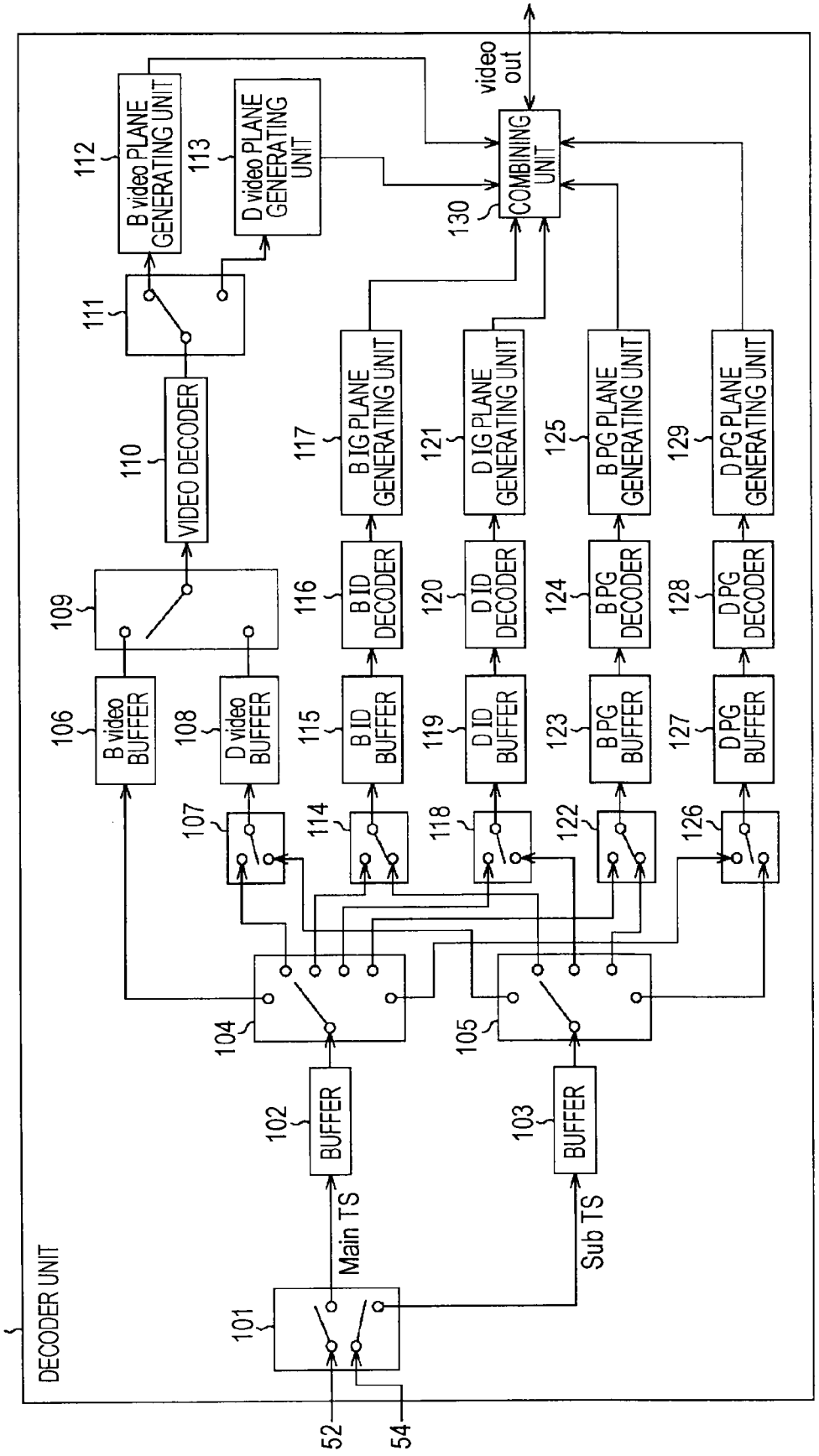
FIG. 21 is a diagram illustrating a configuration example of a decoder unit in FIG. 20.

FIG. 21 is a diagram illustrating a configuration example of the decoder unit 56.

FIG. 21 illustrates a configuration for processing a video signal. In the decoder unit 56, a decoding process of an audio signal is also performed. A result of the decoding process performed on an audio signal is output to the display device 3 via a path that is not illustrated.

A PID filter 101 identifies whether a TS supplied from the disc drive 52 or the local storage 54 is a Main TS or a Sub TS on the basis of the PIDs of packets constituting the TS or the ID of the stream. The PID filter 101 outputs a Main TS to a buffer 102 and outputs a Sub TS to a buffer 103.

A PID filter 104 sequentially reads the packets of the Main TS stored in the buffer 102 and sorts them on the basis of the PIDs.

For example, the PID filter 104 outputs the packets constituting a Base view video stream included in the Main TS to a B video buffer 106, and outputs the packets constituting a Dependent view video stream to a switch 107.

Also, the PID filter 104 outputs the packets constituting a Base IG stream included in the Main TS to a switch 114, and outputs the packets constituting a Dependent IG stream to a switch 118.

The PID filter 104 outputs the packets constituting a Base PG stream included in the Main TS to a switch 122, and outputs the packets constituting a Dependent PG stream to a switch 126.

As described with reference to FIG. 5, the streams of Base view video, Dependent view video, Base PG, Dependent PG, Base IG, and Dependent IG may be multiplexed into a Main TS.

A PID filter 105 sequentially reads the packet of the Sub TS stored in the buffer 103 and sorts them on the basis of the PIDs.

For example, the PID filter 105 outputs the packets constituting a Dependent view video stream included in the Sub TS to the switch 107.

Also, the PID filter 105 outputs the packets constituting a Base IG stream included in the Sub TS to the switch 114, and outputs the packets constituting a Dependent IG stream to the switch 118.

The PID filter 105 outputs the packets constituting a Base PG stream included in the Sub TS to the switch 122, and outputs the packets constituting a Dependent PG stream to the switch 126.

As described with reference to FIG. 7, a Dependent view video stream may be included in a Sub TS. Also, as described with reference to FIG. 6, the streams of Base PG, Dependent PG, Base IG, and Dependent IG may be multiplexed into a Sub TS.

The switch 107 outputs the packets constituting the Dependent view video stream supplied from the PID filter 104 or the PID filter 105 to a D video buffer 108.

A switch 109 sequentially reads the packets of Base view video stored in the B video buffer 106 and the packets of Dependent view video stored in the D video buffer 108 in accordance with time information that specifies the timing of decoding. Identical time information is set to a packet that stores the data of a certain picture of Base view video and a packet that stores the data of the picture of Dependent view video corresponding thereto.

The switch 109 outputs the packets read from the B video buffer 106 or the D video buffer 108 to a video decoder 110.

The video decoder 110 decodes the packets supplied from the switch 109 and outputs the data of Base view video or Dependent view video obtained through the decoding to a switch 111.

The switch 111 outputs the data obtained by decoding the packets of Base view video to a B video plane generating unit 112, and outputs the data obtained by decoding the packets of Dependent view video to a D video plane generating unit 113.

The B video plane generating unit 112 generates a plane of Base view video on the basis of the data supplied from the switch 111, and outputs it to a combining unit 130.

The D video plane generating unit 113 generates a plane of Dependent view video on the basis of the data supplied from the switch 111, and outputs it to the combining unit 130.

The switch 114 outputs the packets constituting the Base IG stream supplied from the PID filter 104 or the PID filter 105 to a B IG buffer 115.

A B IG decoder 116 decodes the packets constituting the Base IG stream stored in the B IG buffer 115, and outputs the data obtained through the decoding to a B IG plane generating unit 117.

The B IG plane generating unit 117 generates a plane of Base IG on the basis of the data supplied from the B IG decoder 116, and outputs it to the combining unit 130.

The switch 118 outputs the packets constituting the Dependent IG stream supplied from the PID filter 104 or the PID filter 105 to a D IG buffer 119.

A D IG decoder 120 decodes the packets constituting the Dependent IG stream stored in the D IG buffer 119, and outputs the data obtained through the decoding to a D IG plane generating unit 121.

The D IG plane generating unit 121 generates a plane of Dependent IG on the basis of the data supplied from the D IG decoder 120, and outputs it to the combining unit 130.

The switch 122 outputs the packets constituting the Base PG stream supplied from the PID filter 104 or the PID filter 105 to a B PG buffer 123.

A B PG decoder 124 decodes the packets constituting the Base PG stream stored in the B PG buffer 123, and outputs the data obtained through the decoding to a B PG plane generating unit 125.

The B PG plane generating unit 125 generates a plane of Base PG on the basis of the data supplied from the B PG decoder 124, and outputs it to the combining unit 130.

The switch 126 outputs the packets constituting the Dependent PG stream supplied from the PID filter 104 or the PID filter 105 to a D PG buffer 127.

A D PG decoder 128 decodes the packets constituting the Dependent PG stream stored in the D PG buffer 127, and outputs the data obtained through the decoding to a D PG plane generating unit 129.

The D PG plane generating unit 129 generates a plane of Dependent PG on the basis of the data supplied from the D PG decoder 128, and outputs it to the combining unit 130.

The combining unit 130 combines the plane of Base view video supplied from the B video plane generating unit 112, the plane of Base IG supplied from the B IG plane generating unit 117, and the plane of Base PG supplied from the B PG plane generating unit 125 by stacking them in a predetermined order, thereby generating a plane of Base view.

Also, the combining unit 130 combines the plane of Dependent view video supplied from the D video plane generating unit 113, the plane of Dependent IG supplied from the D IG plane generating unit 121, and the plane of Dependent PG supplied from the D PG plane generating unit 129 by stacking them in a predetermined order, thereby generating a plane of Dependent view.

The combining unit 130 outputs the data of the plane of Base view and the plane of Dependent view. The video data output from the combining unit 130 is output to the display device 3, and the plane of Base view and the plane of Dependent view are alternately displayed, whereby 3D display is performed.

[First Example of T-STD (Transport Stream-System. Target Decoder)]

Now, a description will be given of the configuration of the decoder and its surroundings in the configuration illustrated in FIG. 21.

Figure 22:
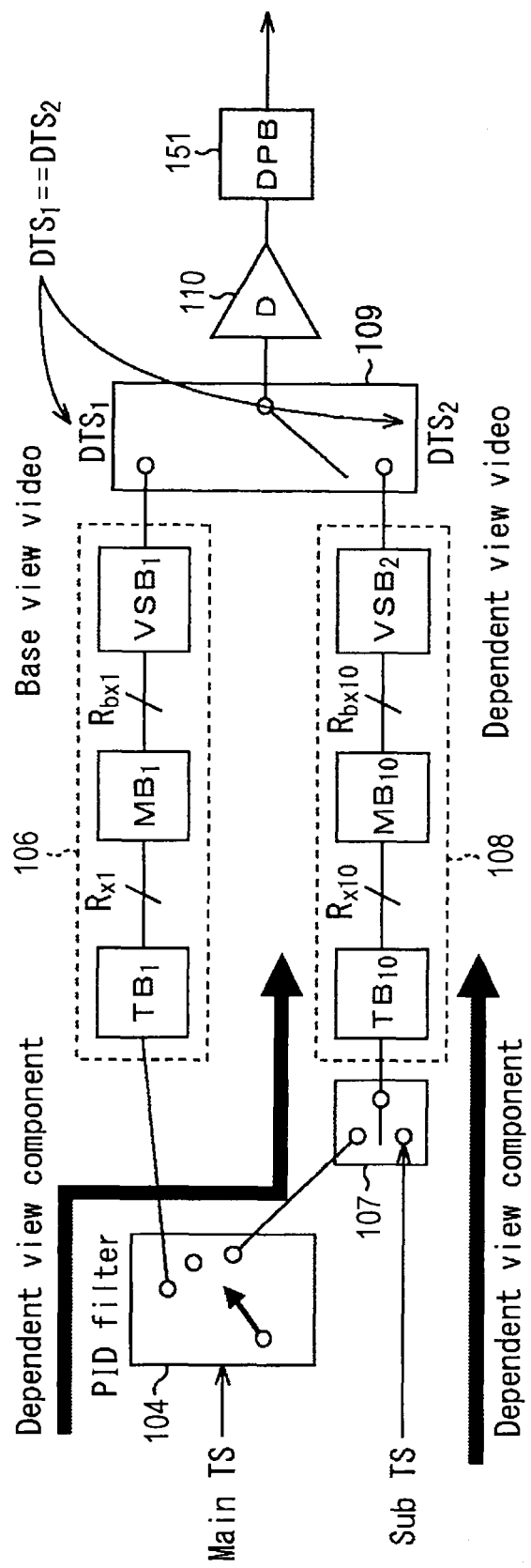
FIG. 22 is a diagram illustrating a configuration for performing a process on a video stream.

FIG. 22 is a diagram illustrating a configuration for performing a process on a video stream.

In FIG. 22, the same configurations as those illustrated in FIG. 21 are denoted by the same reference numerals. FIG. 22 illustrates the PID filter 104, the B video buffer 106, the switch 107, the D video buffer 108, the switch 109, the video decoder 110, and a DPB (Decoded Picture Buffer) 151. Although not illustrated in FIG. 21, the DPB 151 that stores the data of a decoded picture is provided in the subsequent stage of the video decoder 110.

The PID filter 104 outputs the packets constituting a Base view video stream included in a Main TS to the B video buffer 106, and outputs the packets constituting a Dependent view video stream to the switch 107.

For example, PID=0 is assigned as a fixed value of PID to the packets constituting the Base view video stream. Also, a fixed value other than 0 is assigned as PID to the packets constituting the Dependent view video stream.

The PID filter 104 outputs the packets in which PID=0 is described in the header to the B video buffer 106, and outputs the packets in which a PID other than 0 is described in the header to the switch 107.

The packets output to the B video buffer 106 are stored in a $VSB_1$ via a TB (Transport Buffer)$_1$ and an MB (Multiplexing Buffer)$_1$. The data of the elementary stream of Base view video is stored in the $VSB_1$.

Not only the packets output from the PID filter 104 but also the packets constituting a Dependent view video stream extracted from a Sub TS in the PID filter 105 in FIG. 21 are supplied to the switch 107.

When being supplied with the packets constituting the Dependent view video stream from the PID filter 104, the switch 107 outputs them to the D video buffer 108.

Also, when being supplied with the packets constituting the Dependent view video stream from the PID filter 105, the switch 107 outputs them to the D video buffer 108.

The packets output to the D video buffer 108 are stored in a $VSB_2$ via a $TB_2$ and an $MB_2$. The data of the elementary stream of Dependent view video is stored in the $VSB_2$.

The switch 109 sequentially reads the packets of Base view video stored in the $VSB_1$ of the B video buffer 106 and the packets of Dependent view video stored in the $VSB_2$ of the D video buffer 108, and outputs them to the video decoder 110.

For example, the switch 109 outputs a packet of Base view video of a certain time, and immediately after that, outputs a packet of Dependent view video of the same time. In this way, the switch 109 sequentially outputs the packet of Base view video and the packet of Dependent view video of the same time to the video decoder 110.

In a packet that stores the data of a certain picture of Base view video and a packet that stores the data of a picture of Dependent view video corresponding thereto, the same time information with PCR (Program Clock Reference) synchronization being ensured is set at the time of encoding. Even if a Base view video stream and a Dependent view video stream are included in different TSs, the same time information is set to the packets that store the data of pictures corresponding to each other.

The time information may be a DTS (Decoding Time Stamp) and a PTS (Presentation Time Stamp), and is set to each PES (Packetized Elementary Stream) packet.

Specifically, the picture of Base view video and the picture of Dependent view video that are positioned at the same time when the pictures of the respective streams are arranged in encoding order/decoding order are regarded as pictures corresponding to each other. The same DTS is set to a PES packet that stores the data of a certain picture of Base view video and a PES packet that stores the data of the picture of Dependent view video corresponding to the certain picture in decoding order.

Also, the picture of Base view video and the picture of Dependent view picture that are positioned at the same time when the pictures of the respective streams are arranged in display order are regarded as pictures corresponding to each other. The same PTS is set to a PES packet that stores the data of a certain picture of Base view video and a PES packet that stores the data of the picture of Dependent view video corresponding to the certain picture in display order.

In a case where the GOP structure of a Base view video stream and the GOP structure of a Dependent view video stream are the same as described below, the pictures corresponding to each other in decoding order are also corresponding to each other in display order.

In a case where transfer of packets is serially performed, the $DTS_1$ of a packet read from the $VSB_1$ of the B video buffer 106 at certain timing and the $DTS_2$ of a packet read from the $VSB_2$ of the D video buffer 108 at the timing immediately thereafter represent the same time, as illustrated in FIG. 22.

The switch 109 outputs the packets of Base view video read from the $VSB_1$ of the B video buffer 106 or the packets of Dependent view video read from the $VSB_2$ of the D video buffer 108 to the video decoder 110.

The video decoder 110 sequentially decodes the packets supplied from the switch 109 and causes the DPB 151 to store the data of a picture of Base view video or the data of a picture of Dependent view video obtained through the decoding.

The data of the decoded picture stored in the DPB 151 is read by the switch 111 at predetermined timing. Also, the data of the decoded picture stored in the DPB 151 is used for prediction of another picture by the video decoder 110.

In a case where transfer of data is serially performed, the PTS of the data of a picture of Base view video read at certain timing and the PTS of the data of a picture of Dependent view video read at the timing immediately thereafter represent the same time.

A Base view video stream and a Dependent view video stream may be multiplexed into a single TS, as described with reference to FIG. 5 and so forth, and may be included in different TSs, as described with reference to FIG. 7.

Even in a case where a Base view video stream and a Dependent view video stream are multiplexed into a single TS or included in different TSs, the playback device 1 can handle the case by having the decoder model in FIG. 22 mounted therein.

Figure 23:
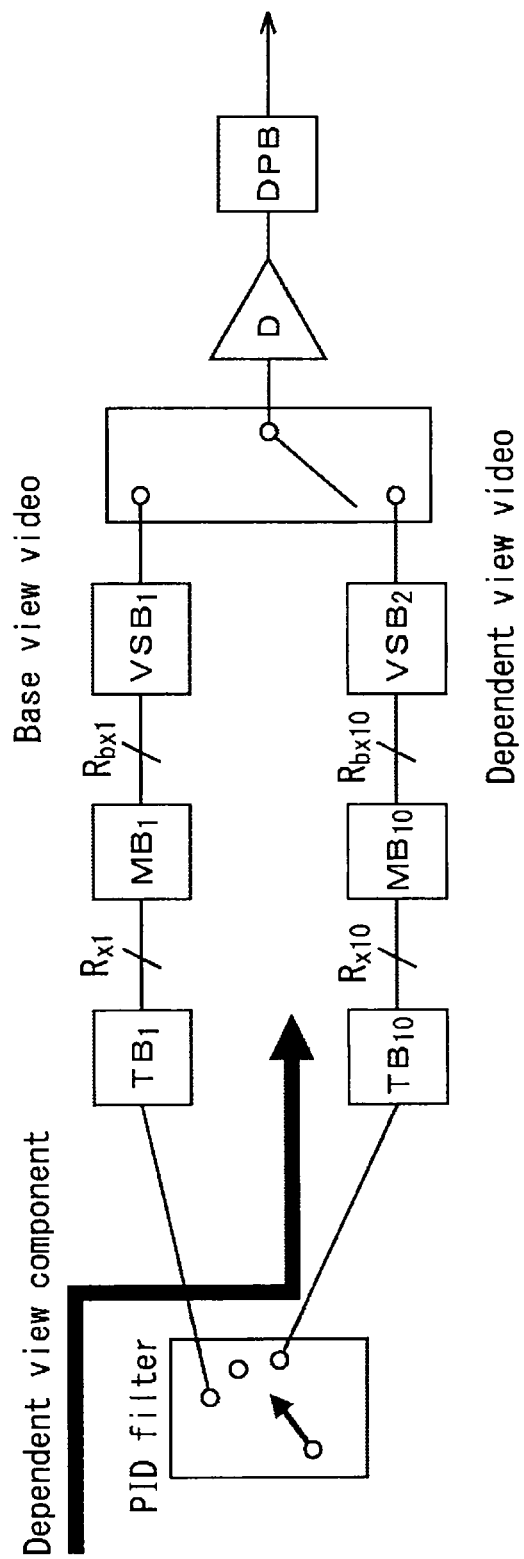
FIG. 23 is a diagram illustrating a configuration for performing a process on a video stream.

For example, in a case where only a situation in which a single TS is supplied as illustrated in FIG. 23 is assumed, the playback device 1 is incapable of handling a case where a Base view video stream and a Dependent view video stream are included in different TSs.

Also, according to the decoder model in FIG. 22, even in a case where a Base view video stream and a Dependent view video stream are included in different TSs, packets can be supplied to the video decoder 110 at correct timing because of the same DTS.

A decoder for Base view video and a decoder for Dependent view video may be provided in parallel. In this case, packets of the same time are supplied to the decoder for Base view video and the decoder for Dependent view video at the same timing.

Second Example

Figure 24:
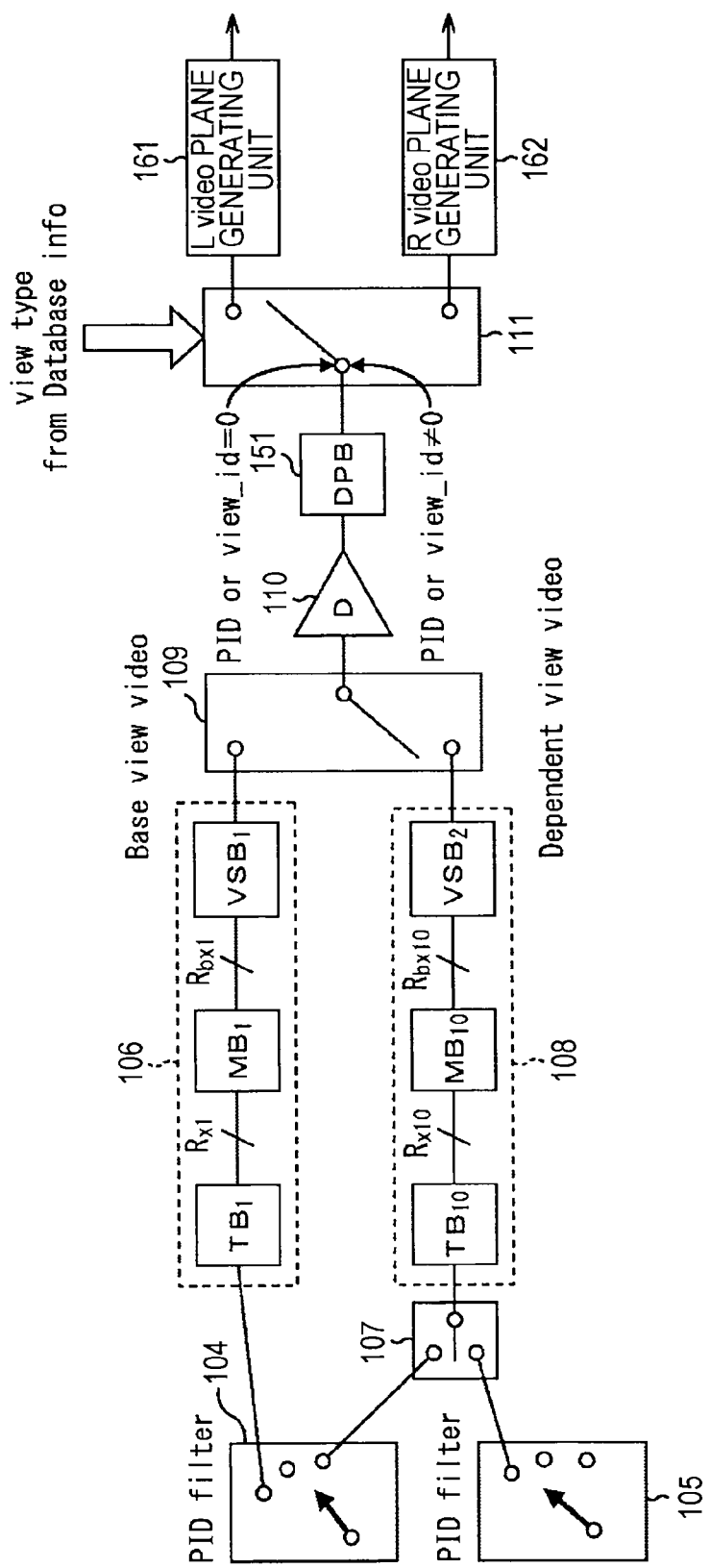
FIG. 24 is a diagram illustrating another configuration for performing a process on a video stream.

FIG. 24 is a diagram illustrating another configuration for performing a process on a video stream.

FIG. 24 illustrates the switch 111, an L video plane generating unit 161, and an R video plane generating unit 162, in addition to the configuration in FIG. 22. Also, the PID filter 105 is illustrated in the previous stage of the switch 107. A redundant description will be omitted as necessary.

The L video plane generating unit 161 generates a plane of L view video, which is provided instead of the B video plane generating unit 112 in FIG. 21.

The R video plane generating unit 162 generates a plane of R view video, which is provided instead of the D video plane generating unit 113 in FIG. 21.

In this example, the switch 111 needs to output video data of L view and video data of R view by identifying them.

That is, the switch 111 needs to identify whether the data obtained by decoding a packet of Base view video is video data of L view or R view.

Also, the switch 111 needs to identify whether the data obtained by decoding a packet of Dependent view video is video data of L view or R view.

In order to identify L view or R view, view_type described with reference to FIGS. 12 and 14 is used. For example, the controller 51 outputs view_type described in a PlayList file to the switch 111.

In a case where the value of view_type is 0, the switch 111 outputs, to the L video plane generating unit 161, the data obtained by decoding the packet of Base view video identified by PID=0 in the data stored in the DPB 151. As described above, the value 0 of view_type represents that the Base view video stream is a stream of L view.

In this case, the switch 111 outputs the data obtained by decoding the packet of Dependent view video identified by a PID other than 0 to the R video plane generating unit 162.

On the other hand, in a case where the value of view_type is 1, the switch 111 outputs, to the R video plane generating unit 162, the data obtained by decoding the packet of Base view video identified by PID=0 in the data stored in the DPB 151. The value 1 of view_type represents that the Base view video stream is a stream of R view.

In this case, the switch 111 outputs the data obtained by decoding the packet of Dependent view video identified by a PID other than 0 to the L video plane generating unit 161.

The L video plane generating unit 161 generates a plane of L view video on the basis of the data supplied from the switch 111, and outputs it to the combining unit 130.

The R video plane generating unit 162 generates a plane of R view video on the basis of the data supplied from the switch 111, and outputs it to the combining unit 130.

In the elementary streams of Base view video and Dependent view video encoded by H.264 AVC/MVC, there exists no information (field) showing whether the stream is L view or R view.

Therefore, by setting view_type to a PlayList file, the recording device can cause the playback device 1 to identify whether each of a Base view video stream and a Dependent view video stream is a stream of L view or R view.

The playback device 1 can identify whether each of the Base view video stream and the Dependent view video stream is a stream of L view or R view, and can switch an output destination in accordance with the identification result.

In a case where L view and R view are provided for planes of IG and PG, video streams of L view and R view can be distinguished from each other, whereby the playback device 1 can easily combine L view planes or R view planes.

As described above, in the case of outputting a video signal via an HDMI cable, it is required that the video signal is output with an L view signal and an R view signal being distinguished from each other. The playback device 1 can respond to the requirement.

The data obtained by decoding a packet of Base view video stored in the DPB 151 and the data obtained by decoding a packet of Dependent view video may be identified on the basis of view_id instead of the PID.

At the time of encoding in H.264 AVC/MVC, view_id is set to Access Units constituting a stream of an encoding result. With view_id, the view component corresponding to each Access Unit can be identified.

Figure 25:
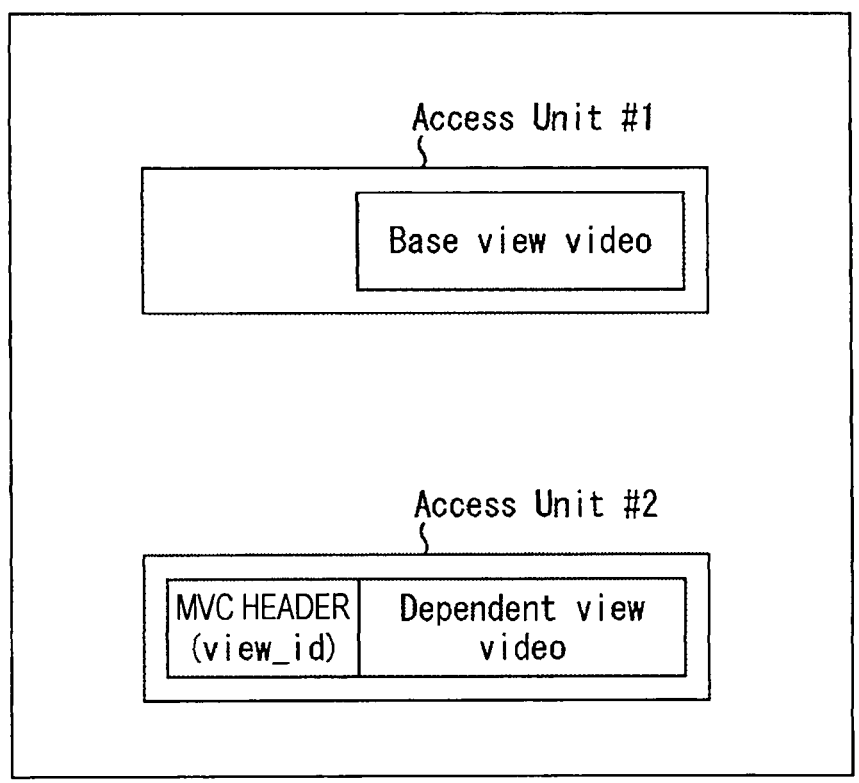
FIG. 25 is a diagram illustrating an example of Access Units.

FIG. 25 is a diagram illustrating an example of Access Units.

Access Unit #1 in FIG. 25 is a unit including the data of Base view video. Access Unit #2 is a unit including the data of Dependent view video. An Access Unit is a unit including the data of one picture, for example, so that access can be performed in units of pictures.

With the encoding in H.264 AVC/MVC, the data of each picture of Base view video and Dependent view video is stored in such Access Units. At the time of encoding in H.264 AVC/MVC, an MVC header is added to each view component, as shown in Access Unit #2. The MVC header includes view_id.

In the case of the example in FIG. 25, as for Access Unit #2, it can be identified from view_id that the view component stored in the Access Unit is Dependent view video.

On the other hand, as illustrated in FIG. 25, no MVC header is added to the Base view video, which is a view component stored in Access Unit #1.

As described above, a Base view video stream is data that is also used for 2D playback. Thus, in order to ensure the compatibility therewith, no MVC header is added to Base view video at the time of encoding. Alternatively, a once-added MVC header is removed. The encoding by the recording device will be described below.

The playback device 1 is defined (set) to recognize that the view_id of the view component without an MVC header is 0 and to recognize the view component as Base view video. A value other than 0 is set as view_id to Dependent view video at the time of encoding.

Accordingly, the playback device 1 can identify Base view video on the basis of view_id recognized as 0, and can identify Dependent view video on the basis of view_id other than 0 that is actually set.

In the switch 111 in FIG. 24, identification of the data obtained by decoding a packet of Base view video and the data obtained by decoding a packet of Dependent view video may be performed on the basis of such view_id.

Third Example

Figure 26:
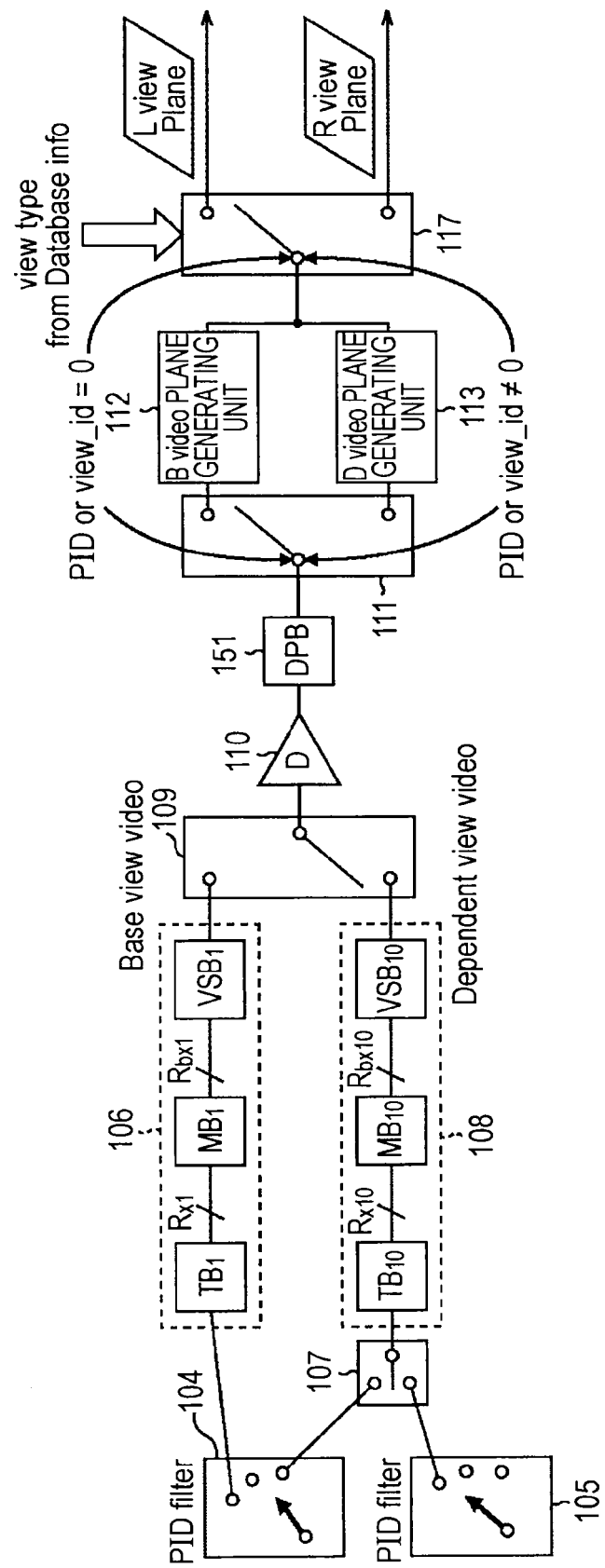
FIG. 26 is a diagram illustrating still another configuration for performing a process on a video stream.

FIG. 26 is a diagram illustrating still another configuration for performing a process on a video stream.

In the example in FIG. 26, the B video plane generating unit 112 is provided instead of the L video plane generating unit 161 in FIG. 24, and the D video plane generating unit 113 is provided instead of the R video plane generating unit 162. A switch 171 is provided in the subsequent stage of the B video plane generating unit 112 and the D video plane generating unit 113. In the configuration illustrated in FIG. 26, too, an output destination of data is switched on the basis of view_type.

The switch 111 outputs, to the B video plane generating unit 112, data obtained by decoding a packet of Base view video in the data stored in the DPB 151. Also, the switch 111 outputs data obtained by decoding a packet of Dependent view video to the D video plane generating unit 113.

The data obtained by decoding a packet of Base view video and the data obtained by decoding a packet of Dependent view video are identified on the basis of the PID or view_id, as described above.

The B video plane generating unit 112 generates a plane of Base view video on the basis of the data supplied from the switch 111, and outputs it.

The D video plane generating unit 113 generates a plane of Dependent view video on the basis of the data supplied from the switch 111, and outputs it.

view_type described in the PlayList file is supplied from the controller 51 to the switch 171.

In a case where the value of view_type is 0, the switch 171 outputs the plane of Base view video supplied from the B video plane generating unit 112 to the combining unit 130 as a plane of L view video. The value 0 of view_type represents that the Base view video stream is a stream of L view.

Also, in this case, the switch 171 outputs the plane of Dependent view video supplied from the D video plane generating unit 113 to the combining unit 130 as a plane of R view video.

On the other hand, in a case where the value of view_type is 1, the switch 171 outputs the plane of Dependent view video supplied from the D video plane generating unit 113 to the combining unit 130 as a plane of L view video. The value 1 of view_type represents that the Base view video stream is a stream of R view.

Also, in this case, the switch 171 outputs the plane of Base view video supplied from the B video plane generating unit 112 to the combining unit 130 as a plane of R view video.

With the configuration in FIG. 26, the playback device 1 can identify L view or R view, and can switch an output destination in accordance with the identification result.

[First Example of Plane Combining Model]

Figure 27:
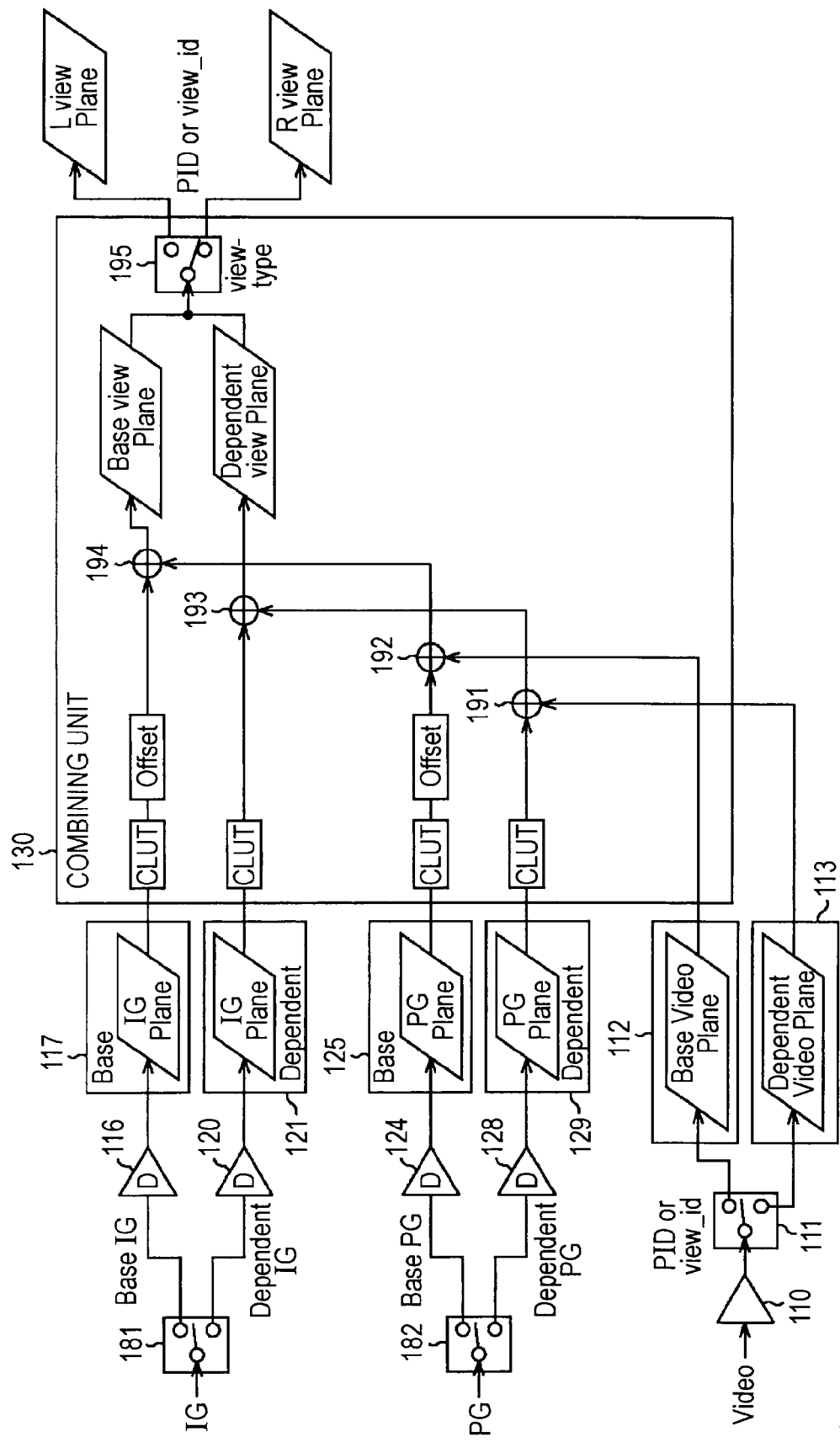
FIG. 27 is a diagram illustrating a configuration of a combining unit and the previous stage thereof.

FIG. 27 is a diagram illustrating a configuration of the combining unit 130 and the previous stage thereof in the configuration illustrated in FIG. 21.

In FIG. 27, too, the same configurations as those illustrated in FIG. 21 are denoted by the same reference numerals.

The packets constituting an IG stream included in a Main TS or Sub TS are input to a switch 181. The packets constituting the IG stream input to the switch 181 include a packet of Base view and a packet of Dependent view.

The packets constituting a PG stream included in a Main TS or Sub TS are input to a switch 182. The packets constituting the PG stream input to the switch 182 include a packet of Base view and a packet of Dependent view.

As described with reference to FIG. 5 and so forth, a Base view stream and a Dependent view stream for performing 3D display are provided also for IG and PG.

The IG of Base view is displayed by being combined with Base view video, and the IG of Dependent view is displayed by being combined with Dependent view video, whereby the user views a button and icon in a 3D manner, as well as video.

Also, the PG of Base view is displayed by being combined with Base view video, and the PG of Dependent view is displayed by being combined with Dependent view video, whereby the user views caption text or the like in a 3D manner, as well as video.

The switch 181 outputs the packets constituting a Base IG stream to the B IG decoder 116, and outputs the packets constituting a Dependent IG stream to the D IG decoder 120. The switch 181 has the functions of the switch 114 and the switch 118 in FIG. 21. In FIG. 27, illustration of the individual buffers is omitted.

The B IG decoder 116 decodes the packets constituting the Base IG stream supplied from the switch 181, and outputs the data obtained through the decoding to the B IG plane generating unit 117.

The B IG plane generating unit 117 generates a plane of Base IG on the basis of the data supplied from the B IG decoder 116, and outputs it to the combining unit 130.

The D IG decoder 120 decodes the packets constituting the Dependent IG stream supplied from the switch 181, and outputs the data obtained through the decoding to the D IG plane generating unit 121. The Base IG stream and the Dependent IG stream may be decoded by one decoder.

The D IG plane generating unit 121 generates a plane of Dependent IG on the basis of the data supplied from the D IG decoder 120, and outputs it to the combining unit 130.

The switch 182 outputs the packets constituting a Base PG stream to the B PG decoder 124, and outputs the packets constituting a Dependent PG stream to the D PG decoder 128. The switch 182 has the functions of the switch 122 and the switch 126 in FIG. 21.

The B PG decoder 124 decodes the packets constituting the Base PG stream supplied from the switch 182, and outputs the data obtained through the decoding to the B PG plane generating unit 125.

The B PG plane generating unit 125 generates a plane of Base PG on the basis of the data supplied from the B PG decoder 124, and outputs it to the combining unit 130.

The D PG decoder 128 decodes the packets constituting the Dependent PG stream supplied from the switch 182, and outputs the data obtained through the decoding to the D PG plane generating unit 129. The Base PG stream and the Dependent PG stream may be decoded by one decoder.

The D PG plane generating unit 129 generates a plane of Dependent PG on the basis of the data supplied from the D PG decoder 128, and outputs it to the combining unit 130.

The video decoder 110 sequentially decodes the packets supplied from the switch 109 (FIG. 22 and so forth) and outputs the data of Base view video or the data of Dependent view video obtained through the decoding to the switch 111.

The switch 111 outputs the data obtained by decoding the packets of Base view video to the B video plane generating unit 112, and outputs the data obtained by decoding the packets of Dependent view video to the D video plane generating unit 113.

The B video plane generating unit 112 generates a plane of Base view video on the basis of the data supplied from the switch 111, and outputs it.

The D video plane generating unit 113 generates a plane of Dependent view video on the basis of the data supplied from the switch 111, and outputs it.

The combining unit 130 includes adding units 191 to 194 and a switch 195.

The adding unit 191 superimposes the plane of Dependent PG supplied from the D PG plane generating unit 129 on the plane of Dependent view video supplied from the D video plane generating unit 113 so as to combine the planes, and outputs the combining result to the adding unit 193. A color information conversion process (CLUT (Color Look Up Table) process) is performed on the plane of Dependent PG supplied from the D PG plane generating unit 129 to the adding unit 191.

The adding unit 192 superimposes the plane of Base PG supplied from the B PG plane generating unit 125 on the plane of Base view video supplied from the B video plane generating unit 112 so as to combine the planes, and outputs the combining result to the adding unit 194. A color information conversion process and a correction process using an offset value are performed on the plane of Base PG supplied from the B PG plane generating unit 125 to the adding unit 192.

The adding unit 193 superimposes the plane of Dependent IG supplied from the D IG plane generating unit 121 on the combining result obtained in the adding unit 191 so as to combine them, and outputs the combining result as a plane of Dependent view. A color information conversion process is performed on the plane of Dependent IG supplied from the D IG plane generating unit 121 to the adding unit 193.

The adding unit 194 superimposes the plane of Base IG supplied from the B IG plane generating unit 117 on the combining result obtained in the adding unit 192 so as to combine them, and outputs the combining result as a plane of Base view. A color information conversion process and a correction process using an offset value are performed on the plane of Base IG supplied from the D IG plane generating unit 121 to the adding unit 194.

An image displayed on the basis of the plane of Base view and the plane of Dependent view that are generated in this manner is an image in which a button and icon are viewed in a front surface, a caption text is viewed thereunder (in the depth direction), and video is viewed thereunder.

In a case where the value of view_type is 0, the switch 195 outputs the plane of Base view as a plane of L view, and outputs the plane of Dependent view as a plane of R view. view_type is supplied from the controller 51 to the switch 195.

Also, in a case where the value of view_type is 1, the switch 195 outputs the plane of Base view as a plane of R view, and outputs the plane of Dependent view as a plane of L view. Which of the supplied planes is the plane of Base view or the plane of Dependent view is identified on the basis of the PID and view_id.

In this way, in the playback device 1, combining of planes of Base view, planes of Dependent view, and planes of video, IG, and PG is performed.

At a stage where combining of all the planes of video, IG, and PG has ended, whether a result of combining the planes of Base view is L view or R view is determined on the basis of view_type, and a plane of R view and a plane of L view are output.

Also, at a stage where combining of all the planes of video, IG, and PG has ended, whether a result of combining the planes of Dependent view is L view or R view is determined on the basis of view_type, and a plane of R view and a plane of L view are output.

Second Example

Figure 28:
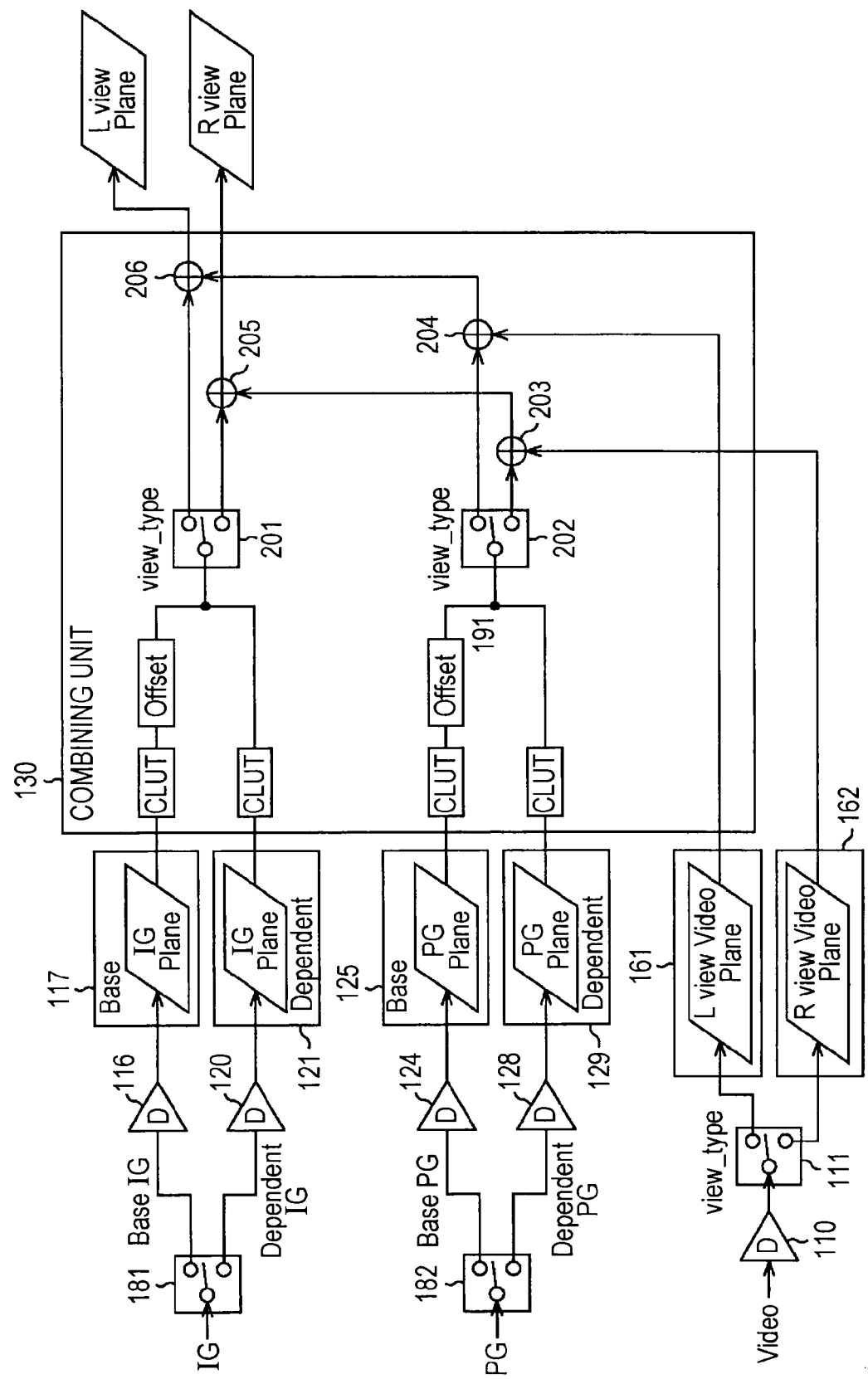
FIG. 28 is another diagram illustrating a configuration of a combining unit and the previous stage thereof.

FIG. 28 is a diagram illustrating a configuration of the combining unit 130 and the previous stage thereof.

In the configuration illustrated in FIG. 28, the same configurations as those illustrated in FIG. 27 are denoted by the same reference numerals. In FIG. 28, the configuration of the combining unit 130 is different from the configuration in FIG. 27. Also, the operation of the switch 111 is different from the operation of the switch 111 in FIG. 27. The L video plane generating unit 161 is provided instead of the B video plane generating unit 112, and the R video plane generating unit 162 is provided instead of the D video plane generating unit 113. A redundant description will be omitted.

The same value of view_type is supplied from the controller 51 to the switch 111, and a switch 201 and a switch 202 of the combining unit 130.

The switch 111 switches, like the switch 111 in FIG. 24, the output destinations of the data obtained by decoding a packet of Base view video and the data obtained by decoding a packet of Dependent view video on the basis of view_type.

For example, in a case where the value of view_type is 0, the switch 111 outputs the data obtained by decoding a packet of Base view video to the L video plane generating unit 161. In this case, the switch 111 outputs the data obtained by decoding a packet of Dependent view video to the R video plane generating unit 162.

On the other hand, in a case where the value of view_type is 1, the switch 111 outputs the data obtained by decoding a packet of Base view video to the R video plane generating unit 162. In this case, the switch 111 outputs the data obtained by decoding a packet of Dependent view video to the L video plane generating unit 161.

The L video plane generating unit 161 generates a plane of L view video on the basis of the data supplied from the switch 111, outputs it to the combining unit 130.

The R video plane generating unit 162 generates a plane of R view video on the basis of the data supplied from the switch 111, outputs it to the combining unit 130.

The combining unit 130 includes the switch 201, the switch 202, and adding units 203 to 206.

The switch 201 switches the output destinations of the plane of Base IG supplied from the B IG plane generating unit 117 and the plane of Dependent IG supplied from the D IG plane generating unit 121 on the basis of view_type.

For example, in a case where the value of view_type is 0, the switch 201 outputs the plane of Base IG supplied from the B IG plane generating unit 117 to the adding unit 206 as a plane of L view. In this case, the switch 201 outputs the plane of Dependent IG supplied from the D IG plane generating unit 121 to the adding unit 205 as a plane of R view.

On the other hand, in a case where the value of view_type is 1, the switch 201 outputs the plane of Dependent IG supplied from the D IG plane generating unit 121 to the adding unit 206 as a plane of L view. In this case, the switch 201 outputs the plane of Base IG supplied from the B IG plane generating unit 117 to the adding unit 205 as a plane of R view.

The switch 202 switches the output destinations of the plane of Base PG supplied from the B PG plane generating unit 125 and the plane of Dependent PG supplied from the D PG plane generating unit 129 on the basis of view_type.

For example, in a case where the value of view_type is 0, the switch 202 outputs the plane of Base PG supplied from the B PG plane generating unit 125 to the adding unit 204 as a plane of L view. In this case, the switch 202 outputs the plane of Dependent PG supplied from the D PG plane generating unit 129 to the adding unit 203 as a plane of R view.

On the other hand, in a case where the value of view_type is 1, the switch 202 outputs the plane of Dependent PG supplied from the D PG plane generating unit 129 to the adding unit 204 as a plane of L view. In this case, the switch 202 outputs the plane of Base PG supplied from the B PG plane generating unit 125 to the adding unit 203 as a plane of R view.

The adding unit 203 superimposes the plane of PG of R view supplied from the switch 202 on the plane of R view video supplied from the R video plane generating unit 162 so as to combine the planes, and outputs the combining result to the adding unit 205.

The adding unit 204 superimposes the plane of PG of L view supplied from the switch 202 on the plane of L view video supplied from the L video plane generating unit 161 so as to combine the planes, and outputs the combining result to the adding unit 206.

The adding unit 205 superimposes the plane of IG of R view supplied from the switch 201 on the plane as the combining result obtained in the adding unit 203 so as to combine them, and outputs the combining result as a plane of R view.

The adding unit 206 superimposes the plane of IG of L view supplied from the switch 201 on the plane as the combining result obtained in the adding unit 204 so as to combine them, and outputs the combining result as a plane of L view.

In this way, in the playback device 1, it is determined whether each of the plane of Base view and the plane of Dependent view of video, IG, and PG is a plane of L view or R view before combining with another plane.

After the determination has been performed, combining of planes of video, IG, and PG is performed to combine planes of L view with each other and planes of R view with each other.

[Configuration Example of Recording Device]

Figure 29:
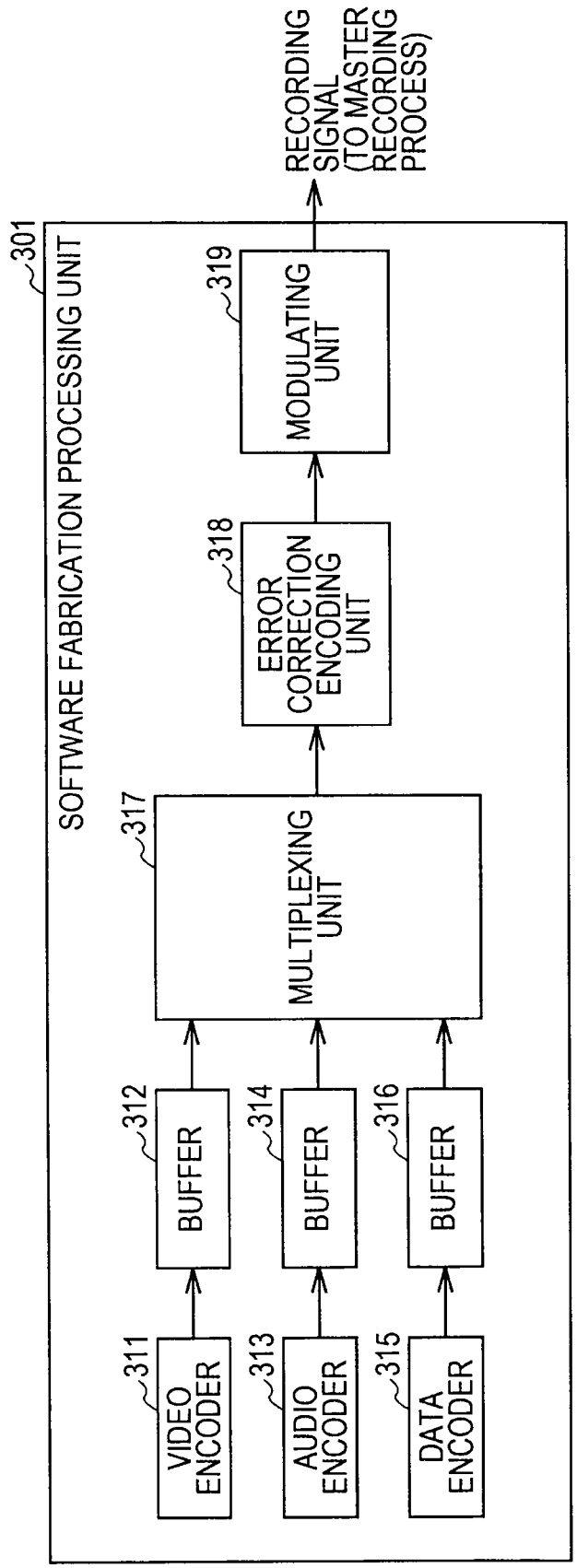
FIG. 29 is a block diagram illustrating a configuration example of a software fabrication processing unit.

FIG. 29 is a block diagram illustrating a configuration example of a software fabrication processing unit 301.

A video encoder 311 has the same configuration as that of the MVC encoder 11 in FIG. 3. The video encoder 311 encodes a plurality of pieces of video data in accordance with H.264 AVC/MVC, thereby generating a Base view video stream and a Dependent view video stream, and outputs them to a buffer 312.

For example, the video encoder 311 sets DTS and PTS with the same PCR as a reference at the time of encoding. That is, the video encoder 311 sets the same DTS to a PES packet that stores the data of a certain picture of Base view video and a PES packet that stores the data of a picture of Dependent view video corresponding to the picture in decoding order.

Also, the video encoder 311 sets the same PTS to a PES packet that stores the data of a certain picture of Base view video and a PES packet that stores the data of a picture of Dependent view video corresponding to the picture in display order.

As described below, the video encoder 311 sets the same information as additional information, which is auxiliary information about decoding, to a picture of Base view video and a picture of Base view video corresponding to each other in decoding order.

Furthermore, as described below, the video encoder 311 sets the same value, which the value of POC representing the output order of pictures, to a picture of Base view video and a picture of Base view video corresponding to each other in display order.

Also, as described below, the video encoder 311 performs encoding so that the GOP structure of a Base view video stream matches the GOP structure of a Dependent view video stream.

An audio encoder 313 encodes an audio stream input thereto and outputs the data obtained thereby to a buffer 314. An audio stream that is to be recorded on a disc together with a Base view video stream and a Dependent view video stream is input to the audio encoder 313.

A data encoder 315 encodes the above-described various types of data other than video and audio, such as a PlayList file, and outputs the data obtained through the encoding to a buffer 316.

The data encoder 315 sets view_type, representing whether a Base view video stream is a stream of L view or a stream of R view, to the PlayList file in accordance with the encoding performed by the video encoder 311. Information showing whether a Depending view video stream is a stream of L view or a stream of R view may be set instead of the type of Base view video stream.

Also, the data encoder 315 sets EP_map, which will be described below, to each of a Clip Information file of a Base view video stream and a Clip Information file of a Dependent view video stream. The picture of the Base view video stream and the picture of the Dependent view video stream that are set to EP_map as a decoding start position are pictures corresponding to each other.

A multiplexing unit 317 multiplexes the video data and audio data stored in the individual buffers and the data other than streams together with a synchronization signal, and outputs it to an error correction encoding unit 318.

The error correction encoding unit 318 adds code for error correction to the data multiplexed by the multiplexing unit 317.

A modulating unit 319 modulates the data supplied from the error correction encoding unit 318 and outputs it. The output of the modulating unit 319 serves as software that is to be recorded on the optical disc 2 that can be played in the playback device 1.

The software fabrication processing unit 301 having such a configuration is provided in the recording device.

Figure 30:
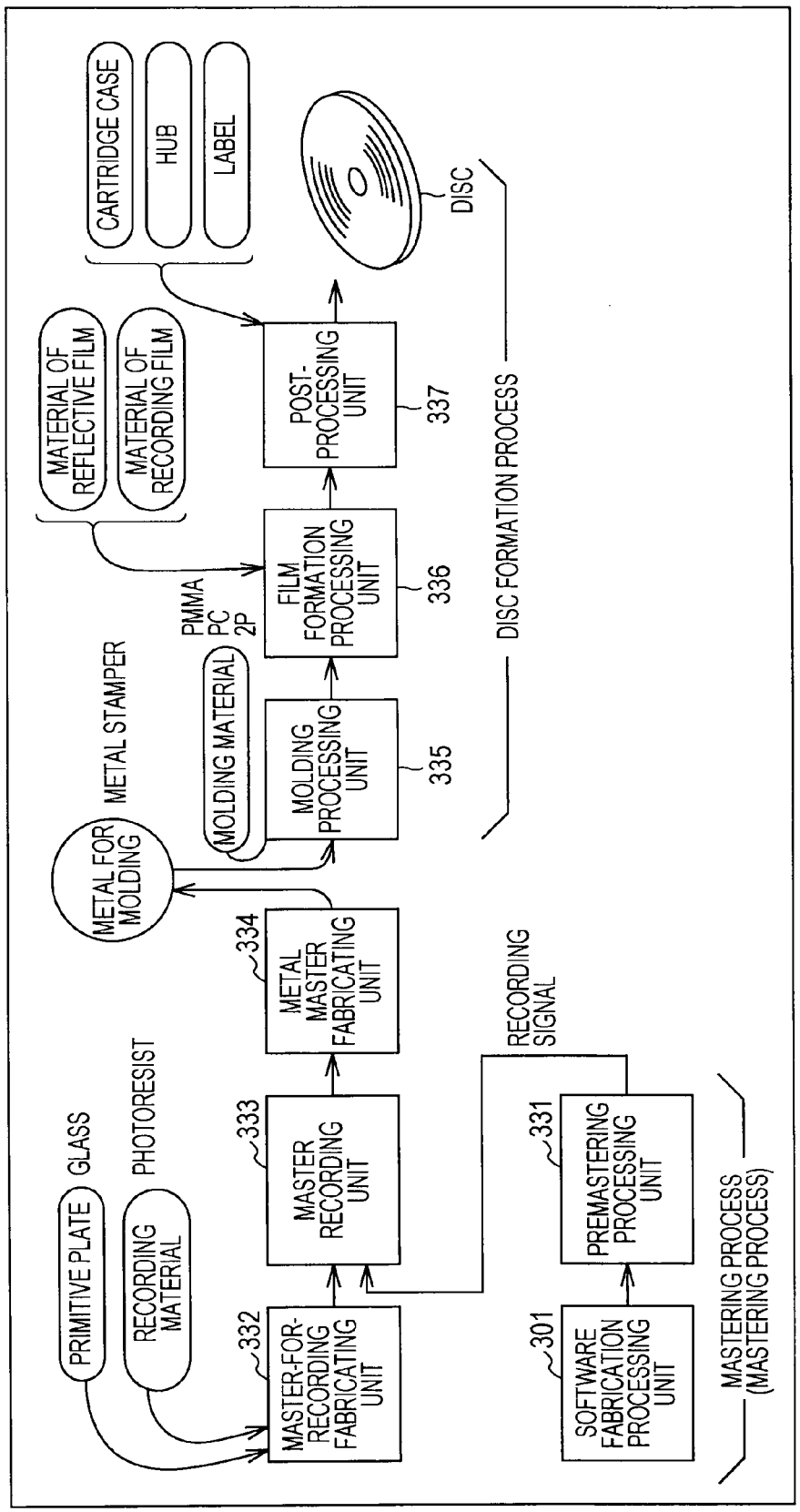
FIG. 30 is a diagram illustrating an example of individual configurations including the software fabrication processing unit.

FIG. 30 is a diagram illustrating an example of a configuration including the software fabrication processing unit 301.

Part of the configuration illustrated in FIG. 30 may be provided in the recording device.

A mastering process is performed on a recording signal generated by the software fabrication processing unit 301 by a premastering processing unit 331, so that a signal having a format to be recorded on the optical disc 2 is generated. The generated signal is supplied to a master recording unit 333.

In a master-for-recording fabricating unit 332, a master made of glass or the like is prepared, on which a recording material including photoresist or the like is applied. Accordingly, a master for recording is fabricated.

In the master recording unit 333, a laser beam is modulated in accordance with the recording signal supplied from the premastering processing unit 331, and the photoresist on the master is irradiated therewith. Accordingly, the photoresist on the master is exposed in accordance with the recording signal. After that, this master is developed, so that pits emerge on the master.

In a metal master fabricating unit 334, a process such as electroforming is performed on the master, so that a metal master to which the pits on the glass master are transferred is fabricated. Furthermore, a metal stamper is fabricated from this metal master, which is used as a molding die.

In a molding processing unit 335, a material such as PMMA (acrylic) or PC (polycarbonate) is injected into the molding die through injection or the like, and fixing is performed thereon. Alternatively, 2P (ultraviolet curing resin) or the like is applied on the metal stamper, which is irradiated with an ultraviolet ray to be cured. Accordingly, the pits on the metal stamper can be transferred onto a replica made of resin.

In a film formation processing unit 336, a reflective film is formed on the replica through vapor deposition or sputtering. Alternatively, a reflective film is formed on the replica through spin coating.

In a post-processing unit 337, necessary processes are performed, that is, a process of inner and outer diameters is performed on this disc, and two discs are pasted together. Furthermore, a label is pasted and a hub is attached, and then the disc is inserted into a cartridge. In this way, the optical disc 2 having data that can be played back by the playback device 1 recorded thereon is completed.

Second Embodiment

[Operation 1 of H.264 AVC/MVC Profile Video Stream]

In the BD-ROM standard, which is a standard of the optical disc 2, encoding of 3D video is realized by employing the H.264 AVC/MVC Profile, as described above.

Also, in the BD-ROM standard, a Base view video stream is regarded as a video stream of L view, and a Dependent view video stream is regarded as a video stream of R view.

Base view video is encoded as a video stream of the H.264 AVC/High Profile, whereby the optical disc 2, which is a 3D-compatible disc, can be played even in a past player or a player compatible with only 2D playback. That is, downward compatibility can be ensured.

Specifically, only a stream of Base view video can be decoded (played back) even in a decoder incompatible with H.264 AVC/MVC. That is, the Base view video stream is a stream that can be reliably played back even in an existing 2D BD player.

Also, the Base view video stream is used in common in 2D playback and 3D playback, whereby a load at the time of authoring can be reduced. On the authoring side, as for an AV stream, a 3D-compatible disc can be fabricated by preparing a Dependent view video stream, in addition to the work that is conventionally performed.

Figure 31:
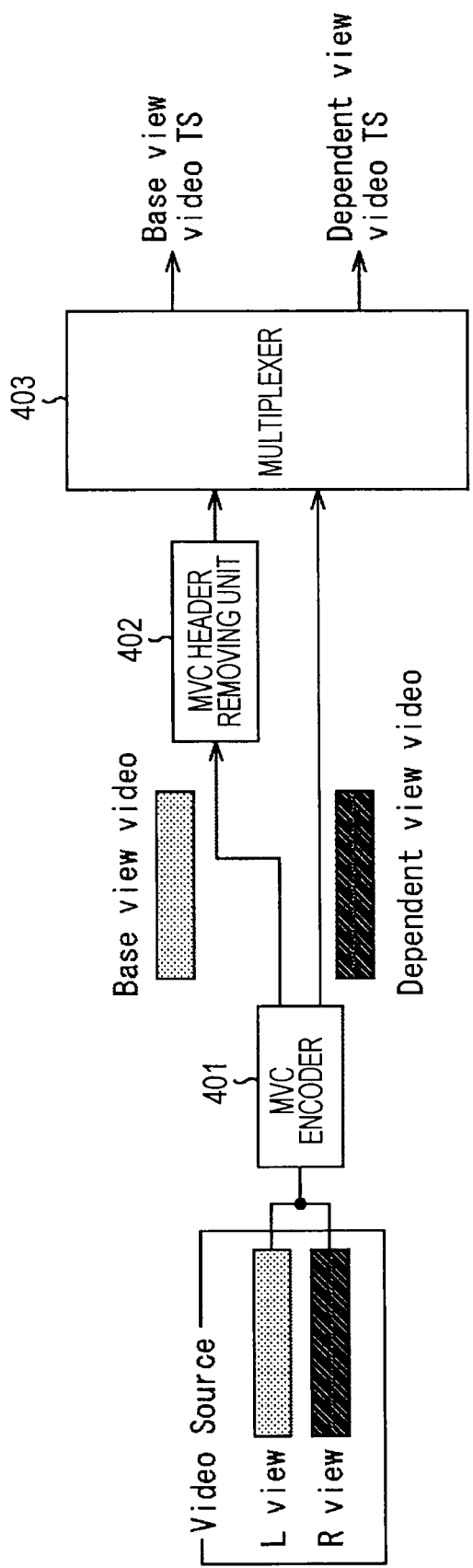
FIG. 31 is a diagram illustrating a configuration example of a 3D video TS generating unit provided in a recording device.

FIG. 31 is a diagram illustrating a configuration example of a 3D video TS generating unit provided in the recording device.

The 3D video TS generating unit in FIG. 31 includes an MVC encoder 401, an MVC header removing unit 402, and a multiplexer 403. The data of video #1 of L view and the data of video #2 of R view, which are captured in the manner described with reference to FIG. 2, are input to the MVC encoder 401.

Like the MVC encoder 11 in FIG. 3, the MVC encoder 401 encodes the data of video #1 of L view using H.264/AVC, and outputs AVC video data obtained through the encoding as a Base view video stream. Also, the MVC encoder 401 generates a Dependent view video stream on the basis of the data of video #1 of L view and the data of video #2 of R view, and outputs it.

The Base view video stream output from the MVC encoder 401 is composed of Access Units each of which stores the data of a picture of Base view video. Also, the Dependent view video stream output from the MVC encoder 401 is composed of Access Units each of which stores the data of a picture of Dependent view video.

Each of the Access Units constituting the Base view video stream and each of the Access Units constituting the Dependent view video stream include an MVC header that describes view_id for identifying the view component stored therein.

A fixed value of 1 or more is used as the value of view_id described in the MVC header of Dependent view video. This is the same for the examples in FIGS. 32 and 33.

That is, unlike the MVC encoder 11 in FIG. 3, the MVC encoder 401 is an encoder that generates individual streams of Base view video and Dependent view video in the form of adding MVC headers and that outputs the streams. In the MVC encoder 11 in FIG. 3, MVC headers are added only in Dependent view video that is encoded using H.264 AVC/MVC.

The Base view video stream output from the MVC encoder 401 is supplied to the MVC header removing unit 402, and the Dependent view video stream is supplied to the multiplexer 403.

The MVC header removing unit 402 removes the MVC headers included in the individual Access Units constituting the Base view video stream. The MVC header removing unit 402 outputs, to the multiplexer 403, the Base view video stream composed of Access Units from which the MVC headers have been removed.

The multiplexer 403 generates a TS including the Base view video stream supplied from the MVC header removing unit 402 and the Dependent view video stream supplied from the MVC encoder 401, and outputs it. In the example in FIG. 31, a TS including the Base view video stream and a TS including the Dependent view video stream are individually output, but these streams may be output by being multiplexed into the same TS as described above.

In this way, depending on the manner of mounting, an MVC encoder that receives L view video and R view video and that outputs individual streams of Base view video and Dependent view video with MVC headers may be provided.

Alternatively, the entire configuration illustrated in FIG. 31 may be included in an MVC encoder, as illustrated in FIG. 3. This is the same for the configurations illustrated in FIGS. 32 and 33.

Figure 32:
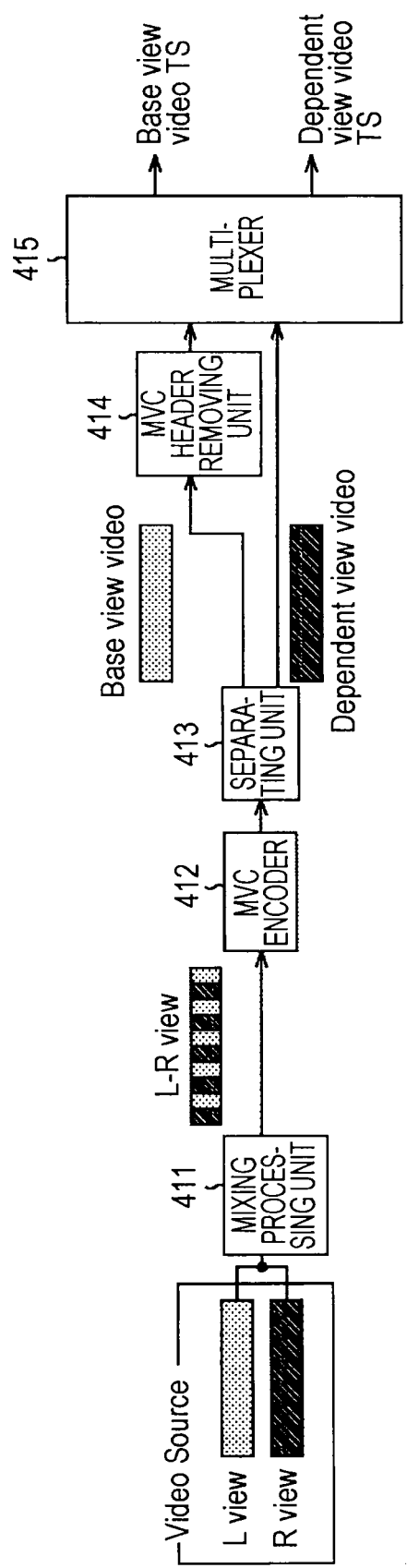
FIG. 32 is a diagram illustrating another configuration example of the 3D video TS generating unit provided in the recording device.

FIG. 32 is a diagram illustrating another configuration example of the 3D video TS generating unit provided in the recording device.

The 3D video TS generating unit in FIG. 32 includes a mixing processing unit 411, an MVC encoder 412, a separating unit 413, an MVC header removing unit 414, and a multiplexer 415. The data of video #1 of L view and the data of video #2 of R view are input to the mixing processing unit 411.

The mixing processing unit 411 arranges the individual pictures of L view and the individual pictures of R view in encoding order. The individual pictures of Dependent view video are encoded with reference to the corresponding pictures of Base view video. Thus, in the result of arrangement in encoding order, the pictures of L view and the pictures of R view are alternately arranged.

The mixing processing unit 411 outputs the pictures of L view and the pictures of R view arranged in encoding order to the MVC encoder 412.

The MVC encoder 412 encodes the individual pictures supplied from the mixing processing unit 411 using H.264 AVC/MVC, and outputs the stream obtained through the encoding to the separating unit 413. A Base view video stream and a Dependent view video stream are multiplexed into the stream output from the MVC encoder 412.

The Base view video stream included in the stream output from the MVC encoder 412 is composed of Access Units each of which stores the data of a picture of Base view video. Also, the Dependent view video stream included in the stream output from the MVC encoder 412 is composed of Access Units each of which stores the data of a picture of Dependent view video.

Each of the Access Units constituting the Base view video stream and each of the Access Units constituting the Dependent view video stream include an MVC header that describes view_id for identifying the view component stored therein.

The separating unit 413 separates the Base view video stream and the Dependent view video stream multiplexed into the stream supplied from the MVC encoder 412 from each other, and outputs them. The Base view video stream output from the separating unit 413 is supplied to the MVC header removing unit 414, and the Dependent view video stream is supplied to the multiplexer 415.

The MVC header removing unit 414 removes the MVC headers included in the individual Access Units constituting the Base view video stream supplied from the separating unit 413. The MVC header removing unit 414 outputs, to the multiplexer 415, the Base view video stream composed of Access Units from which the MVC headers have been removed.

The multiplexer 415 generates a TS including the Base view video stream supplied from the MVC header removing unit 414 and the Dependent view video stream supplied from the separating unit 413, and outputs it.

Figure 33:
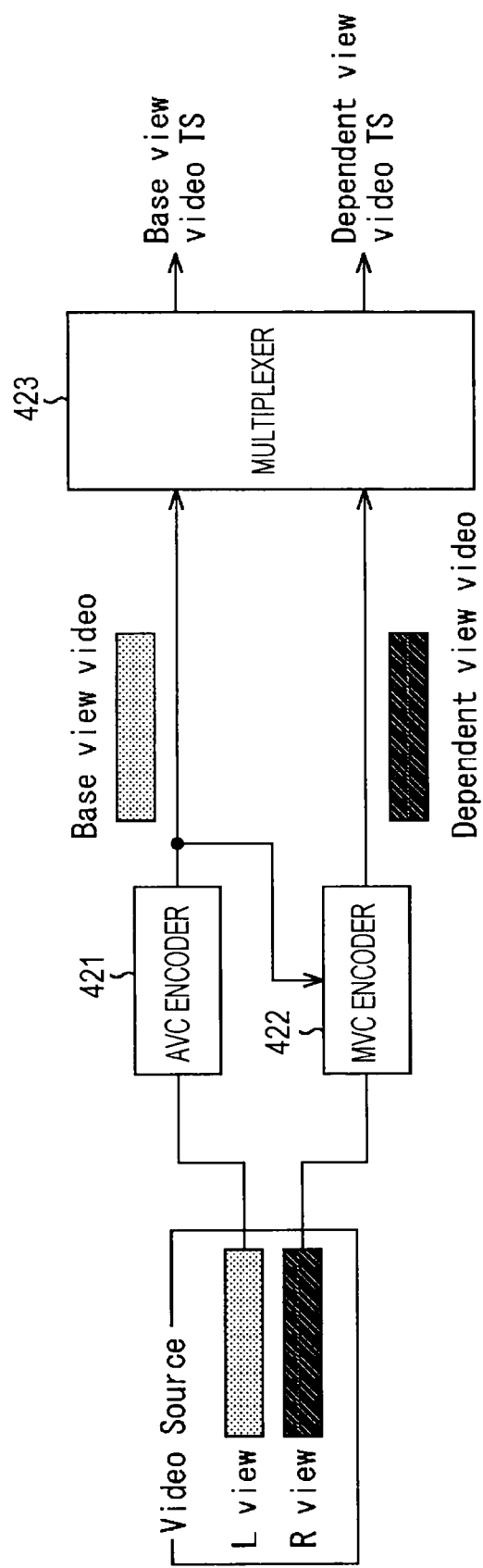
FIG. 33 is a diagram illustrating still another configuration example of the 3D video TS generating unit provided in the recording device.

FIG. 33 is a diagram illustrating still another configuration example of the 3D video TS generating unit provided in the recording device.

The 3D video TS generating unit in FIG. 33 includes an AVC encoder 421, an MVC encoder 422, and a multiplexer 423. The data of video #1 of L view is input to the AVC encoder 421, and the data of video #2 of R view is input to the MVC encoder 422.

The AVC encoder 421 encodes the data of video #1 of L view using H.264/AVC, and outputs the AVC video stream obtained through the encoding, serving as a Base view video stream, to the MVC encoder 422 and the multiplexer 423. The individual Access Units constituting the Base view video stream output from the AVC encoder 421 do not include MVC headers.

The MVC encoder 422 decodes the Base view video stream (AVC video stream) supplied from the AVC encoder 421 to generate the data of video #1 of L view.

Also, the MVC encoder 422 generates a Dependent view video stream on the basis of the data of video #1 of L view obtained through the decoding and the data of video #2 of R view externally input thereto, and outputs it to the multiplexer 423. The individual Access Units constituting the Dependent view video stream output from the MVC encoder 422 include MVC headers.

The multiplexer 423 generates a TS including the Base view video stream supplied from the AVC encoder 421 and the Dependent view video stream supplied from the MVC encoder 422, and outputs it.

The AVC encoder 421 in FIG. 33 has the function of the H.264/AVC encoder 21 in FIG. 3, and the MVC encoder 422 has the functions of the H.264/AVC encoder 22 and the Dependent view video encoder 24 in FIG. 3. Also, the multiplexer 423 has the function of the multiplexer 25 in FIG. 3.

The 3D video TS generating unit having such a configuration is provided in the recording device, whereby encoding of the MVC header of each Access Unit storing the data of Base view video can be prohibited. Also, an MVC header in which view_id of 1 or more is set may be included in each Access Unit storing the data of Dependant view video.

Figure 34:
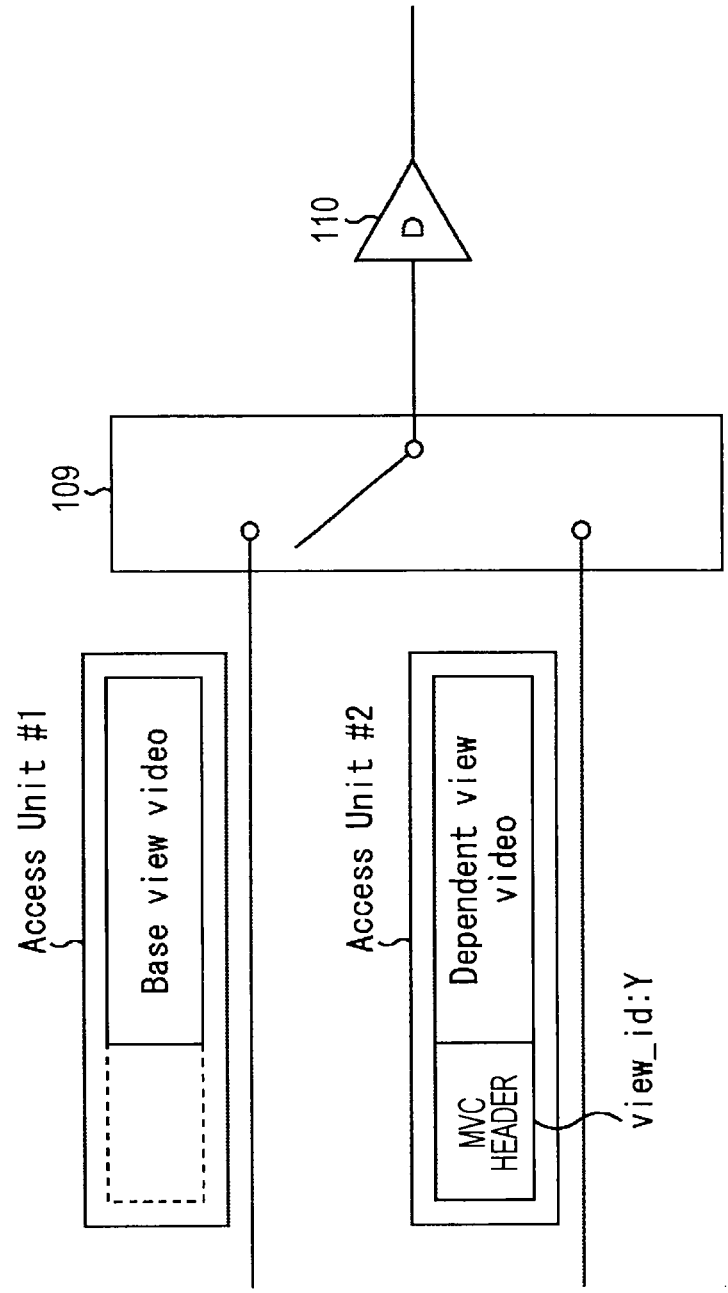
FIG. 34 is a diagram illustrating a configuration on a playback device side for decoding Access Units.

FIG. 34 is a diagram illustrating a configuration of the playback device 1 side for decoding Access Units.

FIG. 34 illustrates the switch 109 and the video decoder 110 described with reference to FIG. 22 and so forth. Access Unit #1 including the data of Base view video and Access Unit #2 including the data of Dependent view video are read from a buffer and are supplied to the switch 109.

Encoding is performed with reference to Base view video, and thus it is necessary to decode the corresponding Base view video in order to correctly decode Dependent view video.

In the H.264/MVC standard, a decoder side calculates the decoding order of individual Access Units using view_id included in MVC headers. Also, in Base view video, it is defined that a minimum value is constantly set as the value of view_id at the time of encoding. The decoder starts decoding from the Access Unit including the MVC header in which the minimum view_id is set, thereby being able to decode Base view video and Dependent view video in correct order.

Incidentally, encoding of an MVC header is prohibited in an Access Unit storing Base view video supplied to the video decoder 110 of the playback device 1.

Therefore, in the playback device 1, the view component stored in an Access Unit without an MVC header is defined to be recognized that the view_id thereof is 0.

Accordingly, the playback device 1 can identify Base view video on the basis of view_id which is recognized as 0, and can identify Dependent view video on the basis of the actually set view_id other than 0.

The switch 109 in FIG. 34 first outputs Access Unit #1, in which it is recognized that the minimum value 0 is set as view_id, to the video decoder 110, and causes decoding to be performed.

Also, after decoding of Access Unit #1 has ended, the switch 109 outputs Access Unit #2 in which Y as a fixed value larger than 0 is set as view_id to the video decoder 110, and causes decoding to be performed. The picture of Dependent view video stored in Access Unit #2 is a picture corresponding to the picture of Base view video stored in Access Unit #1.

In this way, encoding of an MVC header in an Access Unit storing Base view video is prohibited, whereby the Base view video stream recorded on the optical disc 2 can be regarded as a stream that can be played back even in a conventional player.

Even in a case where a condition that a stream can be played back even in a conventional player is set as a condition of a Base view video stream of the BD-ROM 3D standard expanded from the BD-ROM standard, the condition can be satisfied.

Figure 35:
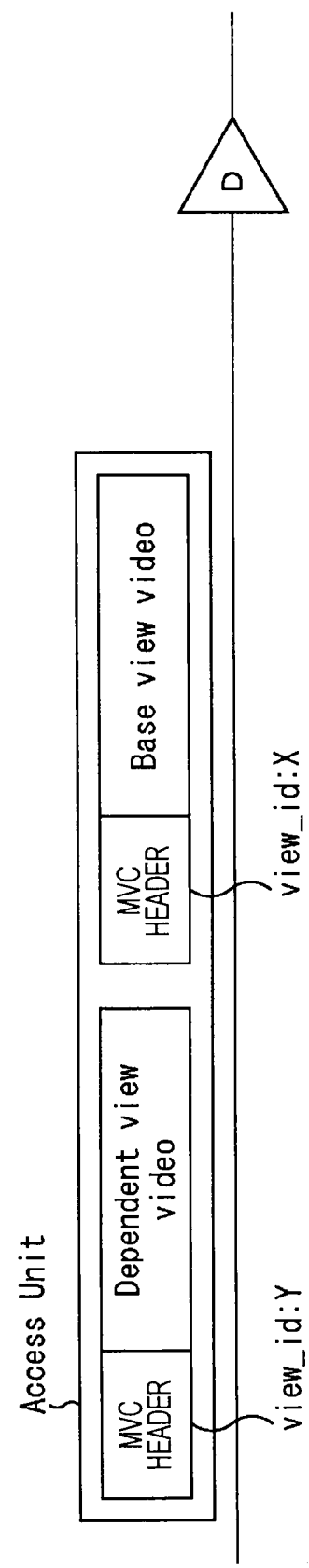
FIG. 35 is a diagram illustrating a decoding process.

For example, as illustrated in FIG. 35, in a case where MVC headers are added to Base view video and Dependent view video, respectively, and where decoding of Base view video is performed first, the Base view video cannot be played back in a conventional player. The MVC header is undefined data for an H.264/AVC decoder mounted in a conventional player. In a case where such undefined data is input, some decoders cannot ignore the data, and the processing may fail.

Note that, in FIG. 35, view_id of Base view video is X, and view_id of Dependent view video is Y, which is larger than X.

Also, even in a case where encoding of MVC headers is prohibited, the playback device 1 can be caused to first perform decoding of Base view video, and then to perform decoding of corresponding Dependent view video by making definition so that view_id of Base view video is regarded as 0. That is, decoding can be performed in correct order.

[Operation 2]

About GOP Structure

In the H.264/AVC standard, the GOP (Group Of Pictures) structure in the MPEG-2 video standard is not defined.

Therefore, in the BD-ROM standard for handling an H.264/AVC video stream, the GOP structure of an H.264/AVC video stream is defined, and various types of functions using a GOP structure, such as random access, are realized.

In a Base view video stream and a Dependent view video stream, which are video streams obtained through encoding using H.264 AVC/MVC, the definition of a GOP structure does not exist as in the H.264/AVC video stream.

The Base view video stream is an H.264/AVC video stream. Thus, the GOP structure of the Base view video stream is the same as the GOP structure of the H.264/AVC video stream defined in the BD-ROM standard.

The GOP structure of the Dependent view video stream is also defined as the same structure as the GOP structure of the Base view video stream, that is, the GOP structure of the H.264/AVC video stream defined in the BD-ROM standard.

The GOP structure of the H.264/AVC video stream defined in the BD-ROM standard has the following features.

1. Features about Stream Structure (1) Open GOP/Closed GOP structure

Figure 36:
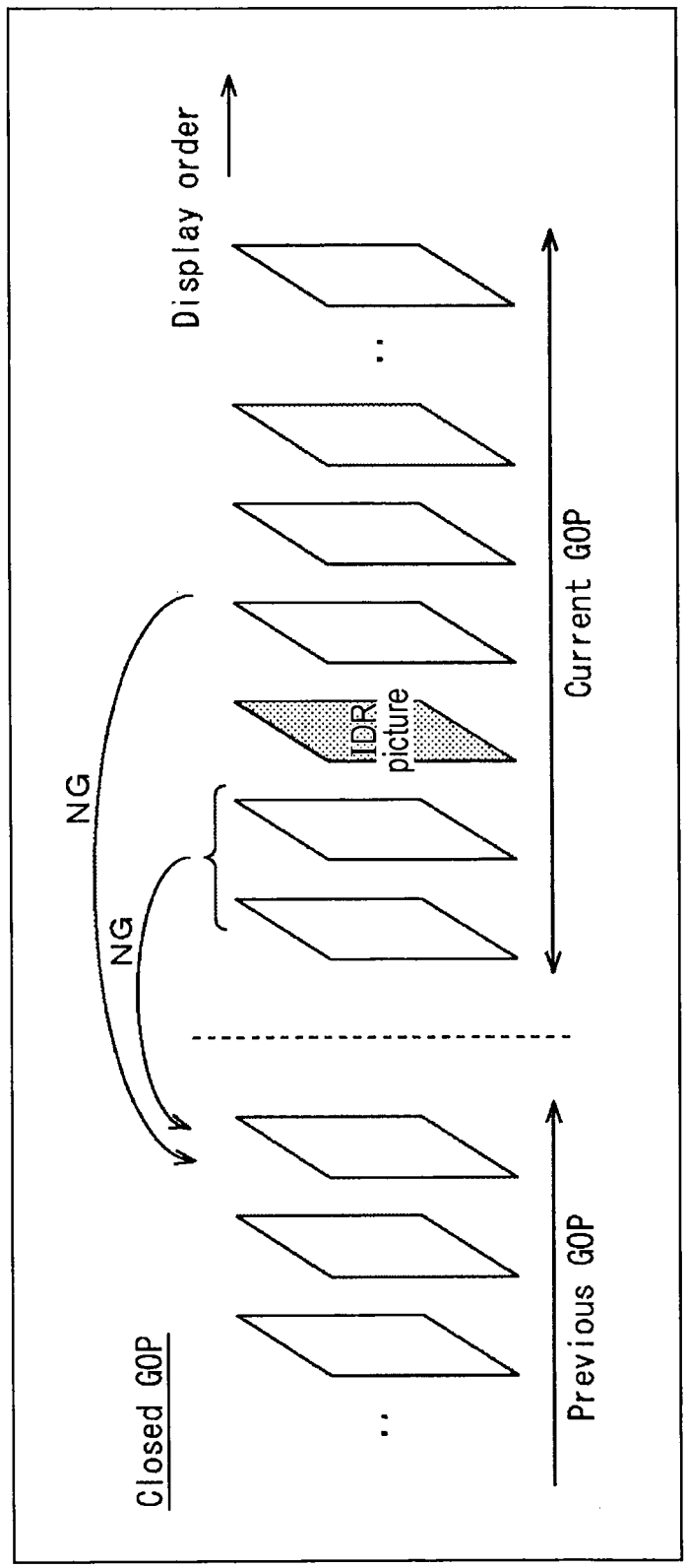
FIG. 36 is a diagram illustrating a Close GOP structure.

FIG. 36 is a diagram illustrating a Closed GOP structure.

The individual pictures in FIG. 36 are pictures constituting an H.264/AVC video stream. A Closed GOP includes an IDR (Instantaneous Decoding Refresh) picture.

The IDR picture is an I picture, which is first decoded in the GOP including the IDR picture. At the time of decoding the IDR picture, all pieces of information about decoding, such as the status of the reference picture buffer (DPB 151 in FIG. 22), and frame numbers and POC (Picture Order Count) managed so far, are reset.

As illustrated in FIG. 36, in the current GOP, which is a Closed GOP, the previous (past) pictures with respect to the IDR picture in display order among the pictures of the current GOP are prohibited from referring to the pictures of the previous GOP.

Also, among the pictures of the current GOP, the subsequent (future) pictures with respect to the IDR picture in display order are prohibited from referring to the pictures of the previous GOP beyond the IDR picture. In H.264/AVC, it is permitted that a P picture after an I picture in display order refers to a picture before the I picture.

Figure 37:
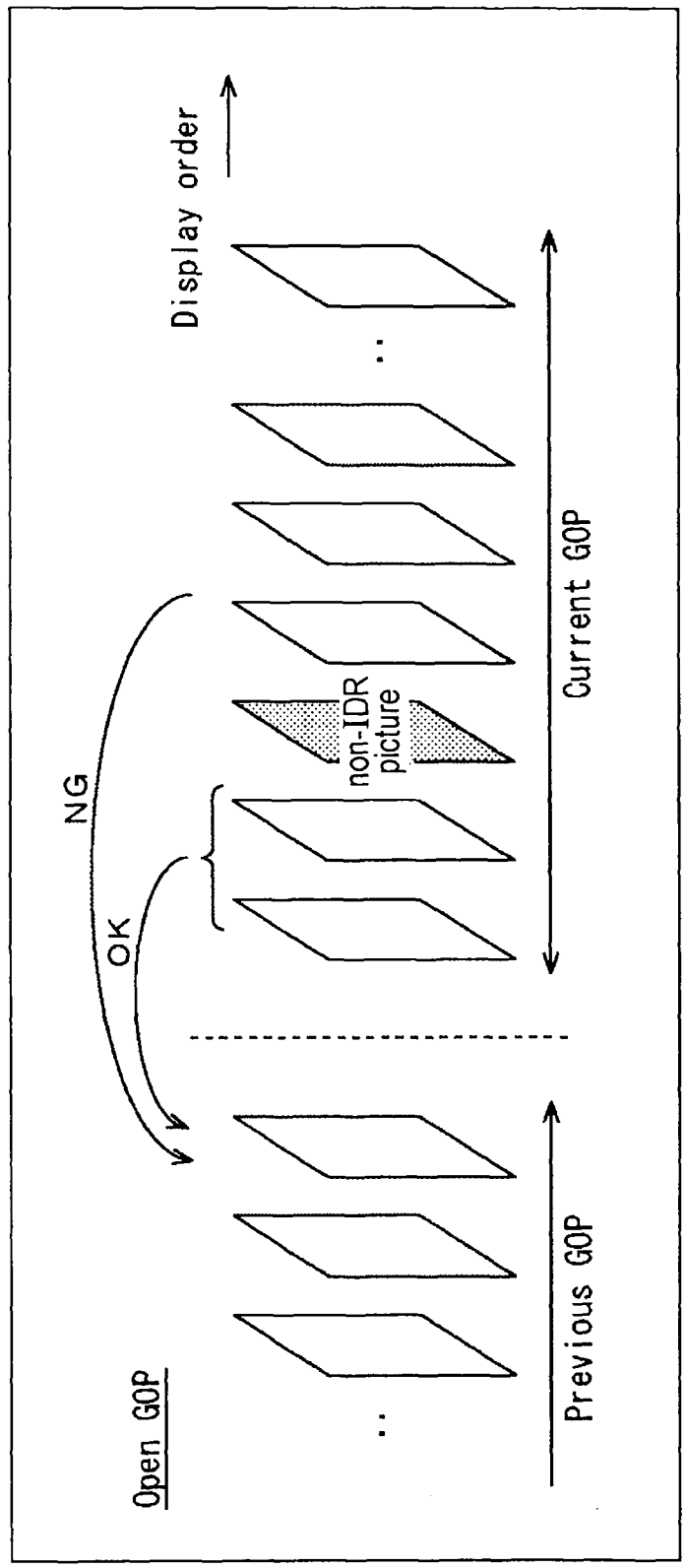
FIG. 37 is a diagram illustrating an Open GOP structure.

FIG. 37 is a diagram illustrating an Open GOP structure.

As illustrated in FIG. 37, in the current GOP, which is an Open GOP, the pictures before a non-IDR I picture (I picture that is not an IDR picture) in display order among the pictures of the current GOP are permitted to refer to the pictures of the previous GOP.

Also, among the pictures of the current GOP, the pictures after the non-IDR I picture in display order are prohibited from referring to the pictures of the previous GOP beyond the non-IDR I picture.

(2) SPS and PPS are reliably encoded in the first Access Unit of a GOP.

The SPS (Sequence Parameter Set) is header information of a sequence, which includes information about encoding of the entire sequence. At the start of decoding of a certain sequence, an SPS including the identification information of the sequence is necessary. The PPS (Picture Parameter Set) is header information of a picture, which includes information about encoding of the entire picture.

(3) A maximum of 30 PPSs can be encoded in the first Access Unit of a GOP. In a case where a plurality of PPSs are encoded in the first Access Unit, the id (pic_parameter_set_id) of each PPS should not be the same.

(4) A maximum of 1 PPS can be encoded in an Access Unit other than the first Access Unit of a GOP.

2. Features about Reference Structure (1) I, P, and B pictures are required to be pictures constituted by only I, P, and B slices, respectively.

(2) The B picture immediately before a reference picture (I or P picture) in display order is required to be reliably encoded immediately after the reference picture in encoding order.

(3) The encoding order and display order of a reference picture (I or P picture) are required to be maintained (be the same).

(4) Referring to a B picture from a P picture is prohibited.

(5) In a case where a non-reference B picture (B1) is before a non-reference picture (B2) in encoding order, the B1 is required to be before the B2 also in display order.

A non-reference B picture is a B picture that is not referred to by another subsequent picture in encoding order.

(6) The reference B picture can refer to the previous or subsequent reference picture (I or P picture) in display order.

(7) The non-reference B picture can refer to the previous or subsequent reference picture (I or P picture) in display order, or the reference B picture.

(8) It is required that the maximum number of sequential B pictures is 3.

3. Features about the Maximum Number of Frames and Fields in GOP

The maximum number of frames and fields in a GOP is specified in accordance with the frame rate of video, as illustrated in FIG. 38.

As illustrated in FIG. 38, in a case where interlace display is performed with a frame rate of 29.97 frames per second, for example, the maximum number of fields that can be displayed with pictures of 1 GOP is 60. Also, in a case where progressive display is performed with a frame rate of 59.94 frames per second, the maximum number of frames that can be displayed with pictures of 1 GOP is 60.

The GOP structure having the foregoing features is also defined as the GOP structure of a Dependent view video stream.

Also, matching between the structure of a certain GOP of a Base view video stream and the structure of the corresponding GOP of a Dependent view video stream is defined as constraint.

Figure 39:
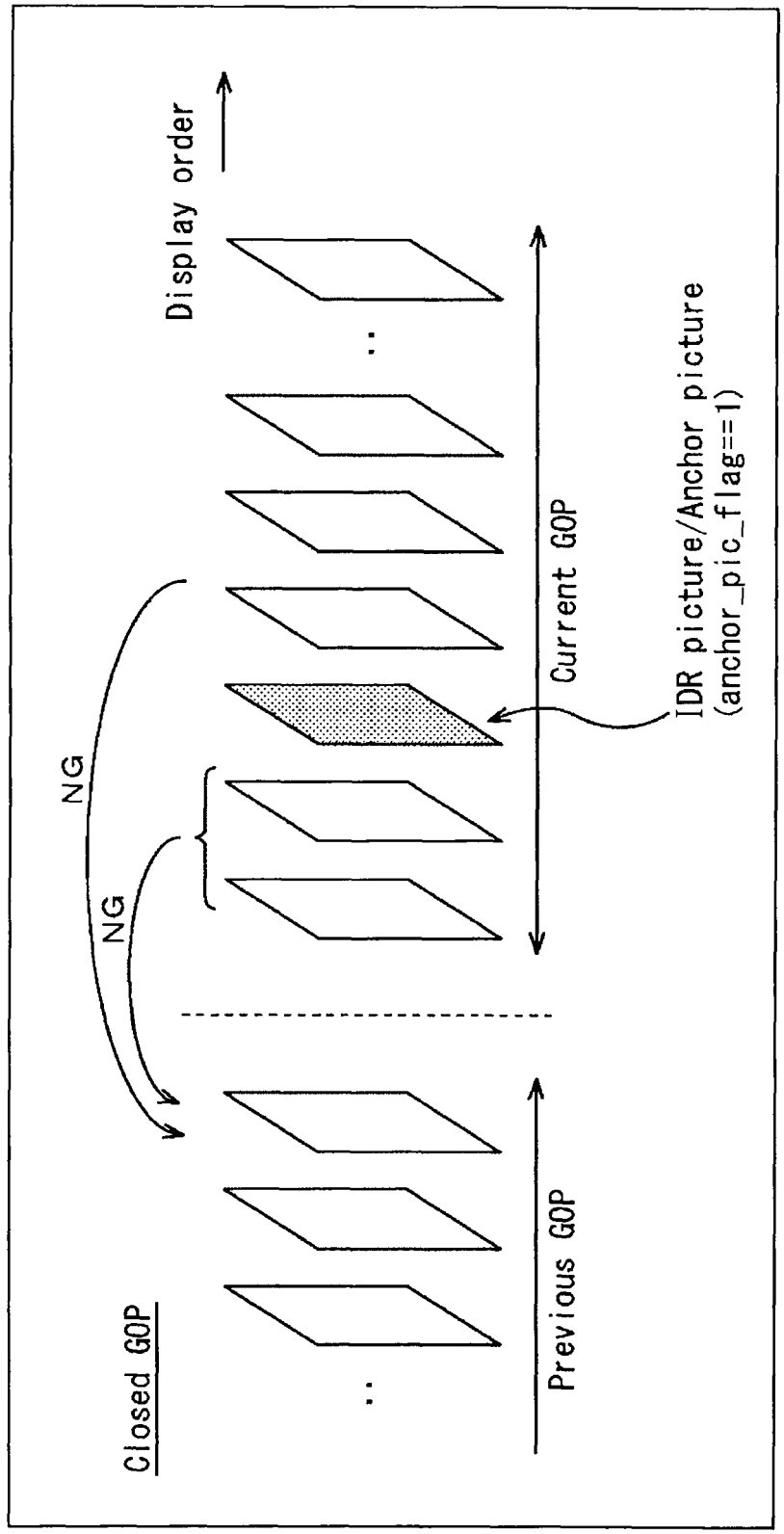
FIG. 39 is a diagram illustrating a Close GOP structure.

FIG. 39 illustrates a Closed GOP structure of a Base view video stream or a Dependent view video stream defined in the manner described above.

As illustrated in FIG. 39, in the current GOP, which is a Closed GOP, the previous (past) pictures with respect to an IDR picture or anchor picture among the pictures of the current GOP are prohibited from referring to the pictures of the previous GOP. The anchor picture will be described blow.

Also, among the pictures of the current GOP, the subsequent (future) pictures with respect to the IDR picture or anchor picture in display order are prohibited from referring to the pictures of the previous GOP beyond the IDR picture or anchor picture.

Figure 40:
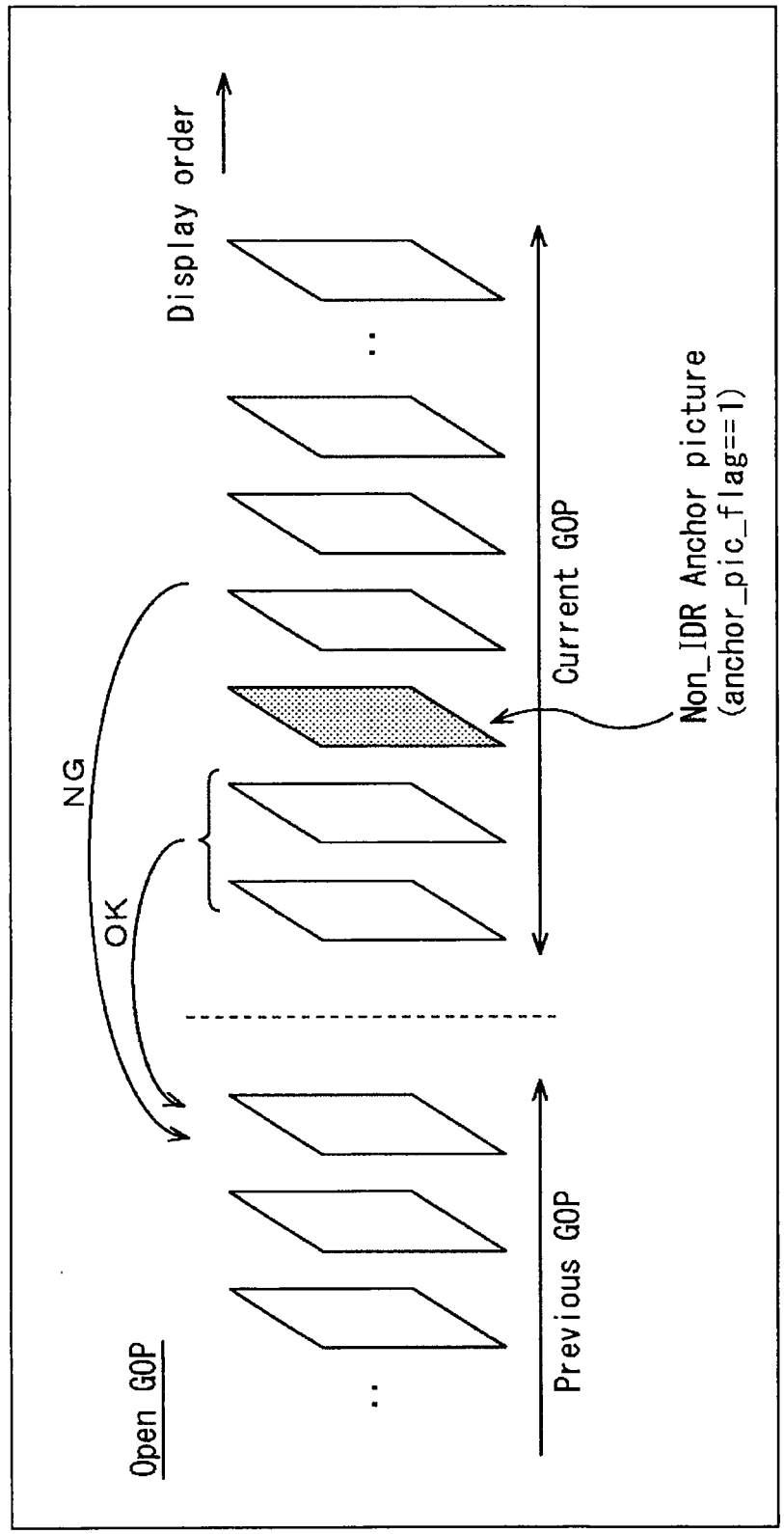
FIG. 40 is a diagram illustrating an Open GOP structure.

FIG. 40 is a diagram illustrating an Open GOP structure of a Base view video stream or a Dependent view video stream.

As illustrated in FIG. 40, in the current GOP, which is an Open GOP, the pictures before a non-IDR anchor picture (anchor picture that is not an IDR picture) in display order among the pictures of the current GOP are permitted to refer to the pictures of the previous GOP.

Also, among the pictures of the current GOP, the pictures after the non-IDR anchor picture in display order are prohibited from referring to the pictures of the previous GOP beyond the non-IDR anchor picture.

The GOP structure is defined in this way, whereby the features of stream structures, an Open GOP or a Closed GOP, match between a certain GOP of a Base view video stream and the corresponding GOP of a Dependent view video stream.

Also, the features of reference structures of pictures match, that is, the picture of Dependent view video corresponding to the non-reference B picture of Base view video is reliably a non-reference B picture.

Furthermore, the number of frames and the number of fields match between a certain GOP of a Base view video stream and the corresponding GOP of a Dependent view video stream.

In this way, the GOP structure of a Dependent view video stream is defined as the same structure as the GOP structure of a Base view video stream, whereby the same features can be given to the GOPs corresponding to each other of streams.

Also, even in the case of performing decoding from a middle of a stream, the decoding can be performed without problems. Decoding from a middle of a stream is performed in trick play or random access, for example.

In a case where the structures of the GOPs corresponding to each other of streams are different, for example, in a case where the numbers of frames are different, the following situation may occur: one of the streams can be normally played back but the other stream cannot be played back. However, such a situation can be prevented.

In a case where decoding is started from a middle of a stream while it is assumed that the structures of GOPs corresponding to each other between streams are different, the following situation may occur: a picture of Base view video that is necessary for decoding Dependent view video is not decoded. In this case, as a result, a picture of Dependent view video cannot be decoded, so that 3D display cannot be performed. Also, it is possible that an image of Base view video cannot be output depending on a mounting method, but such inconvenience can be prevented.

About EP_map

With the use of the GOP structures of a Base view video stream and a Dependent view video stream, the start position of decoding at the time of random access or trick play can be set to EP_map. EP_map is included in a Clip Information file.

The following two constraints are given as the constraints of a picture that can be set to EP_map as a decoding start position.

1. The position of an anchor picture disposed after SubsetSPS or the position of an IDR picture disposed after SubsetSPS is regarded as the position that can be set to a Dependent view video stream.

The anchor picture is a picture defined in H.264 AVC/MVC, and is a picture of a Dependent view video stream encoded by performing reference between views without performing reference in the time direction.

2. In a case where a certain picture of a Dependent view video stream is set to EP_map as a decoding start position, the corresponding picture of a Base view video stream is also set to EP_map as the decoding start position.

Figure 41:
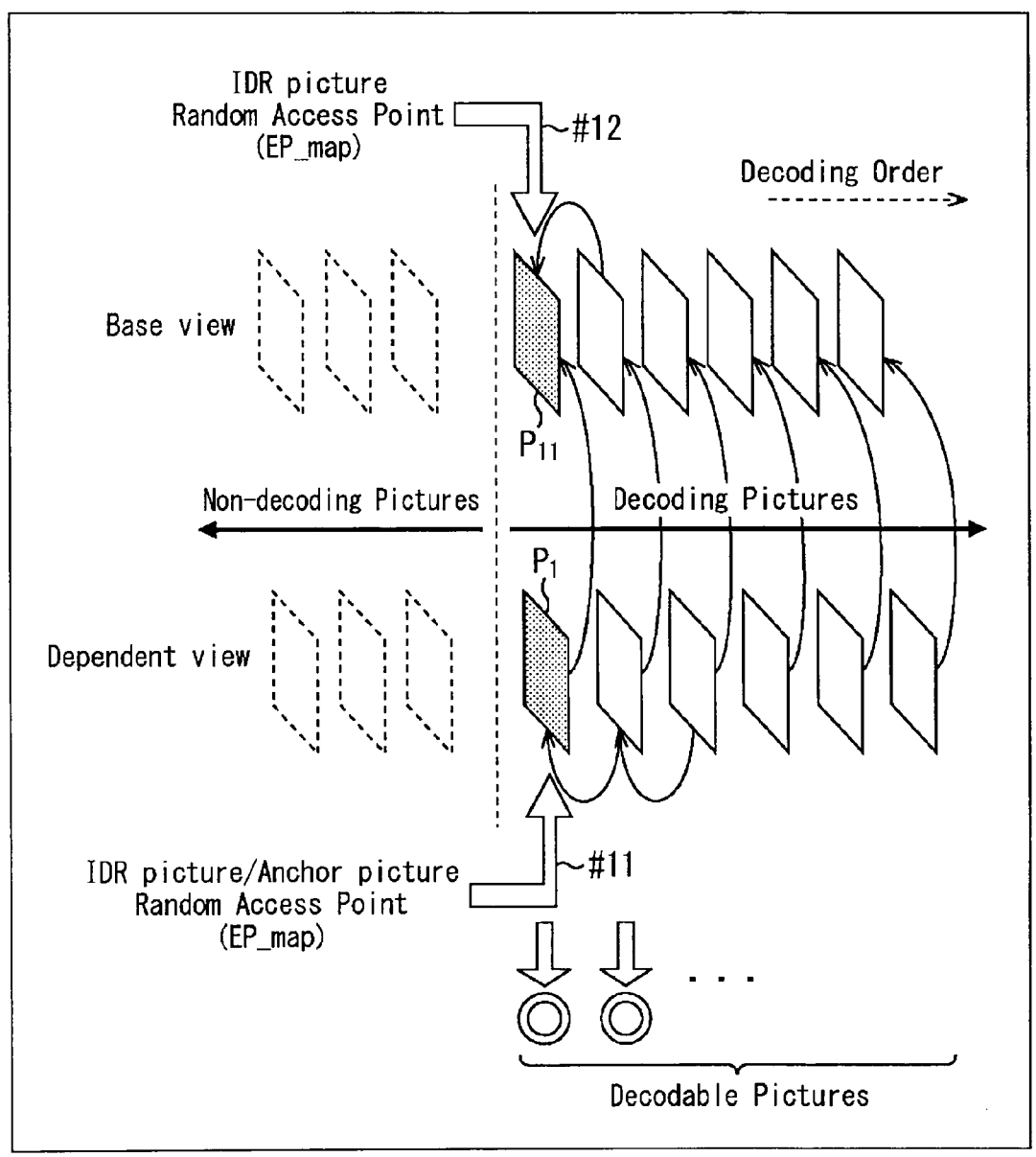
FIG. 41 is a diagram illustrating an example of a decoding start position set to EP_map.

FIG. 41 is a diagram illustrating an example of a decoding start position that is set to EP_map satisfying the above-described two constraints.

In FIG. 41, the pictures constituting a Base view video stream and the pictures constituting a Dependent view video stream are illustrated in decoding order.

Among the pictures of the Dependent view video stream, a picture $P_1$ shown with a color is an anchor picture or an IDR picture. SubsetSPS is included in the Access Unit immediately before the Access Unit including the data of the picture $P_1$.

In the example in FIG. 41, as indicated by a white arrow #11, the picture $P_1$ is set as a decoding start position to EP_map of the Dependent view video stream.

A picture $P_{11}$, which is the picture of the Base view video stream corresponding to the picture $P_1$, is an IDR picture. As indicated by a white arrow #12, the picture $P_{11}$ serving as an IDR picture is also set as a decoding start position to EP_map of the Base view video stream.

In the case of starting decoding from the picture $P_1$ and the picture $P_{11}$ in response to an instruction of random access or trick play, decoding of the picture $P_{11}$ is performed first. The picture $P_{11}$, which is an IDR picture, can be decoded without reference to another picture.

After decoding of the picture $P_{11}$ has ended, the picture $P_1$ is decoded next. The decoded picture $P_{11}$ is referred to during decoding of the picture $P_1$. The picture $P_1$, which is an anchor picture or an IDR picture, can be decoded if decoding of the picture $P_{11}$ is completed.

After that, decoding is performed in order of the next picture of the picture $P_1$ of Base view video, the next picture of the picture $P_{11}$ of Dependent view video . . . , and so forth.

Since the structures of the corresponding GOPs are the same and decoding is started from the corresponding positions, the pictures set to EP_map and the pictures thereafter can be decoded without problems for both Base view video and Dependent view video. Accordingly, random access can be realized.

The pictures arranged on the left to the dotted line extending in the vertical direction in FIG. 41 are pictures that are not decoded.

Figure 42:
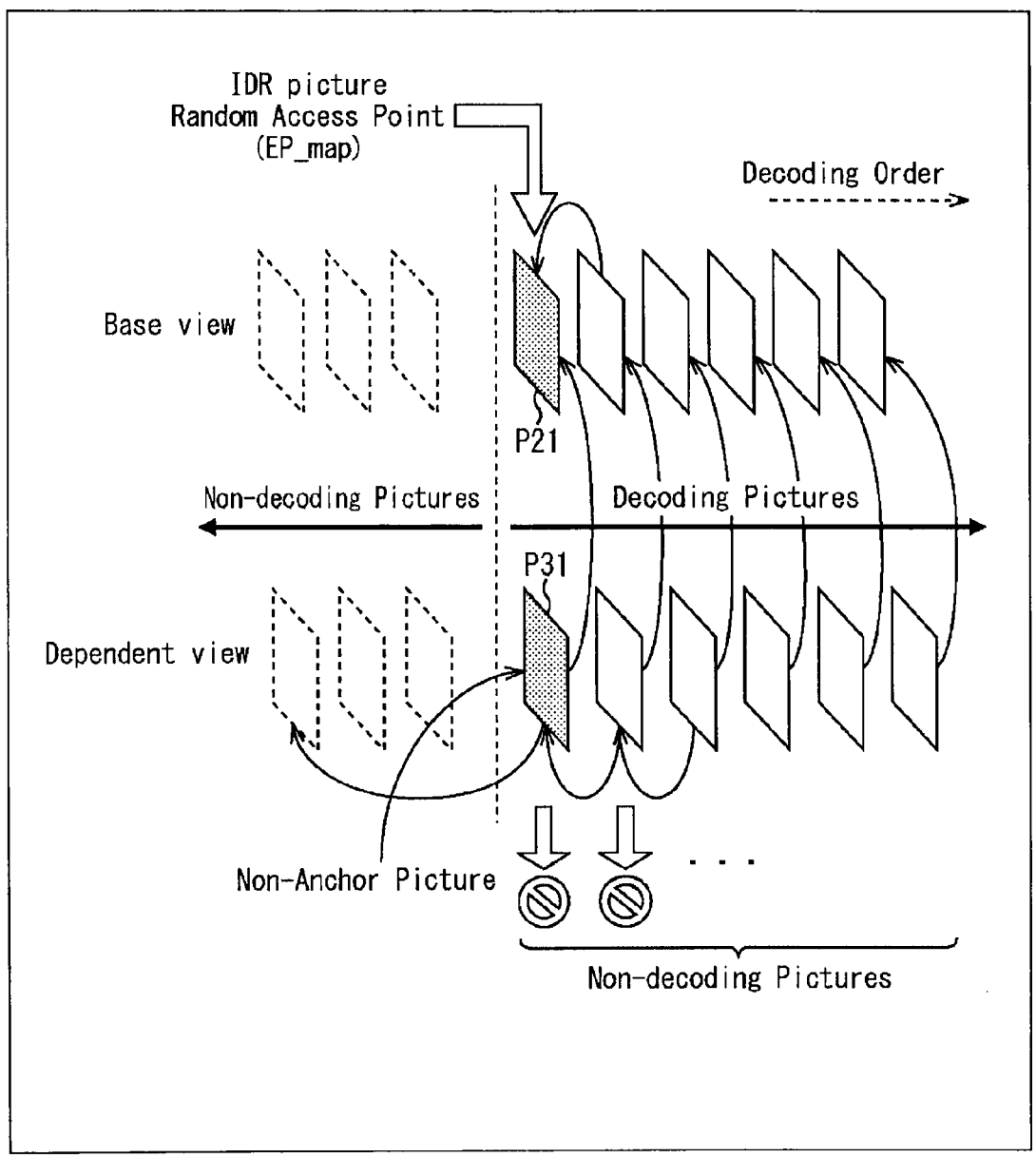
FIG. 42 is a diagram illustrating a problem that arises in a case where a GOP structure of Dependent view video is not defined.

FIG. 42 is a diagram illustrating a problem that arises in a case where the GOP structure of Dependent view video is not defined.

In the example in FIG. 42, a picture $P_{21}$ shown with a color, which is an IDR picture of Base view video, is set to EP_map as a decoding start position.

Assume a case where a picture $P_{31}$, which is the picture of Dependent view video corresponding to the picture $P_{21}$, is not an anchor picture in the case of starting decoding from the picture $P_{21}$ of Base view video. In a case where a GOP structure is not defined, it is not assured that the picture of Dependent view video corresponding to the IDR picture of Base view video is an IDR picture or an anchor picture.

In this case, even after decoding of the picture $P_{21}$ of Base view video has ended, the picture $P_{31}$ cannot be decoded. Reference in the time direction is also necessary for decoding the picture $P_{31}$, but the pictures on the left to the dotted line extending in the vertical direction (previous pictures in decoding order) are not decoded.

The picture $P_{31}$ cannot be decoded, and accordingly, the other pictures of Dependent view video that refer to the picture $P_{31}$ cannot be decoded.

Such a situation can be avoided by defining the GOP structure of the Dependent view video stream.

The decoding start position is set with EP-map in not only Base view video but also Dependent view video, whereby the playback device 1 can easily specify the decoding start position.

In a case where only a certain picture of Base view video is set to EP_map as a decoding start position, the playback device 1 needs to specify the picture of Dependent view video corresponding to the picture at the decoding start position using calculation, which complicates the process.

Even if the pictures corresponding to each other of Base view video and Dependent view video have the same DTS/PTS, byte arrays in TSs cannot be matched if the bit rates of the videos are different from each other, which complicates the process.

Figure 43:
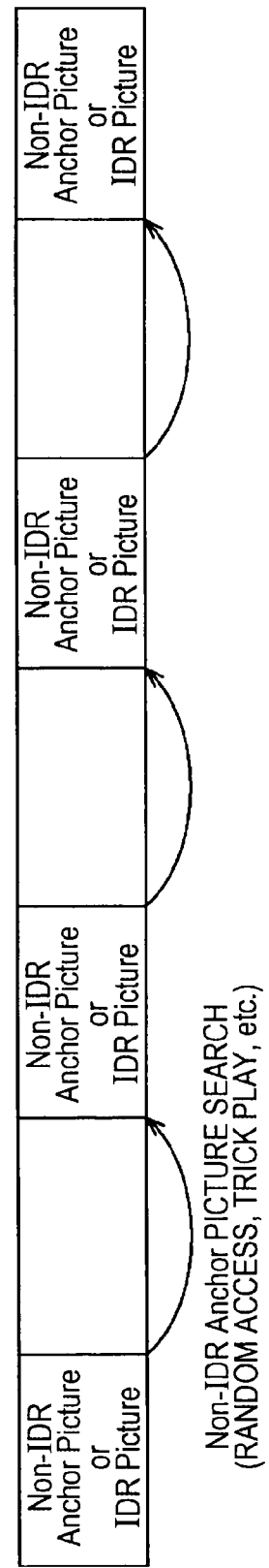
FIG. 43 is a diagram illustrating the concept of picture search.

FIG. 43 is a diagram illustrating the concept of picture search that is necessary for performing random access or trick play on an MVC stream constituted by a Base view video stream and a Dependent view video stream.

As illustrated in FIG. 43, when random access or trick play is performed, a non-IDR anchor picture or an IDR picture is searched for, and a decoding start position is determined.

Now, EP_map will be described. A description will be given of a case where the decoding start position of Base view video is set to EP_map. Likewise, the decoding start position of Dependent view video is set to EP_map of Dependent view video.

Figure 44:
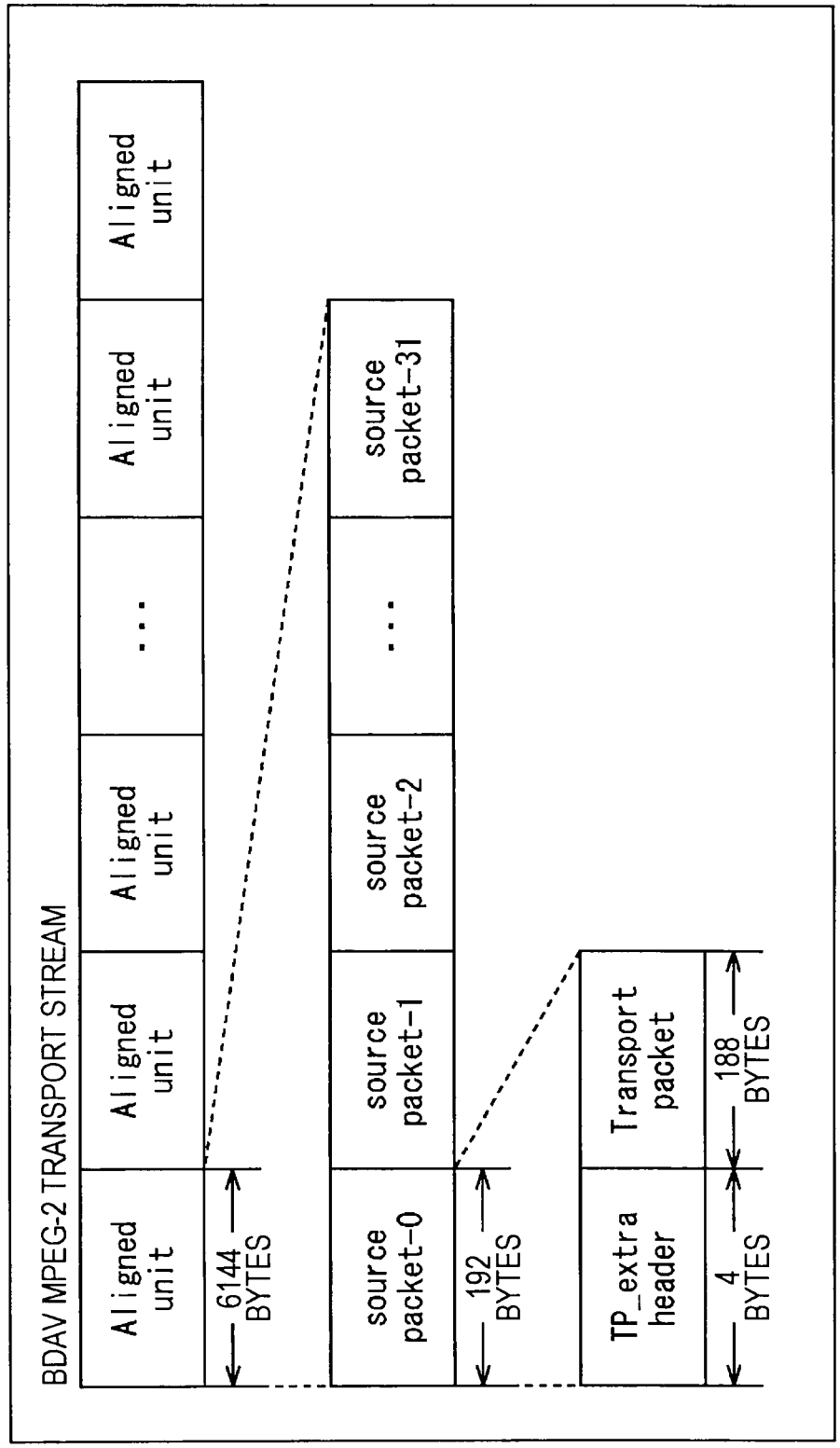
FIG. 44 is a diagram illustrating a structure of an AV stream recorded on an optical disc.

FIG. 44 is a diagram illustrating the structure of an AV stream recorded on the optical disc 2.

A TS including a Base view video stream is composed of an integer number of aligned units (Aligned Units) having a size of 6144 bytes.

Each aligned unit is composed of 32 source packets (Source Packets). Each source packet has 192 bytes. One source packet is composed of a 4-byte transport packet extra header (TP_extra header) and a 188-byte transport packet (Transport Packet).

The data of Base view video is packetized into MPEG2 PES packets. A PES packet is formed by adding a PES packet header to the data portion of the PES packet. The PES packet header includes a stream ID that specifies the type of elementary stream transmitted by the PES packet.

The PES packet is further packetized into transport packets. That is, the PES packet is divided into the size of the payload of a transport packet, a transport packet header is added to the payload, whereby a transport packet is formed. The transport packet header includes a PID, which is the identification information of data stored in the payload.

Note that a source packet number, which is incremented by one for every source packet with the head of a Clip AV stream being 0, for example, is given to each source packet. Also, an aligned unit starts from the first byte of a source packet.

EP_map is used to search for a data address at which data reading should be started in a Clip AV stream file when a time stamp of an access point of Clip is given. EP_map is a list of entry points extracted from an elementary stream and a transport stream.

EP_map has address information for searching for an entry point at which decoding should be started in an AV stream. One piece of EP data in EP_map is composed of a pair of a PTS and an address in the AV stream of the Access Unit corresponding to the PTS. In AVC/H.264, the data of one picture is stored in one Access Unit.

Figure 45:
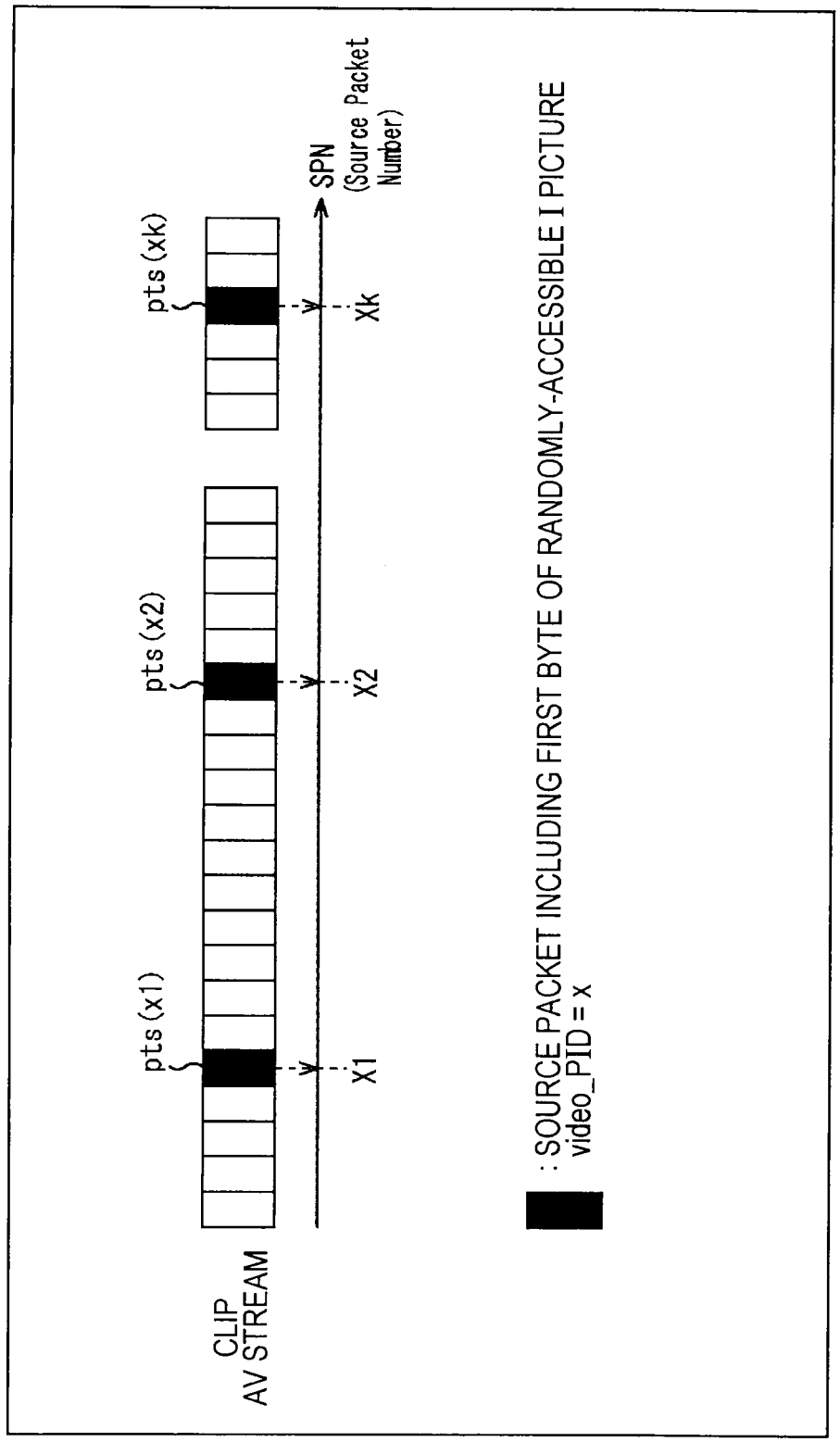
FIG. 45 is a diagram illustrating an example of a Clip AV stream.

FIG. 45 is a diagram illustrating an example of a Clip AV stream.

The Clip AV stream in FIG. 45 is a video stream (Base view video stream) composed of source packets identified by PID=x. It the video stream, each source packet is distinguished by a PID included in the header of the transport packet in the source packet.

In FIG. 45, among the source packets of the video stream, a source packet including the first byte of an IDR picture is colored. Rectangles without color represent a source packet including data that is not a random access point and a source packet including the data of another stream.

For example, a source packet that has a source packet number X1 and that includes the first byte of a randomly-accessible IDR picture of the video stream distinguished by PID=x is disposed at the position PTS=pts(x1) on the time axis of the Clip AV stream.

Likewise, a source packet that includes the first byte of a next randomly-accessible IDR picture is regarded as a source packet having a source packet number X2, and is disposed at the position PTS=pts(x2).

Figure 46:
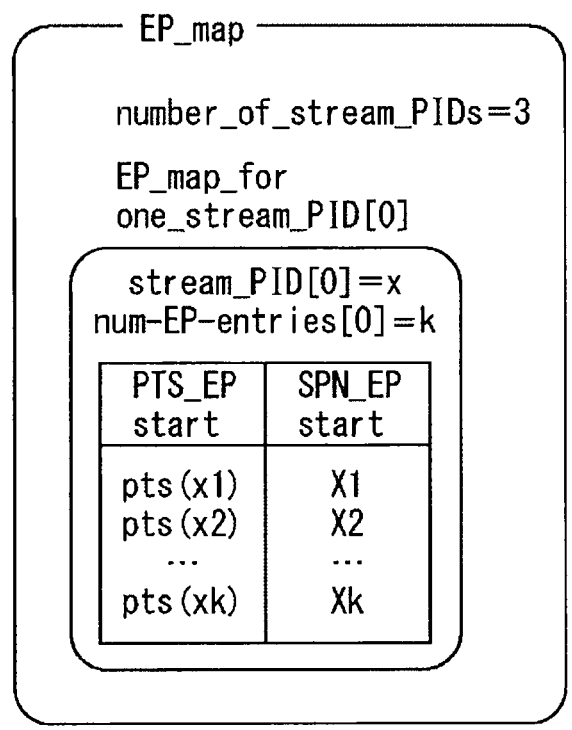
FIG. 46 is a diagram conceptually illustrating EP_map corresponding to the Clip AV stream in FIG. 45.

FIG. 46 is a diagram conceptually illustrating an example of EP_map corresponding to the Clip AV stream in FIG. 45.

As illustrated in FIG. 46, EP_map is composed of stream_PID, PTS_EP_start, and SPN_EP_start.

stream_PID represents the PID of a transport packet for transmitting a video stream.

PTS_EP_start represents the PTS of an Access Unit starting from a randomly-accessible IDR picture.

SPN_EP_start represents the address of a source packet including the first byte of an Access Unit that is referred to by the value of PTS_EP_start.

The PID of a video stream is stored in stream_PID, and EP_map_for_one_stream_PID( ), which is table information showing the correspondence between PTS_EP_start and SPN_EP_start, is generated.

For example, in EP_map_for_one_stream_PID[0] of the video stream of PID=x, PTS=pts(x1) and the source packet number X1, PTS=pts(x2) and the source packet number X2, . . . , and PTS=pts(xk) and the source packet number Xk are described in a corresponding manner.

Such a table is also generated for the individual video streams multiplexed into the same Clip AV stream. EP_map including the generated tables is stored in the Clip Information file corresponding to the Clip AV stream.

Figure 47:
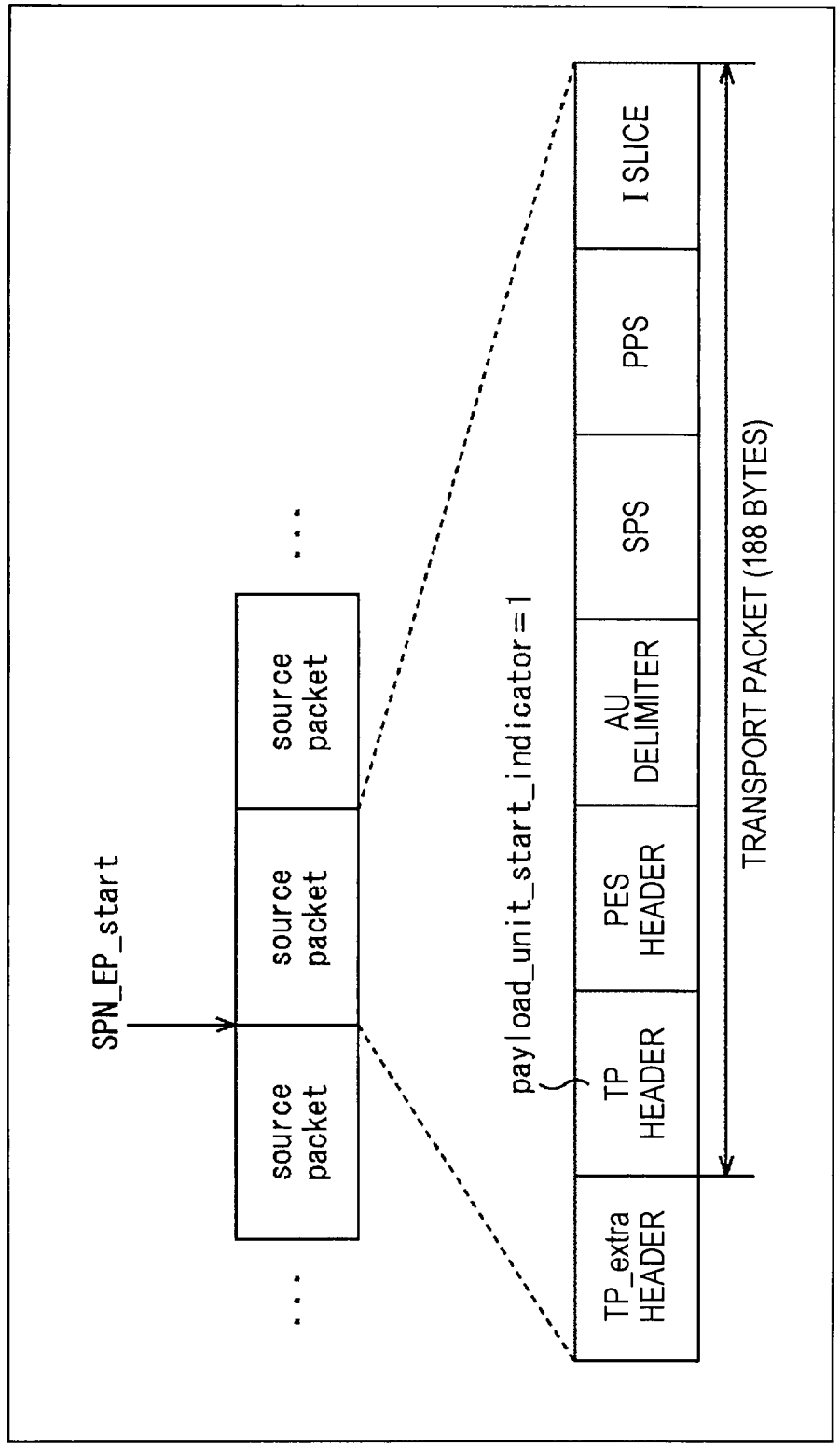
FIG. 47 is a diagram illustrating an example of a data structure of a source packet indicated by SPN_EP_start.

FIG. 47 is a diagram illustrating an example of a data structure of the source packet indicated by SPN_EP_start.

As described above, a source packet is constituted in a form where a 4-byte header is added to a 188-byte transport packet. The transport packet portion is composed of a header portion (TP header) and a payload portion. SPN_EP_start represents the source packet number of a source packet including the first byte of an Access Unit starting from an IDR picture.

In AVC/H.264, an Access Unit, that is, a picture starts from an AU delimiter (Access Unit Delimiter). The AU delimiter is followed by SPS and PPS. After that, the head portion or the entire portion of the data of a slice of an IDR picture is stored.

The value of payload_unit_start_indicator in the TP header of the transport packet being 1 represents that a new PES packet starts from the payload of this transport packet. An Access Unit starts from this source packet.

Such EP_map is prepared for each of a Base view video stream and a Dependent view video stream.

[Operation 3]

A POC (Picture Order Count) is set to the individual pictures constituting a Base view video stream and a Dependent view stream at the time of encoding. The POC is a value representing the display order of the picture.

In AVC/H.264, the POC is defined as follows: "A variable having a value that is non-decreasing with increasing picture position in output order relative to the previous IDR picture in decoding order or relative to the previous picture containing the memory management control operation that marks all reference pictures as "unused for reference"."

At the time of encoding, the POC set to a picture of a Base view video stream and the POC set to a picture of a Dependent view video stream are operated in a uniform manner.

For example, POC=1 is set to the first picture in display order of a Base view video stream. Thereafter, POCs are set to the individual pictures with incrementation by 1.

Also, POC=1, which is the same as that set to the first picture of the Base view video stream, is set to the first picture in display order of the Dependent view video stream. Thereafter, POCs are set to the individual pictures with incrementation by 1.

As described above, since the GOP structure of the Base view video stream is the same as the GOP structure of the Dependent view stream, the same POCs are set to the pictures corresponding to each other in display order in the individual pictures of the Base view video stream and the Dependent view video stream.

Accordingly, the playback device 1 can process the view components in which the same POCs are set by regarding them as view components corresponding to each other in display order.

For example, the playback device 1 is capable of processing the picture in which POC=1 is set among the pictures of a Base view video stream and the picture in which POC=1 is set among the pictures of a Dependent view video stream as pictures corresponding to each other.

Also, Picture Timing SEI (Supplemental Enhancement Information) is set in the individual pictures constituting the Base view video stream and the Dependent view video stream. SEI is additional information including auxiliary information about decoding, which is defined by H.264/AVC.

Picture Timing SEI, which is one of SEIs, includes time information, such as a time of read from a CPB (Coded Picture Buffer) at the time of encoding and a time of read from a DPB (DPB 151 in FIG. 22) at the time of decoding. Also, Picture Timing SEI includes information about a display time and information about a picture structure.

At the time of encoding, the Picture Timing SEI set to the pictures of a Base view video stream and the Picture Timing SEI set to the pictures of a Dependent view video stream are operated in a uniform manner.

For example, in a case where T1 is set as a time of read from the CPB to the first picture in encoding order of the Base view video stream, T1 is also set as a time of read from the CPB to the first picture in encoding order of the Dependent view video stream.

That is, the Picture Timing SEI having the same content is set to the pictures corresponding to each other in encoding order or decoding order among the individual pictures of the Base view video stream and the Dependent view video stream.

Accordingly, the playback device 1 is capable of processing the view components in which the same Picture Timing SEI is set as view components corresponding to each other in decoding order.

The POC and Picture Timing SEI are included in an elementary stream of Base view video and Dependent view video and are referred to by the video decoder 110 in the playback device 1.

The video decoder 110 is capable of identifying view components corresponding to each other on the basis of information included in the elementary stream. Also, the video decoder 110 is capable of performing a decoding process in correct decoding order on the basis of the Picture Timing SEI and in correct display order on the basis of the POC.

Since it is not necessary to refer to a Playlist or the like in order to identify view components corresponding to each other, measures can be taken when a problem occurs in a System Layer or a higher Layer. Also, decoder mounting independent of a Layer having a problem can be performed.

The above-described series of processes can be executed by hardware or software. In a case where the series of processes are executed by software, a program constituting the software is installed from a program recording medium into a computer incorporated in a dedicated hardware or a general-purpose personal computer.

Figure 48:
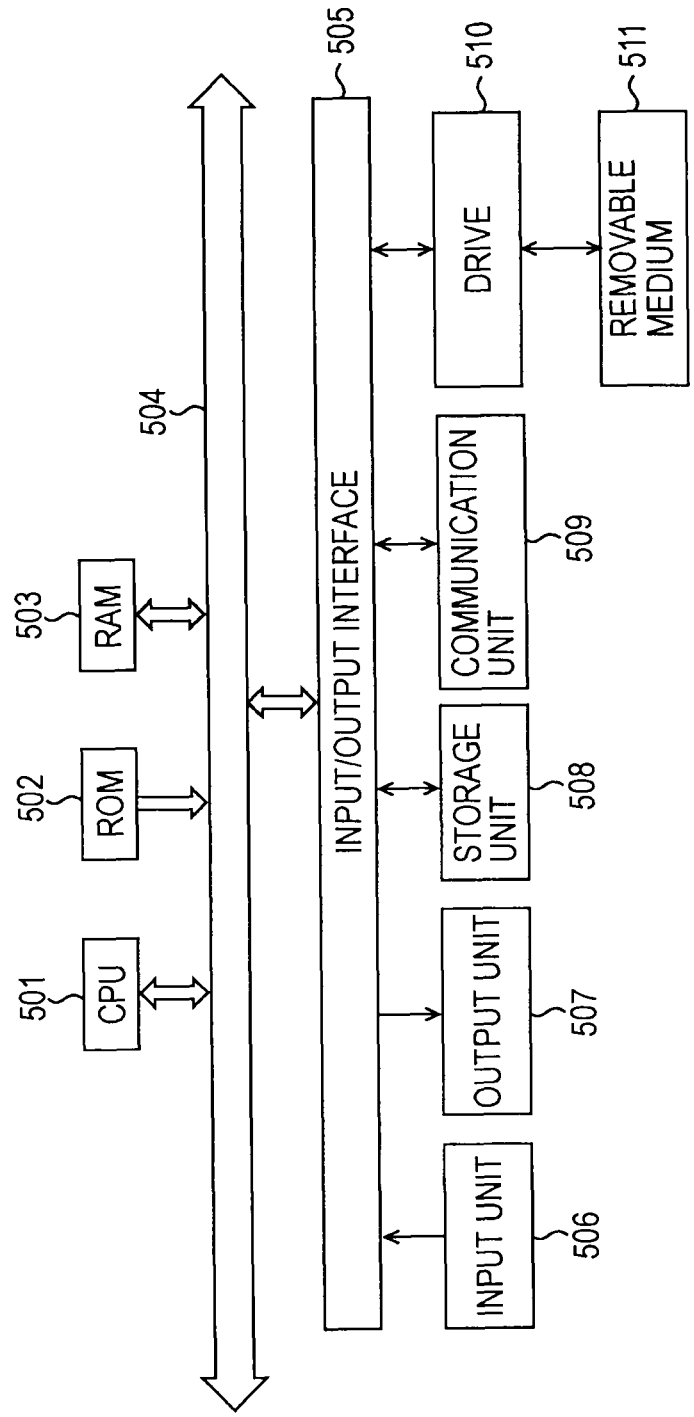
FIG. 48 is a block diagram illustrating a configuration example of hardware of a computer.

FIG. 48 is a block diagram illustrating a configuration example of hardware of a computer that executes the above-described series of processes in accordance with a program.

A CPU (Central Processing Unit) 501, a ROM (Read Only Memory) 502, and a RAM (Random Access Memory) 503 are mutually connected via a bus 504.

An input/output interface 505 is further connected to the bus 504. An input unit 506 including a keyboard, a mouse, etc., and an output unit 507 including a display, a speaker, etc., are connected to the input/output interface 505. Also, a storage unit 508 including a hard disk, a nonvolatile memory, etc., a communication unit 509 including a network interface or the like, and a drive 510 that drives a removable medium 511 are connected to the bus 504.

In the computer having the foregoing configuration, the CPU 501 loads a program stored in the storage unit 508 to the RAM 503 via the input/output interface 505 and the bus 504 and executes it, for example, whereby the above-described series of processes are performed.

The program executed by the CPU 501 is provided by being recorded on the removable medium 511, for example, or via a wired or wireless transmission medium, such as a local area network, the Internet, or digital broadcast, and is installed in the storage unit 508.

The program executed by the computer may be a program in which the processes are performed in time series along the order described in this specification, or may be a program in which the processes are performed in parallel or at necessary timing, such as when the processes are called.

An embodiment of the present invention is not limited to the above-described embodiment, and various changes can be performed without deviating from the scope of the present invention.

REFERENCE SIGNS LIST

1 playback device, 2 optical disc, 3 display device, 11 MVC encoder, 21 H.264/AVC encoder, 22 H.264/AVC decoder, 23 Depth calculating unit, 24 Dependent view video encoder, 25 multiplexer, 51 controller, 52 disc drive, 53 memory, 54 local storage, 55 Internet interface, 56 decoder unit, 57 operation input unit

The invention claimed is:

1. A recording device comprising:
a multi-view video coding (MVC) encoding means for encoding video data of a plurality of viewpoints, the MVC encoded video data having a base stream and at least one extended stream and for outputting:
the base stream of the MVC encoded video data that is not composed of a data header that includes identification information of a viewpoint such that the data header of the base stream is addressed during decoding as having a view id value of zero, and
the at least one extended stream of MVC encoded video data composed of a data header that includes the identification information, which has a view id with a non-zero value and which shows that the data is data of an expanded viewpoint; and
a recording means for recording the encoded video data on a computer readable medium.

2. The recording device according to claim 1,
wherein the data header is a multi-view video coding (MVC) data header, and
wherein the multi-view video coding (MVC) encoding means removes the MVC data header from the stream of base image that is obtained by encoding video data of a plurality of viewpoints using a predetermined encoding method and that is composed of data with the MVC data header, and outputs the stream of base image that is composed of data without the MVC data header.

3. The recording device according to claim 1, wherein the multi-view video coding (MVC) encoding means sets a value of one or more to the data header, the value serving as the identification information showing that the data is data of an expanded viewpoint, and outputs the stream of extended image.

4. A recording method comprising:
multi-view video coding (MVC) encoding, using a computing device having a microprocessor, video data of a plurality of viewpoints, the MVC encoded video data having a base stream and at least one extended stream; and
outputting:
the base stream of the MVC encoded video data that is not composed of a data header that includes identification information of a viewpoint such that the data header of the base stream is addressed during decoding as having a view id value of zero, and
the at least one extended stream of the MVC encoded video data composed of a data header that includes the identification information, which has a view id with a non-zero value and which shows that the data is data of an expanded viewpoint.

5. A non-transitory computer readable medium having stored thereon a program that when executed by a computer causes the computer to execute a process comprising:
multi-view video coding (MVC) encoding video data of a plurality of viewpoints, the MVC encoded video data having a base stream and at least one extended stream; and outputting:
the base stream of the MVC encoded video data that is not composed of a data header that includes identification information of a viewpoint such that the data header of the base stream is addressed during decoding as having a view id value of zero, and
the at least one extended stream of the MVC encoded video data composed of a data header that includes the identification information, which has a view id with a non-zero value and which shows that the data is data of an expanded viewpoint.

6. A playback device comprising:
reading means for reading, from a recording medium, a stream of base images that is obtained by:
multi-view video coding (MVC) encoding video data of a plurality of viewpoints, the MVC encoded video data having a base stream and at least one extended stream and outputting:
the base stream of the MVC encoded video data that is not composed of a data header that includes identification information of a viewpoint, and
the at least one extended stream of the MVC encoded video data composed of a data header that includes the identification information having a value of one or more showing that the data is data of an expanded viewpoint; and
decoding means for addressing the data header of the base stream as one having a view id value of zero set as the identification information in the data header for a process performed sequentially from data of a viewpoint, and for decoding the data of the base stream before decoding the data of the stream of extended image.

7. A playback method comprising:
reading, from a recording medium, a stream of base images that is obtained by:
multi-view video coding (MVC) encoding video data of a plurality of viewpoints, the MVC encoded video data having a base stream and at least one extended stream and outputting:
the base stream of the MVC encoded video data that is not composed of a data header that includes identification information of a viewpoint, and
the at least one extended stream of the MVC encoded video data composed of a data header that includes the identification information having a value of one or more showing that the data is data of an expanded viewpoint;
addressing the header of the base stream as one having a view id value of zero set as the identification information in the data header for a process performed sequentially from data of a viewpoint; and decoding the data of the stream of base image before decoding the data of the stream of extended image.

8. A non-transitory computer readable medium having stored thereon a program that when executed by a computer causes the computer to execute a process comprising the steps of:

reading, from a recording medium, a stream of base images that is obtained by:

multi-view video coding (MVC) encoding video data of a plurality of viewpoints, the MVC encoded video data having a base stream and at least one extended stream and outputting:

the base stream of the MVC encoded video data that is not composed of a data header that includes identification information of a viewpoint, and the at least one extended stream of the MVC encoded video data composed of a data header that includes the identification information having a value of one or more showing that the data is data of an expanded viewpoint;

addressing the header of the base stream as one having a view id value of zero set as the identification information in the data header for a process performed sequentially from data of a viewpoint; and decoding the data of the stream of base images before decoding the data of the stream of extended image.

\* \* \* \* \*